United States Patent [19]

Liu

[11] Patent Number: 5,331,557
[45] Date of Patent: Jul. 19, 1994

[54] AUDIO-VIDEO CODING SYSTEM FOR CHINESE CHARACTERS

[76] Inventor: Zhong-Yi Liu, 79 San Marino Ave., Ventura, Calif. 93003

[21] Appl. No.: 4,265

[22] Filed: Jan. 14, 1993

[51] Int. Cl.$^5$ .............................................. G06F 15/38
[52] U.S. Cl. ............................ 364/419.09; 364/419.1; 400/109; 400/110
[58] Field of Search ......... 364/419.09, 419.1, 900 MS; 400/102, 109, 110, 484

[56] References Cited

U.S. PATENT DOCUMENTS

| | | | |
|---|---|---|---|
| 4,096,934 | 6/1978 | Kirmser et al. | 400/110 |
| 4,193,119 | 3/1980 | Arase et al. | 364/419.02 |
| 4,298,773 | 11/1981 | Diab | 400/111 |
| 4,379,288 | 4/1983 | Leung | 400/110 |
| 4,408,199 | 10/1983 | White et al. | 400/110 |
| 4,484,305 | 11/1984 | Ho | 364/419 |
| 4,500,872 | 2/1985 | Huang | 400/110 |
| 4,544,276 | 10/1985 | Horodeck | 400/110 |
| 4,559,615 | 12/1985 | Goo et al. | 364/419.09 |
| 4,684,926 | 8/1987 | Yong-Min | 400/110 |
| 5,079,702 | 1/1992 | Ho | 364/419.09 |

Primary Examiner—Roy N. Envall, Jr.
Assistant Examiner—Frantzy Poinvil
Attorney, Agent, or Firm—Thomas I. Rozsa; Tony D. Chen

[57] ABSTRACT

A method for audio-video coding of Chinese characters wherein each audio-video code has two elements. The first element is an audio code element, and the second element is a video code element. The audio code element is always made of two English letters. The first English letter of the audio code element represents the consonant of the syllable of a Chinese character, and the second English letter represents the vowel of the syllable of the Chinese character. The video code element is made of two English letters in most situations. The first English letter of the video code element represent the first stroke of the Chinese character, and the second English letter represents the last stroke of the Chinese character. Only for 24 particular Chinese characters their respective video code element has one English letter, and for approximately 4% Chinese characters their respective video code element has an additional English letter "C" for indicating duplicated codes.

50 Claims, 3 Drawing Sheets

| | A | | H | | O | | S |
|---|---|---|---|---|---|---|---|
| 日 | | 竹(斜) | ノ丿 | 人 | 亻ㄧ人 | 尸(側) | 弓匚 |
| | B | | I | | P | | T |
| 月 | | 戈(點) | 冖 | 心 | 忄小 | 廿(並) | 艹廾 |
| | C | | J | | Q | | U |
| 金 | 钅ハ | 十(交) | ー | 手 | 扌丰 | 山(仰) | 凵 |
| | D | | K | | R | | V |
| 木 | 十 | 大(叉) | メ乂 | 口 | | 女(紐) | く乚 |
| | E | | L | | | | W |
| 水 | 氵又ヲ | 中(縱) | 丨辶 | | | 田(方) | 口囗 |
| | F | | M | | | | Y |
| 火 | 灬ソ小 | 一(橫) | 工厂 | | | 卜 | 亠丶 |
| | G | | N | | | | |
| 土 | 士 | 弓(鉤) | 乚乙 | | | | |

Initials

| b | p | m | f | d | t | n | l |
|---|---|---|---|---|---|---|---|
| g | k | h | | j | q | x | |
| zh | ch | sh | r | z | c | s | |
| | | w | | y | | | |

Vowels

| | i | u | ü |
|---|---|---|---|
| a | ia | ua | |
| o | | uo | |
| e | ie | | ü |
| ai | | uai | |
| ei | | uei | |
| ao | iao | | |
| ou | iou | | |
| an | ian | uan | üan |
| en | in | uen | ün |
| ang | iang | uang | |
| eng | ing | ueng | |
| ong | iong | | |

AUDIO-VIDEO CODING SYSTEM FOR CHINESE CHARACTERS

BACKGROUND OF THE INVENTION

1. Field of the Invention

The present invention generally relates to the field of encoding characters of foreign languages with a defined set of symbols according to a defined set of rules. The combination of such a defined set of symbols together with the defined set of rules is often referred to as a coding system or coding scheme. The present invention relates more particularly to the field of the coding systems of Chinese characters.

2. Description of the Prior Art

Unlike many other languages which use a limited number of letters or characters (such as the English language which uses only 26 alphabetical letters), the Chinese language uses tens of thousands of different characters. According to an old Chinese dictionary published in 1915, there were approximately 48,000 Chinese characters, although more than two-thirds of these characters were rarely or no longer being used in daily dialect. A popular Chinese dictionary published in the People's Republic of China (mainland China) has collected approximately 11,000 Chinese characters which are still commonly used in modern Chinese language. Other Chinese word-processing dictionaries or handbooks published in Taiwan or Hong Kong, which are also parts of China, have collected anywhere from approximately 13,000 to approximately 16,000 Chinese characters.

The Chinese characters are identified by their graphic configurations and phonic pronunciations. Although many Chinese characters are homophonic characters, each Chinese character is distinctly identifiable by the combination of its configuration and pronunciation. In the following descriptions, the configuration of a Chinese character is referred to as its "picto" or "video" aspect, and the pronunciation of the same Chinese character is referred to as its "phono" or "audio" aspect. Described in such terms, it can be said that each Chinese character is distinctly identified by the combination of its audio and video aspects.

The vast number of the Chinese characters makes the process of typing or word-processing of Chinese literature very difficult. This is because, unlike the typing or word-processing equipment for other languages such as English which can have a keyboard with only a limited number of letters or characters, it is virtually impossible to have a keyboard for the Chinese language which has keys directly corresponding to all the tens of thousands of Chinese characters.

Therefore, in order to process Chinese literature with modern typewriting or computer word-processing equipment having a keyboard with only a limited number of keys, the Chinese characters have to be encoded by a certain coding system which employs only a limited number of symbols. Under such a coding system, the code of the Chinese characters can be directly typed in by using a keyboard with only a limited number of keys.

Many efforts have been made in trying to encode Chinese characters so that they can be indirectly input into typing or word-processing equipment which have a keyboard with a limited number of keys. Since each Chinese character requires a distinct code, any coding system for Chinese characters would have tens of thousands of different codes for representing respectively all the different Chinese characters. Accordingly, a coding system for Chinese characters would have to be designed and constructed in a very intelligent manner, so that an ordinary user who knows how to read and write a Chinese character can know how to construct the code of the Chinese character. Otherwise, it would be virtually impossible for any ordinary user to use the coding system without always consulting the code book.

One of the major approaches of the existing coding systems for Chinese characters is to encode each Chinese character according to its ideographic configuration, or its picto-aspect. Such a coding system will be referred to as a "picto-coding system".

The configuration of each Chinese character is a combination of many pictographic strokes written in a particular sequence. One or more strokes may form a radical component of a Chinese character. Referring to FIG. 1, there are shown two Chinese characters denoted by C1 and C2 respectively. The first Chinese character C1 means "special" (as an adjective), "expert" (as a noun), or "monopolize" (as a verb). The second Chinese character C2 means "interest" (as a noun), "sharp" (as an adjective) or "benefit" (as a verb). Together they form a word that means "patent" (as a noun). The first Chinese character C1 has 11 strokes, and the second Chinese character C2 has 7 strokes. The numbers adjacent to the respective starting points of the strokes represent the correct sequence of writing these two Chinese characters.

The picto-coding systems use Arabic numerals 0 through 9 or the Latin alphabets with its 26 English letters, or other special symbols, to encode the strokes or radicals of Chinese characters. The main advantage of the picto-coding systems is that as long as a user remembers how to write a Chinese character and remembers the rules of construction, the user can construct the code to encode the Chinese character. Since the number of strokes are limited, the number of symbols required to represent the strokes are also limited. However, as it will be seen later, the rules of construction of the code are often very complicated because of the complexity involved in writing the Chinese characters. Oftentimes only extensively trained and highly sophisticated professional typists can use the picto-coding systems with acceptable speed.

There have been several representative picto-coding systems for Chinese characters. One early picto-coding system is known as the "Four-Corner" coding system. It was developed in China in the 1930's. It is rarely used now. In the Four-Corner picto-coding system, the various basic strokes of Chinese characters have been classified into 10 categories, each represented by one of the 10 Arabic numerals (0 through 9). Each Chinese character is then represented by four Arabic numerals corresponding to the respective strokes at the four corners of the Chinese character. The most significant advantage of the Four-Corner picto-coding system is that each Chinese character is encoded with a relatively small number (4) of Arabic numerals.

One of the main difficulties of using the Four-Corner picto-coding system is that many times it is hard to determine what the strokes are at the four corners of a Chinese character. Although the Chinese characters are basically square shaped, many of them do not have a distinguishable or recognizable "corner". Take the first Chinese character C1 in FIG. 1 as an example. It is hard to tell what the two respective strokes at the two lower corners of Chinese character C1 are. This is because the lower half of Chinese Character C1 includes a typical "centralized" radical component, and simply does not have easily distinguishable strokes at its two lower corners. This is a common situation in Chinese characters. The Four-Corner picto-coding system has made many complicated rules to deal with this type of situation, which makes it hard to use for an ordinary user. In fact, the users of the Four-Corner picto-coding system have to constantly consult the code book to successively encode Chinese characters.

Another picto-coding system is known as the "Five-Stroke" coding system. The "Five-Stroke" picto-coding system was developed in mainland China in the late 1970's. It is still one of the most popular coding systems currently used in mainland China. The "Five-Stroke" picto-coding system categorizes the various strokes of Chinese characters into five basic groups each represented by a representative stroke. There are several different definitions of the five representative strokes. One of the most popular sets of the five representative strokes includes a "horizontal" stroke, a "vertical" stroke, a "left-falling" stroke, a "right-falling" stroke, and a "turning" stroke.

Most Chinese characters consist of more than 5 strokes. For example, in FIG. 1, the first Chinese character C1 has 11 strokes, and the second Chinese character C2 has 7 strokes. The 11 strokes of Chinese character C1 include 5 horizontal strokes (Nos. 1, 3, 4, 5 and 7), 3 vertical strokes (Nos. 2, 6 and 10), no left-falling stroke, 2 right-falling strokes (Nos. 8 and 11) and 1 turning stroke (No. 3). The 7 strokes of Chinese character C2 include 1 horizontal stroke (No. 2), 3 vertical strokes (Nos. 3, 6 and 7), 2 left-falling strokes (Nos. 1 and 4), 1 right-falling strokes (No. 5) and no turning stroke.

Since many Chinese characters consist of more than 5 strokes, the Five-Stroke picto-coding system has to make a series of rules to regulate which five strokes of a particular Chinese character are to be chosen and encoded. The selection of the five strokes and the sequence of encoding them are very complicated and only extensively trained operators can efficiently utilize the Five-Stroke picto-coding system. Another disadvantage of the Five-Stroke picto-coding system is that it requires a specially designed keyboard for typing in the strokes into Chinese typing or word-processing equipment. The keys on such keyboard are not marked with Latin-alphabets but rather, the strokes or radical components of the Chinese characters. Therefore the typing or word-processing equipment with such special keyboard can only be used in processing the Chinese language.

Still another picto-coding system is known as the "Cang-Jie" coding system. The Cang-Jie picto-coding system was developed in Taiwan in the b 1970's and was named after a legendary figure from ancient China who is supposed to have first created the Chinese characters. The Cang-Jie picto-coding system is widely used in Taiwan and Hong Kong. It is also quite popular in the Chinese communities in the United States because it can be used on a conventional computer or word-processor with a standard English letter keyboard. Referring to FIG. 2, the Cang-Jie coding system classifies the various strokes of Chinese characters into 24 groups each represented by a so-called "Chinese Alphabet Component". Each Chinese Alphabet Component is assigned a corresponding English Alphabetical letter (except letters X and Z—X is reserved for conflict characters or difficult characters, and Z is reserved for user self-defined or self-created characters).

Because many Chinese characters have a high count in its number of strokes, it would be very slow if every stroke of such a Chinese character has to be encoded. For example, the first Chinese character C1 shown in FIG. 1 has 11 strokes. If every stroke must be encoded by the Cang-Jie code shown in FIG. 2, then a user would have to type in an 11-letter string such as "MLLMMLMIMNI" to input Chinese character C1. This is very ineffective in real practice. Accordingly, the Cang-Jie picto-coding system has a special rule, that is, the number of strokes selected for encoding each Chinese Character should be no more than 5. However, to enforce this rule, the Cang-Jie picto-coding system has to make a set of very detailed rules. Therefore, similar to the Five-Stroke picto-coding system, the Cang-Jie picto-coding system is very hard to learn and use for ordinary users, because it is often very hard to choose correctly the five strokes and then encode them according to the very complicated rules. For example, the official Cang-Jie code for Chinese character C1 is "JIDI". An unsophisticated user will have a hard time reconciling this with the code-table shown in FIG. 2 and understanding why "JIDI" is the correct code.

Because of the difficulties experienced in using the Cang-Jie picto-coding system, a simplified Cang-Jie picto-coding system has been developed. The simplified Cang-Jie picto-coding system uses the same 24 Chinese Alphabet Components used in the original Cang-Jie picto-coding system. However, to reduce the difficulty of selecting the strokes to encode, the simplified Cang-Jie picto-coding system makes a new rule. Under the new rule, only two strokes are selected and encoded, which are the first stroke and the last stroke of a Chinese character. For example, the simplified Cang-Jie code for the first Chinese character C1 shown in FIG. 1 is "JI" (in Cang-Jie code, the first horizontal stroke and the sixth vertical stroke are treated as one "cross" stroke which is represented by English letter "J").

Of course the simplified Cang-Jie codes are much easier to pick and encode. However, there is a new problem. The new problem is that many different Chinese characters share the same first and last strokes, just as in English many words share the same first and last letter. For example, when the simplified Cang-Jie code "SI" is typed into a Chinese word-processor which uses the simplified Cang-Jie picto-coding system, at least 15 different Chinese characters will show up on the display screen because all of them share the same simplified Cang-Jie code "SI", including the first Chinese character C1 shown in FIG. 1. In this situation the user has to look up on the screen, choose the right character and type in the numerical index next to it.

Therefore in using the simplified Cang-Jie picto-coding system, the user has to go through a second step to choose the right character. This "two-step" method locks the user's eye to the display screen all the time for almost every Chinese character. It tremendously slows down the speed of Chinese word-processing.

Another major approach of the existing coding schemes for Chinese characters is to encode each Chinese character according to its pronunciation, or its "audio" aspect. Such a coding system will be referred to as a "phono-coding system".

Each Chinese character only has a single syllable. Each syllable typically has two components: an initial and a final. The phono-coding systems are designed to use certain special symbols or Latin alphabet letters to represent the initials and finals of Chinese syllables. Special symbols or Latin letters representing initials are known as consonants, and special symbols or Latin letters representing finals are known as vowels. The main advantage of the phono-coding system is that the user only needs to remember the principle of how to encode a limited number of consonants and vowels of Chinese syllables. However, as it will be seen later, many Chinese characters have similar pronunciation but different configurations. Most of the time when a user inputs a phono-code, the word-processor will prompt a multiplicity of different Chinese characters with the same pronunciation, and the user has to choose the corrected one by typing an index numeral. Therefore, the main difficulty of the phono-coding system is that it often takes two indirect steps to input a single Chinese character correctly.

There have been two main phono-coding systems designed for Chinese characters. One early phono-coding system was invented in the early 1930's, known as the "Standard Chinese Phonetic Symbols" phono-coding system, or "ZHUYIN" phono-coding system. It is rarely used in mainland China. The "ZHUYIN" phono-coding system uses 37 specially designed symbols as consonants and vowels. The principle disadvantage of the "ZHUYIN" phono-coding system is that its 37 special symbols are artificially constructed and hard to remember. In addition, to use the "ZHUYIN" phono-coding system on a word-processing device, the keyboard of the word-processing device has to be exclusively built and marked with the 37 special symbols.

A more popular phono-coding system is the "Chinese Phonetic Alphabet", or "PINYIN", phono-coding system. It was officially promulgated by the Chinese government in 1956 and is widely used in mainland China now. The principal advantage of the PINYIN over the ZHUYIN phone-coding system is that unlike the ZHUYIN system which uses artificially constructed symbols to represent the consonants and vowels of Chinese syllables, the PINYIN system uses Latin alphabet letters to represent the same. Referring to FIG. 3, the PINYIN system has 23 consonants and 33 vowels. The PINYIN codes for the first and second Chinese characters C1 and C2 in FIG. 1 are "Zhuan" and "Li", respectively.

As mentioned earlier, many Chinese characters have identical pronunciation but different configurations and meanings. For example, there are at least 34 homophones having the same PINYIN code "Li" as the second Chinese character C2 in FIG. 1. When the PINYIN code "Li" is typed into a Chinese word-processor which uses the PINYIN phono-coding system, these 34 different Chinese characters will all come up on the display screen, and a user will have to watch the screen to choose the desired character, and type in its index number to finally input that character. This, again, makes the PINYIN phono-coding system a two-step method for encoding Chinese characters.

The following nine (9) patents are prior art references which are pertinent art to the field of coding systems for encoding foreign characters.
1. U.S. Pat. No. 4,096,934 issued to Kirmser et al. on Jun. 27, 1978 for "Method And Apparatus For Reproducing Desired Ideographs" (hereafter the "Kirmser Patent").
2. U.S. Pat. No. 4,193,119 issued to Arase et al. on Mar. 11, 1980 for "Apparatus For Assisting In The Transposition Of Foreign Language Text" (hereafter the "Arase Patent").
3. U.S. Pat. No. 4,298,773 issued to Diab on Nov. 3, 1981 for "Method And System For 5-Bit Encoding Of Complete Arabic-Farsi Languages" (hereafter the "Diab Patent").
4. U.S. Pat. No. 4,379,288 issued to Leung et al. on Apr. 5, 1983 for "Means For Encoding Ideographic Characters" (hereafter the "Leung Patent").
5. U.S. Pat. No. 4,408,199 issued to White et al. on Oct. 4, 1983 for "Ideogram Generator" (hereafter the "White Patent").
6. U.S. Pat. No. 4,500,872 issued to Huang on Feb. 19, 1985 for "Method For Encoding Chinese Characters" (hereafter the "Huang Patent").
7. U.S. Pat. No. 4,544,276 issued to Horodeck on Oct. 1, 1985 for "Method And Apparatus For Typing Japanese Text Using Multiple Systems" (hereafter the "Horodeck Patent").
8. U.S. Pat. No. 4,559,615 issued to Goo et al. on Dec. 17, 1985 for "Method And Apparatus For Encoding, Storing And Accessing Characters Of Chinese Character-Based Language" (hereafter the "Goo Patent").
9. U.S. Pat. No. 4,684,926 issued to Wang Yong-Min on Aug. 4, 1987 for "Universal System Of Encoding Chinese Characters And Its Keyboard" (hereafter the "Wang Patent").

In the above cited nine (9) prior art patents, five (5) of them are related to encoding Chinese characters. They are the Kirmser Patent, the Leung Patent, the Huang Patent, the Goo Patent and the Wang Patent. The other four (4) prior art patents, namely the Arase Patent, the White Patent, the Diab Patent and the Horodeck Patent, are not related to particular encoding schemes of Chinese characters.

The Kirmser Patent discloses a method and apparatus for reproducing desired Chinese characters. The Kirmser Patent employs the Standard Chinese Phonetic Symbols, or ZHUYIN symbols. It utilizes a specially marked keyboard, where each key has a designated code which is one of the 37 ZHUYIN symbols. In the Kirmser Patent, each ZHUYIN symbol is designed to be used as both a phone-code and a picto-code. That is, each ZHUYIN symbol is either representing the phono or audio aspect of a Chinese character, or the picto or video aspect of the Chinese character. Each given Chinese character is encoded by two sequences of ZHUYIN symbols. The first sequence includes two ZHUYIN symbols to represent the pronunciation of the Chinese character, wherein the fist phonetic symbol is a consonant and the second phonetic symbol is a vowel. The second sequence immediately follows the first sequence and includes a series of ZHUYIN symbols to represent the strokes of the Chinese character. The second sequence is primarily based on the "Four-Corner" picto-coding system. The Kirmser Patent uses the ZHUYIN symbols, which are no longer familiar to many Chinese people, particularly to younger generations. In addition, a coding scheme of the Kirmser Patent for a given Chinese character often includes as many as five (5) or six (6) ZHUYIN symbols.

The Leung Patent discloses a method and apparatus for encoding Chinese characters. The Leung Patent method is based on a modified Five-Stroke picto-coding system. It includes a coding scheme using five (5) Arabic numerals, namely 1 through 5, to represent five types of strokes of Chinese characters respectively. Each Chinese character is encoded by a series of these five (5) Arabic numerals in the order of the strokes, wherein one numeral represents one stroke. However, many Chinese characters have a large number of strokes. By using the coding scheme of the Leung Patent, a Character with a large number of strokes must be represented by the same large number of Arabic numerals. To reduce the number of keys one must type in, the Leung Patent utilizes a special keyboard with five (5) keys designated with Arabic numerals 1 through 5 respectively, and all the rest of the keys designated with the most frequently occurring numeral combinations. The Leung Patent coding system is a picto-coding system. To construct a correct code, a user has to remember the exact sequence of the strokes, and determine how a long code can be segmented into shorter combinations. For example, the first Chinese character C1 shown in FIG. 1 has 11 strokes. In the Leung Patent, its code is probably "12511214124". If a user does not remember the correct sequence exactly, then the user cannot construct the correct code. In addition, the user has to determine whether the long code "12511214124" is segmented into "1-2511-21-41-2-4", or "1-251-121-4-12-4". Furthermore, even with the specially designed keyboard, the user has to type six times to input one Chinese character such as the first Chinese character C1 shown in FIG. 1.

The Huang Patent discloses a method for encoding Chinese characters. The Huang Patent is also developed from the coding systems utilizing Standard Chinese Phonetic Symbols, or ZHUYIN symbols. The Huang Patent method is a coding scheme wherein the code of each Chinese character includes three (3) parts: a phonetic part, a tone part, and an ideographic part. The phonetic part uses up to three (3) ZHUYIN symbols to represent the pronunciation of a Chinese character. The tone part includes one of the five tone symbols to represent the accent of the Chinese character. The ideographic part includes two (2) digits, wherein each digit is associated with two different corner strokes of the Chinese character.

The Goo Patent discloses a method and apparatus for encoding, storing and accessing characters of Chinese character-based language. The Goo Patent is based on the Four-Corner picto-coding system. It includes two parts: a first part representing one of the common radical components of Chinese characters which appears in the particular Chinese character, and a second part representing a balancing portion, i.e., the rest of the strokes, of a particular Chinese character. The balancing portion is coded under a modified "Four-Corner" coding method. The Goo Patent utilizes a keyboard which has a first section and a second section. The first section is provided with keys designating various common radical components of Chinese characters, so that the first part of the coding scheme for a given Chinese character can be typed in with a single key stroke. The second section is provided with numerical keys, so that the numerals of the "Four-Corner" code can be typed in.

The Wang Patent discloses a universal system of encoding Chinese characters and its keyboard. The Wang Patent is a Five-Stroke type of picto-coding system. Certain basic roots of Chinese characters are selected according to their frequency distributions. These selected roots are classified into 25 groups according to their internal links and compatible relationships. Each group is represented by a respective Chinese key name. The classified selected roots are then arranged on 25 keys of a standard keyboard. Each key designates a respective group of the classified selected roots. The Wang Patent can only be used on a word-processing device which has a specially designed Chinese character keyboard.

The remaining patents are not as close as the above discussed patents. The Arase Patent discloses an apparatus for assisting the translation of foreign language text. Character font sets of different languages, including Chinese, are preloaded into the disk storage of a computer and can be selected and displayed on a monitor screen for transposition. The Arase Patent does not disclose any particular coding scheme of Chinese characters. The White Patent discloses an ideogram generating system which includes a computer system. The White Patent relates to the improvement in displaying prestored ideographic characters on the screen of a monitor. It does not relate to any particular coding scheme of Chinese characters. The Diab Patent discloses a method and system for 5-bit encoding of complete Arabic-Farsi languages. The Horodeck Patent discloses a method and apparatus for typing Japanese text using multiple systems. Neither the Diab patent nor the Horodeck Patent relates to the encoding of Chinese characters.

It is desirable to have a "phono-picto" (or "audio-video") coding system which combines the advantage of the most popular phono-coding and picto-coding systems, wherein each Chinese character is represented by an audio-video code that is constructed exclusively by a limited number of English alphabetical letters, so that the audio-video coding system can be used with a standard English letter keyboard.

SUMMARY OF THE INVENTION

The present invention is a coding system for encoding Chinese characters by using the twenty-six (26) letters of the English alphabet. The present invention coding system combines phono- and picto-codings that are constructed exclusively by a limited number of English alphabetical letters, so that it can be used with a standard English keyboard.

It is known that Chinese characters have to be coded by Latin alphabet letters or other specially designed symbols to be input into modern word-processing equipment such as computers. Current coding systems for Chinese characters commonly utilize complicated codes for encoding the "phono" (or "audio") aspect, or the "picto" (or "video") aspect of the Chinese characters, or both. Many popular prior art coding systems, such as the Cang-Jie picto-coding system and the PIN-YIN phono-coding system, require a two-step input process, i.e., a user has to type in a code, which will cause a multiplicity of Chinese characters to be displayed on the screen of the word-processor, and the user has to type in the numerical index of the desired Chinese character to select such character.

Although various dictionaries and other manuals or handbooks have collected more than 11,000 to 16,000 Chinese characters, only approximately 5,000 of them are commonly used. In fact, these approximately 5,000 Chinese characters can satisfy the need of almost all daily usage of Chinese language. Therefore, it is desirable to provide a coding system primarily for these approximately 5,000 Chinese characters.

It has been discovered, according to the present invention, that if each Chinese character is encoded by an audio-video code, which encodes not only the phono-aspect of the Chinese character but also the picto-aspect of the Chinese character, then the Chinese character can be accurately identified and distinguished from other Chinese characters. In fact, it is found that only approximately 4% of the roughly 5,000 commonly used Chinese characters will have duplicated codes when their codes depict both the phono-aspect and the picto-aspect.

It has also been discovered, according to the present invention, that if the consonant of the syllable of a Chinese character is represented by one English letter, and the vowel of the syllable of the Chinese character is also represented by one English letter, then the pronunciation of the Chinese character can be encoded by only two English letters, which constitute the audio code element of the audio-video code of the Chinese characters.

It has been further discovered, according to the present invention, that if the first stroke of a Chinese character is represented by one English letter, and the second stroke of the Chinese character is also represented by one English letter, then the configuration of the Chinese character can be encoded by only two English letters, which constitute the video code element of the audio-video code of the Chinese characters.

It has been additionally discovered, according to the present invention, that if the two English letters of the audio code element of an audio-video code for a Chinese character are written in different combinations of uppercase and lowercase letters, then the four tones of Chinese syllables can be encoded by a designated combination of uppercase and lowercase letters.

It is therefore an object of the present invention to provide an audio-video coding system for encoding Chinese characters, which provides an audio-video code to encode not only the phono-aspect of each Chinese character, but also the picto-aspect of such Chinese character, so that each Chinese character can be accurately identified and distinguished from other Chinese characters.

It is also an object of the present invention to provide an audio-video coding system for encoding Chinese characters, where the audio-video code for each Chinese character includes an audio code element made up by only two English letters, the first English letter representing the consonant of the syllable of the Chinese character, and the second English letter representing the vowel of the syllable of the Chinese character, so that the pronunciation of the Chinese character can be encoded with only two English letters.

It is a further object of the present invention to provide an audio-video coding system for encoding Chinese characters, where the audio-video code for each Chinese character includes a video code element made up by only two English letters, the first English letter representing the first stroke of the Chinese character, and the second English letter representing the last stroke of the Chinese character, so that the configuration of the Chinese character can be encoded with only two English letters.

It is an additional object of the present invention to provide an audio-video coding system for encoding Chinese characters, where an audio-video code for each Chinese character can denote the tone of the syllable of an encoded Chinese character without adding additional elements to the audio-video code, by merely using different combinations of uppercase and lowercase letters in the audio code element of the audio-video code.

Described briefly, the present invention is an audio-video coding system for Chinese characters. In the present invention coding system, each Chinese character is represented by an audio-video code. Each audio-video code of the present invention has two elements. The first element is an audio code element, and the second element is a video code element. The audio code element is always made of two English letters. The first English letter of the audio code element represents the consonant of the syllable of a Chinese character, and the second English letter represents the vowel of the syllable of the Chinese character. The video code element is made of two English letters in most situations. The first English letter of the video code element represents the first stroke of the Chinese character, and the second English letter represents the last stroke of the Chinese character. The respective video code element for twenty-four particular Chinese characters has only one English letter, and the respective video code element for approximately four percent of Chinese characters has an additional English letter "C" for indicating duplicated codes.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Figures 1, 2, 3:
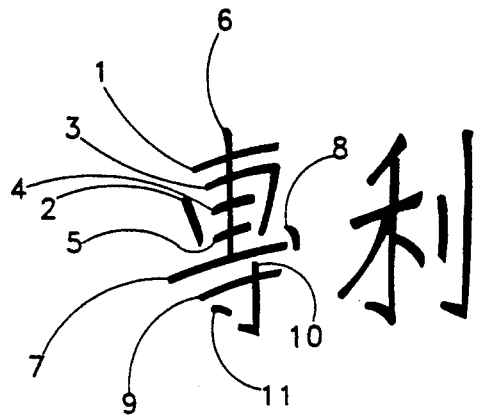
FIG. 1 is an illustration of two Chinese characters.
FIG. 2 is a code table of the Cang-Jie picto-coding system.
FIG. 3 is a code table of the PINYIN phono-coding system.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Generally, the present invention relates to the art of encoding characters of foreign languages with a defined set of symbols according to a defined set of rules, the combination of which is often referred to as a coding system or coding scheme. More particularly, the present invention relates to the art of the coding systems of Chinese characters. The present invention is a coding system encoding Chinese characters by using the twenty-six (26) letters of the English alphabet. It combines audio- and video-codings and is constructed exclusively by a limited number of English letters, so that it can be used with a standard English keyboard.

The Chinese language, unlike the English language which uses only 26 alphabet letters, uses tens of thousands of different characters. However, although various dictionaries and other materials have collected more than 11,000 to 16,000 Chinese characters, only about 5,000 of them are commonly used. Since these approximately 5,000 Chinese characters can actually satisfy the need of almost all daily usage of Chinese language, the present invention is designed to provide a coding system primarily for these approximately 5,000 Chinese characters. Of course the present invention coding system can be easily utilized to encode all Chinese characters.

Chinese characters are uniquely identified by their respective graphic configurations, or picto-aspects, and their respective phonic pronunciations, or phono-aspects. Although many Chinese characters are homophonic characters, each Chinese character is distinctly identifiable by the combination of its picto- and phono-aspects, or its "audio" and "video" aspects. Chinese characters have to be encoded by a certain coding system which employs only a limited number of symbols to process Chinese literatures with modern typewriting or computer word-processing equipment having a keyboard with only a limited number of keys. The primary object of such coding system is to input Chinese characters by directly typing on a keyboard with only a limited number of keys.

The present invention is an audio-video coding system for encoding Chinese characters, which provides an audio-video code to encode not only the phono-aspect of each Chinese character, but also the picto-aspect of such Chinese character, so that each Chinese character can be accurately identified and distinguished from other Chinese characters. By using the present invention, more than 95% of the 5,000 commonly used Chinese characters can be represented by respective audio-video codes in a standard format which consists of four English letters.

Each audio-video code of the present invention is a combination of an audio code element and a video code element. The audio code element for each Chinese character is made up by only two English letters, the first English letter representing the consonant of the syllable of the Chinese character, and the second English letter representing the vowel of the syllable of the Chinese character. The object of the present invention audio code element is to encode the pronunciation of the Chinese character with only two English letters. The video code element for each Chinese character is also made up by only two English letters, the first English letter representing the first stroke of the Chinese character, and the second English letter representing the last stroke of the Chinese character. The object of the present invention audio code element is to encode the configuration of the Chinese character with only two English letters. Together, each of the present invention audio-video codes consists of only four English letters.

A single Chinese character has a single syllable which has two components: an initial and a final. The audio code elements of the present invention are derived from the PINYIN phono-coding system with substantial modification and are designed to use a single English letter to represent each initial and final component of Chinese syllables.

The PINYIN phono-coding system is designed to use certain Latin alphabet letters to represent the initial and final components of Chinese syllables. The major advantage of the PINYIN phono-coding system is that unlike the ZHUYIN phono-coding system which uses artificially constructed symbols to represent the consonants and vowels of Chinese syllables, the PINYIN system uses Latin alphabet letters to represent the consonants and vowels of Chinese syllables. Referring to FIG. 3, the PINYIN phono-coding system has 23 consonants:

B, C, Ch, D, F, G, H, J, K, L, M, N, P, Q, R, S, Sh, T, W, X, Y, Z and Zh wherein three of them, "Ch", "Sh", and "Zh" are each represented by two English letters, and the rest of them are each represented by a single English letter.

The consonants "C" and "Ch", "S" and "Sh", and "Z" and "Zh" are paired initials, where "C", "S", and "Z" are apical consonants, and "Ch", "Sh" and "Zh" are retroflex consonants. In the Chinese language it is quite hard to separate the apical and retroflex consonants for people living in some part of the country. Therefore in the present invention they are not separated: "C" and "Ch" are encoded as "C", "S" and "Sh" are encoded as "S", and "Z" and "Zh" are encoded as "Z". Accordingly, the present invention uses 20 single English letters to encode the 23 PINYIN initials, as listed in TABLE I.

Referring again to FIG. 3, the PINYIN phono-coding system has 33 initials:

a, o, e, i. u. ü
ai, ei, ao, ou, an, en, ang, eng, ong
ie, iao, iou, ian, in, iang, ing, iong
ua, uo, uai, uei, uan, uen, uang
üe, üan, ün wherein only six of them, "a", "o", "e", "i", "u", and "ü", are single letter vowels, and the rest of them are multi-letter vowels.

The audio code element for vowels in the present invention is uniquely designed to have each vowel encoded by only one single English letter. The first five single letter vowels, "a", "o", "e", "i", and "u", can be easily encoded by using corresponding English letters "A", "O", "E", "I" and "U". However, there is no readily corresponding English letter for the last single letter vowel, "ü". In the present invention, the single letter vowel, "ü" is encoded as "V".

In the Chinese language it is quite hard for people living in some part of the country to separate the following pairs of vowels: "o" and "uo", "en" and "eng", "in" and "ing", "ong" and "iong", "uan" and "üan", and "un" and "ün". Therefore in the present invention these pairs of vowels are not separated: "o" and "ou" are encoded as "O", "en" and "eng" are encoded as "N", "in" and "ing" are encoded as "J" (or "N" if following initials "J", "Q" or "X"), "ong" and "iong" are encoded as "C", "uan" and "üan" are encoded as "H", and "un" and "ün" are encoded as "C", "uan" and "üan" are encoded as "H", and "un" and "ün" are respectively encoded by a single English letter, vowels "iu"" and "ui" are both encoded by "Q". Accordingly, the present invention uses 26 single English letters to encode the 33 PINYIN initials, as listed in TABLE II.

One uniqueness of the present invention coding system is that it uses the consonant English letters to represent both the consonants and the vowels of Chinese syllables. By doing so the present invention is able to use a single English letter to encode a multi-letter vowel or consonants. In addition, in combining the representations of certain hard-to-distinguish vowels (such as "en" and "eng", and "in" and "ing") and consonants (such as "C" and "Ch", "S" and "Sh", and "Z" and "Zh"), the present invention makes the coding easier for many users who live in some parts of China where these vowels and consonants are not separated in daily dialect.

As an example, the PINYIN codes for the two Chinese characters C1 and C2 shown in FIG. 1 are "Zhuan" and "Li" respectively. Although the PINYIN code for the second Chinese character C2 shown in FIG. 1 has only two letters, the PINYIN code for the first Chinese character C1 shown in FIG. 1 has as many as five letters. Whereas the present invention audio code elements for the two Chinese characters C1 and C2 shown in FIG. 1 are ZH and LI respectively, each has only two letters.

TABLE I

PRESENT INVENTION AUDIO CODE ELEMENT FOR INITIALS

| Present Invention | PINYIN | Present Invention | PINYIN | Present Invention | PINYIN |
|---|---|---|---|---|---|
| B | B | K | K | S | S, Sh |
| C | C, Ch | L | L | T | T |
| D | D | M | M | W | W |
| F | F | N | N | X | X |
| G | G | P | P | Y | Y |
| H | H | Q | Q | Z | Z, Zh |
| J | J | R | R | | |

TABLE II

PRESENT INVENTION AUDIO CODE ELEMENT FOR FINALS

| Present Invention | PINYIN | Present Invention | PINYIN | Present Invention | PINYIN |
|---|---|---|---|---|---|
| A | a | J | in, ing | R | iang |
| B | ua | K | un, ün | S | iao |
| C | ong, iong | L | ue | T | ai |
| D | ou | M | ie | U | u |
| E | e | N | en, eng | V | ü |
| F | ei | | in, ing* | W | uang |
| G | ang | O | O, uo | X | ao |
| H | uan, üan | P | ian | Y | uai |
| I | i | Q | iu, ui | Z | an |

*N also represents "in" and "ing" when following consonants "J", "Q" or "X".

The present invention audio-video coding system further provides a method to denote the accent tone of the syllable of an encoded Chinese character without adding additional elements to the audio-video code, by merely using different combinations of uppercase and lowercase letters in the audio code element of the audio-video code.

There are four major accent tones in the Chinese language. The present invention denotes these four accent tones by alternating the two English letters between upper and lower case letters. It uses uppercase for both the first and second English letters to denote a first accent tone, lowercase for the first English letter but uppercase for the second English letter to denote a second accent tone, uppercase for the first English letter but lowercase for the second English letter to denote a third accent tone, and uses lowercase for both the first and second English letters to denote a fourth accent tone. For example, a Chinese syllable which has a similar pronunciation as the English letter "B" can be encoded by the present invention audio code elements as BI, bI, Bi and bi respectively to denote the four different accent tones. With this notation, the present invention audio code elements for the two Chinese characters C1 and C2 shown in FIG. 1 are ZH and li respectively, which denote respectively that accent tone of the first Chinese character C1 shown in FIG. 1 is the first accent tone, and the accent tone of the second Chinese character C1 shown in FIG. 1 is the fourth accent tone.

In the present invention, the video code element for each Chinese character is also made up by only two English letters, so that the entire audio-video code for each Chinese character has only four English letters. The first English letter of the video code element represents the first stroke of the Chinese character, and the second English letter of the video code element represents the last stroke of the Chinese character. Therefore, the configuration of the Chinese character can be encoded with only two English letters. The video code elements of the present invention are derived from the Cang-Jie picto-coding system and designed to use two English letters to represent the picto-aspect of each Chinese character. With the exception of the 24 Chinese characters shown in FIG. 2 which can be directly represented by the corresponding English letter, all other Chinese characters are analyzed into a multiplicity of strokes which include a first stroke and a last stroke. These various strokes of Chinese characters are categorized into 24 groups, each represented by a corresponding English letter (except letters X and Z which are reserved respectively for conflict characters or difficult characters and Z user self-defined or self-created characters).

It has been mentioned above that when the Chinese characters are identified by either a picto-code or a phono-code alone, many Chinese characters will share the same code. This is because many Chinese characters share the same first and last stroke, and many Chinese characters are homophonic characters which have the same pronunciation. For example, in the present invention, the video code element of the first Chinese character C1 shown in FIG. 1 is "JI", whereas in the 5,000 commonly used Chinese characters, 15 of them share the same audio code element "JI". Likewise, in the present invention, the audio code element of the second Chinese character C2 shown in FIG. 1 is "li", whereas in the 5,000 commonly used Chinese characters, 34 of them share the same video code element "li".

Nevertheless, as discovered by the present invention, when identified together by the present invention audio-video code which combines the audio code element and the video code element, the Chinese characters can be distinctively identified. In fact, within the 5,000 commonly used Chinese characters, only about 4% of them have duplicate codes. In case of duplication, the present invention uses an additional letter "C" to denote duplication. The original four-letter code is reserved for the most commonly used character. Therefore, the present invention provides an audio-video coding system which combines the advantage of the most popular phono-coding and picto-coding systems, wherein each Chinese character is represented by an audio-video code that is constructed exclusively by four English letters (except in case of duplication codes).

Shown in TABLE III, there are 5,015 commonly used Chinese characters coded by the present invention audio-video coding system. The coded Chinese characters are arranged in alphabetical order according to their PINYIN codes. Of course all Chinese characters can be coded according to the principles of the present invention audio-video coding system.

The left-most column of TABLE III is the PINYIN codes of the Chinese characters. It can be seen that in most of the cases, two or more Chinese characters share the same PINYIN code. This is why PINYIN codes alone cannot distinctively identify each Chinese character. Arranged in the alphabetical sequence of their PINYIN codes, the Chinese characters are listed in corresponding rows. The present invention audio-video codes are listed next to the respective Chinese characters.

TABLE III

COMMONLY USED CHINESE CHARACTERS CODED WITH THE PRESENT INVENTION AUDIO-VIDEO CODE

| | | | | | | | | |
|---|---|---|---|---|---|---|---|---|
| A1 | 阿AAnr | 啊AArr | | | | | | |
| AI1 | 挨AIqk | 埃AIgk | 哎AIrk | 唉AIrkC | 哀AIyv | 唛AIbe | | |
| AI2 | 皑aIht | 癌aIku | 捱aIqg | 呆aIrd | 毚aIuk | | | |
| AI3 | 霭aimv | 矮aiov | 嗳aire | 蔼aiyv | 毐aigj | | | |
| AI4 | 爱Aibe | 嗳Aire | 碍Aimo | 隘Aint | 艾Aitk | 暧Aiae | | |
| AN1 | 庵ANiu | 安ANjv | 氨ANov | 鞍ANtv | 谙ANya | 铵ANcv | 胺ANbv | |
| AN3 | 俺anou | | | | | | | |
| AN4 | 暗Anaa | 案Anjd | 按Anqv | 岸Anuj | 阍AnaaC | 黯Anwa | 谙Anya | |
| ANG1 | 肮AGbn | | | | | | | |
| ANG2 | 昂aGal | | | | | | | |
| ANG4 | 盎Aglt | | | | | | | |
| AO1 | 凹AOsu | 垇AOgs | | | | | | |
| AO2 | 熬aOgk | 敖aOgk | 翱aOhm | 鏊aOic | 嗷aOrk | 遨aOyk 璈aOmk | 鳌aOgfC | |
| AO3 | 袄aolk | | | | | | | |
| AO4 | 澳Aoek | 敖Aogk | 奥Aohk | 傲Aook | 懊Aopk | 拗Aoqs | 墺AogkC | 坳Aogs | 鏖Aovt |
| BA1 | 巴BAau | 笆BAhu | 八BAho | 疤BAku | 吧BAru | 叭BArc | 扒BAqc | 芭BAtuC | 把BAfu |
| BA2 | 鈸bAck | 拔bAqk | 跋bArk | 捌bAqn | | | | |
| BA3 | 把baqu | 靶batu | 钯badu | | | | | |
| BA4 | 爸Bacu | 坝Bagb | 霸Bamb | 耙BaquC | 罢Bawp | | | |
| BAI1 | 掰BTqq | | | | | | | |
| BAI2 | 白bTha | 陌bTna | | | | | | |
| BAI3 | 柏btda | 百btma | 伯btoaC | 摆btqp | 佰btoa | | | |
| BAI4 | 败Btbk | 拜Bthj | 稗BthjC | 呗Btrc | | | | |
| BAN1 | 颁BZcc | 般BZhe | 班BZmg | 搬BZqe | 扳BZqeC | 瘢BZke | 斑BZmgC | |
| BAN3 | 阪bzar | 版bzle | 板bzde | 阪bzne | | | | |
| BAN4 | 半Bzfq | 伴Bxoq | 拌Bzqq | 扮Bzqh | 绊Bzvq | 办Bzyj | 瓣BzyjC | |
| BANG1 | 梆BGdl | 帮BGgb | 傍BGos | 邦BGql | 浜BGec | | | |
| BANG3 | 膀bgbs | 榜bgds | 绑bgvl | | | | | |
| BANG4 | 镑Bgcs | 棒Bgdq | 蚌Bglj | 磅Bgms | 傍Bgos | 谤Bgys | | |
| BAO1 | 胞BXbu | 褒BXyv | 包BXpu | 苞BXtu | 剥BXvn | 孢BXnu | 煲BXof | 笣BXhu |
| BAO2 | 雹bXmu | 薄bXti | | | | | | |

| | | | | | | | | | |
|---|---|---|---|---|---|---|---|---|---|
| BA03 | 寶bxjc | 褓bxld | 飽bxou | 堡bxog | 保bxod | 葆bxtd | 鎊bxpf | | |
| BA04 | 暴Bxte | 豹Bxbi | 鮑Bxcu | 瀑Bxee | 爆Bxfe | 報Bxge | 鮑Bxnu | 刨Bxpn | 抱Bxqn |
| BEI1 | 杯BFdf | 卑BFhj | 背BFlb | 悲BFlpC | 碑BFmj | 盃BFmt | 俾BFoj | 揹BFqb | |
| BEI3 | 北bflp | | | | | | | | |
| BEI4 | 貝Bfbc | 焙Bffr | 狽Bfkc | 輩Bflj | 被Bfle | 背Bflb | 憊Bfop | 備Bfob | 僻BfojC |
| | 倍Bfor | 悖Bfpd | 臂Bfsb | 蓓Bftr | 避Bfyj | 鋇Bfcc | 棍Bfdc | | |
| BEN1 | 賁BNjc | 奔Bnkt | | | | | | | |
| BEN3 | 本bndm | 苯bntm | | | | | | | |
| BEN4 | 笨Bnhm | | | | | | | | |
| BENG1 | 崩BNub | 繃BNvb | 塴BNgb | | | | | | |
| BENG2 | 甭bNmq | | | | | | | | |
| BENG4 | 蹦Bnrb | 迸Bnyt | 泵Bnme | 蚌Bnlj | | | | | |
| BI1 | 逼BIyw | 荸BItp | 屄BIsc | | | | | | |
| BI2 | 鼻bIhl | | | | | | | | |
| BI3 | 筆bihq | 彼bihe | 比bipp | 鄙birl | 匕biuh | | | | |
| BI4 | 閉Biah | 睥Bibj | 泌Bieh | 斃Bifp | 敝Bifk | 弊Bift | 幣Bifb | 碧Bimr | 陛Bing |
| | 愎Bipe | 必Biph | 辟Bisj | 臂Bisb | 壁Bisg | 蔽Bitk | 婢Bivj | 畢Biwj | |
| | 庇Biip | 避Biyj | 鉍Bich | 痺Bikl | 秘Bihh | 妣Bivp | 怭BiphC | | |
| BIAN1 | 蝙BPlb | 砭BPmo | 鞭BPtk | 編BPvb | 邊BPys | | | | |
| BIAN3 | 貶bpbo | 扁bpht | 匾bpsb | | | | | | |
| BIAN4 | 便Bpok | 變Bpvk | 弁Bpit | 遍Bpyb | 辯Bpyj | 辨BpyjC | 辮BpyjC | 汴Bpey | 卞Bpyy |
| BIAO1 | 鏢BScf | 標BSdf | 彪BSyh | 膘BSbf | | | | | |
| BIAO3 | 錶bscv | 表bsqv | 婊bsvv | 俵bsov | 裱bslv | | | | |
| EIAO4 | 鰾Bsnf | | | | | | | | |
| BIE1 | 鱉BMff | 憋BMfp | 瘪BMkb | | | | | | |
| BIE2 | 別bMrn | 蟞bMro | | | | | | | |
| BIE4 | 彆BmfnC | | | | | | | | |
| BIN1 | 檳BJdc | 彬BJdh | 瀕BJec | 濱BJecC | 賓BJjc | 斌BJym | 儐BJocC | | |
| BIN4 | 殯Bjmc | 鬢Bjsc | 擯Bjqc | 髕Bjbc | | | | | |
| BING1 | 冰BJie | 兵BJoc | 屏BJst | 并BJtt | | | | | |
| BING3 | 炳bjfb | 秉bjhl | 丙bjmb | 餅bjotC | 稟bjyd | | | | |
| BING4 | 柄Bjdb | 病Bjkb | 併Bjot | 並Bjtc | | | | | |
| BO1 | 玻BOme | 鉢BOom | 撥BOqe | 菠BOte | 剝BOvn | 波BOee | 播BOqw | | |
| BO2 | 膊bObi | 脖bObd | 鉑bOca | 柏bOda | 渤bOes | 泊bOea | 舶bOha | | |
| | 帛bOhb | 博bOji | 勃bOjs | 搏bOqi | 駁bOsk | 薄bOti | 荀bOtw | 皖bOhi | 磚bOmi |
| | 鉢bOcm | 荸bOtd | 李bOjd | 箔bOha | | | | | |
| BO3 | 簸bohi | 跛bore | | | | | | | |
| BO4 | 播Boqw | | | | | | | | |
| BU3 | 埔bugb | 補bulb | 哺burb | 卜buy | | | | | |
| BU4 | 埠Bugj | 簿Buhi | 布Bukb | 不Bumf | 佈Bupb | 捕Buqb | 部Buyl | 步Buyh | 佈buob |
| CA1 | 擦CAqf | 嚓CArf | 搽CAqd | | | | | | |
| CAI1 | 猜CTkb | | | | | | | | |
| CAI2 | 才cTdh | 財cTbh | 裁cTjv | 緞cTvi | 材cTdhC | | | | |
| CAI3 | 采ctbd | 踩ctbdC | 彩ctbhC | 採ctqd | 踩ctrd | | | | |
| CAI4 | 蔡Cttf | 菜Cttd | | | | | | | |
| CAN1 | 參CZih | 餐CZyv | | | | | | | |

| | | | | | | | | |
|---|---|---|---|---|---|---|---|---|
| CAN2 | 殘cZmi | 蠶cZmiC | 慚cZpl | | | | | |
| CAN3 | 慘czph | | | | | | | |
| CAN4 | 燦Czfd | 孱Czsd | 粲CzedC | 粲Czyd | | | | |
| CANG1 | 滄CGer | 艙CGhr | 倉CGor | 傖CGorC | 蒼CGtr | | | |
| CANG2 | 藏cGts | | | | | | | |
| CAO1 | 操CXqd | | | | | | | |
| CAO2 | 槽cXda | 漕cXea | 嘈cXra | 曹cXta | | | | |
| CAO3 | 草cxtj | 憔cxpd | | | | | | |
| CAO4 | 糙Cxfr | | | | | | | |
| CE1 | 測Ceen | 策Cehb | 側Ceon | 册Cebm | 惻Cepn | | | |
| CEN1 | 參CNih | | | | | | | |
| CENG2 | 曾cNca | 層cNsa | | | | | | |
| CENG4 | 蹭Cnra | | | | | | | |
| CHA1 | 叉CAei | 插CAqx | 嗒CArm | 差CAtm | 杈CAdi | | | |
| CHA2 | 查cAdm | 察cAjf | 茶cAtd | 茬cAtg | 揉cAqd | | | |
| CHA4 | 岔Cacu | 詫Cayp | 杈Cali | 汉CaeiC | | | | |
| CHAI1 | 釵CTci | 拆CTqy | 差CTtm | | | | | |
| CHAI2 | 豺cTbhC | 柴cTyd | 儕cTox | | | | | |
| CHAN1 | 攙CZqi | 摻CZqh | 覘CZyu | | | | | |
| CHAN2 | 潺cZed | 禪cZij | 蟬cZlj | 饞cZoi | 纏cZvg | 讒cZyi | 蟾cZlr | 嬋cZvj |
| CHAN3 | 闡czaj | 鏟czcm | 産czym | 謅czyx | 剷czyn | | | |
| CHAN4 | 懺Czpm | 顫Czyc | | | | | | |
| CHANG1 | 昌CGaa | 猖CGka | 倡CGoa | 倀CGov | 娼CGva | | | |
| CHANG2 | 腸cGbh | 裳cGfv | 常cGfb | 嘗cGfa | 場cGgh | 償cGoc | 嚐cGraC | 長cGsv | 腸cGvb |
| CHANG3 | 廠cgik | 敞cgfk | 氅cgfu | | | | | |
| CHANG4 | 暢Cglh | 悵Cgpv | 唱Cgra | | | | | |
| CHAO1 | 鈔CXch | 超CXgr | 抄CXqh | 綽CXvj | | | | |
| CHAO2 | 潮cXeb | 朝cXjb | 嘲cXrb | 巢cXvd | | | | |
| CHAO3 | 吵cxrh | 炒cxfh | | | | | | |
| CHE1 | 車CEjj | | | | | | | |
| CHE3 | 扯ceqm | | | | | | | |
| CHE4 | 澈Ceek | 掣Cehq | 徹Cehk | 撤Ceqk | 拆Ceqy | 轍Cejk | | |
| CHEN1 | 琛CNmd | 嗔CNrc | 郴CNdl | | | | | |
| CHEN2 | 晨cNav | 沉cNeu | 塵cNig | 辰cNmv | 陳cNnw | 忱cNpu | 臣cNsl | 橙cNdt |
| CHEN4 | 趁Cngh | 襯Cnlu | | | | | | |
| CHENG1 | 瞠CNbg | 稱CNhb | 撐CNqq | | | | | |
| CHENG2 | 澄cNet | 城cNgs | 程cNhg | 懲cNhp | 乘cNhpC | 成cNis | 承cNno | 丞cNnm | 呈cNrg |
| | 誠cNys | | | | | | | |
| CHENG3 | 騁cnss | 逞cnyg | | | | | | |
| CHENG4 | 秤Cnhj | | | | | | | |
| CHI1 | 痴CIkr | 嗤CIri | 吃CIrn | 癡CIko | | | | |
| CHI2 | 匙cIap | 池cIed | 弛cInd | 持cIqi | 踟cIrr | 馳cIsd | 遲cIyq | |
| CHI3 | 褫cilu | 侈cion | 恥cisp | 尺ciso | 齒ciyo | | | |
| CHI4 | 熾Cifa | 赤Cigc | 斥Cihy | 翅Cijm | 飭Cios | 叱Cirp | 敕Cidk | |
| CHONG1 | 沖CCel | 衝CChn | 充CCyu | 仲CCpl | 舂CCqx | 憧CCpg | 艟CChgC | |
| CHONG2 | 重cChg | 蟲cCli | 崇cCuf | | | | | |

| | | | | | | | | | |
|---|---|---|---|---|---|---|---|---|---|
| CHONG3 | 寵ccjp | | | | | | | | |
| CHONG4 | 銃Cccu | | | | | | | | |
| CHOU1 | 抽CDqw | | | | | | | | |
| CHOU2 | 簍cDhi | 稠cDhr | 愁cDhp | 酬cDml | 仇cDon | 倜cDpr | 躊cDri | 綢cDvr | 疇cDwi | |
| | 讎cDog | | | | | | | | |
| CHOU3 | 醜cdmi | 丑cdng | 瞅cdbf | | | | | | |
| CHOU4 | 臭Cdhk | | | | | | | | |
| CHU1 | 初CUlh | 出CUuu | 齣CUyr | | | | | | |
| CHU2 | 鋤cUcs | 樹cUdi | 除cUnd | 儲cUoa | 雛cUpg | 芻cUpu | 躇cUra | 躕cUri | 廚cUii | |
| CHU3 | 楚cudo | 杵cudj | 礎cumo | 處cuyn | | | | | |
| CHU4 | 觸Cuni | 怵Cupc | 絀Cuvu | 黜Cuwu | 畜Cuyw | 搐Cuqw | 畺Cujm | | |
| CHUAI3 | 揣cyqb | 惴cypb | | | | | | | |
| CHUAN1 | 穿CHjh | 川CH1lC | | | | | | | |
| CHUAN2 | 船cHhr | 傳cHoi | | | | | | | |
| CHUAN3 | 舛chnq | 喘chrb | | | | | | | |
| CHUAN4 | 串Chll | | | | | | | | |
| CHUANG1 | 窗CWjk | 瘡CWkr | | | | | | | |
| CHUANG2 | 床cWid | 撞cWqg | 幢cWlg | | | | | | |
| CHUANG3 | 闖cwaf | | | | | | | | |
| CHUANG4 | 創Cwon | 愴Cwpr | | | | | | | |
| CHUI1 | 炊CQfo | 吹CQro | | | | | | | |
| CHUI2 | 錘cQcm | 槌cQdr | 垂cQhm | 陲cQnm | 搥cQqm | 鎚cQcr | 捶cQqr | | |
| CHUN1 | 春CKqa | 椿CKda | | | | | | | |
| CHUN2 | 淳cKed | 醇cKmd | 唇cKmr | 純cKvu | | | | | |
| CHUN3 | 蠢ckqi | | | | | | | | |
| CHUO1 | 戳COsi | | | | | | | | |
| CHUO4 | 輟Coje | 啜Core | 綽Covj | 艇Coyo | | | | | |
| CI1 | 疵CIkp | 雌CIyg | 差CItm | | | | | | |
| CI2 | 辭cIbj | 祠cIir | 瓷cIin | 磁cImi | 慈cItp | 詞cIyr | 茨cIto | 鶿cIfi | |
| CI3 | 此ciyp | | | | | | | | |
| CI4 | 賜Cibh | 刺Cidn | 次Ciio | 廁CiinC | 伺Cior | | | | |
| CONG1 | 囪CChk | 匆CCpk | 聰CCsp | 蔥CCtp | 傯CCop | | | | |
| CONG2 | 淙cCef | 從cCho | 叢cCte | | | | | | |
| COU4 | 湊Cdek | | | | | | | | |
| CU1 | 粗CUfm | | | | | | | | |
| CU2 | 殂cUmm | | | | | | | | |
| CU4 | 簇Cuhk | 蹙Cuio | 醋Cuma | 促Cuoo | 蹴Curu | | | | |
| CUAN4 | 篡Chhi | 竄Chjv | 蹿Czrv | | | | | | |
| CUI1 | 催CQog | 摧CQqg | 崔CQug | | | | | | |
| CUI4 | 脆Cqbu | 粹Cqfj | 瘁Cqkj | 悴Cqpj | 翠Cqsj | 萃Cqtj | 猝CqkjC | 淬Cqej | |
| CUN1 | 村CKdiC | | | | | | | | |
| CUN2 | 存cKkd | | | | | | | | |
| CUN3 | 忖ckpi | | | | | | | | |
| CUN4 | 寸Ckdi | 吋Ckri | | | | | | | |
| CUO1 | 磋COmm | 撮COqe | 搓COqm | 蹉COrm | 縒COvm | | | | |
| CUO2 | 痤cOkg | | | | | | | | |

| | | | | | | | | |
|---|---|---|---|---|---|---|---|---|
| CUO4 | 錯Coca | 措Coqa | 挫Coqg | 銼Cocg | | | | |
| DA1 | 瘩DAkr | 答DAhr | 搭DAqr | 耷DAkj | 噠DArq | | | |
| DA2 | 韃dAtq | 靼dAtm | 達dAyq | | | | | |
| DA3 | 打daqn | | | | | | | |
| DA4 | 大DAk | | | | | | | |
| DAI1 | 呆DTrd | 獃DTuk | | | | | | |
| DAI3 | 歹dtmi | 逮dtye | | | | | | |
| DAI4 | 待Dthi | 戴Dtjc | 帶Dtkb | 殆Dtmr | 黛Dtof | 袋Dtov | 代Dtop | 貸Dtoc | 怠Dtip |
| DAN1 | 丹DZby | 擔DZqr | 單DZrj | 耽DZsu | 眈DZbu | 殫DZmj | 鄲DZrl | | |
| DAN3 | 膽dzbr | 撣dzqj | | | | | | |
| DAN4 | 旦Dzam | 澹Dzer | 蛋Dzni | 彈Dznj | 氮Dzof | 但Dzom | 憚Dzpj | 啖Dzrf | 誕Dzym |
| | 淡Dzef | 石Dzmr | | | | | | |
| DANG1 | 鐺DGcw | 當DGfw | 襠DGlw | 噹DGrw | | | | |
| DANG3 | 檔dgdw | 黨dgff | 擋dgqw | 襠dglw | | | | |
| DANG4 | 蕩Dgth | 盪Dget | 氹Dgne | | | | | |
| DAO1 | 叨DXrh | 刀DXsh | | | | | | |
| DAO3 | 倒dxon | 島dxhu | 禱dxii | 搗dxqu | 導dxyi | 蹈dxrx | | |
| DAO4 | 盜Dxet | 稻Dxhx | 到Dxmn | 悼Dxpj | 道Dxyu | | | |
| DE2 | 德dEhp | 得dEhi | | | | | | |
| DEN4 | 扽Dnqu | | | | | | | |
| DENG1 | 登DNnt | 燈DNft | 蹬DNrt | 鐙DNct | | | | |
| DENG3 | 等dnhi | 戥dnai | | | | | | |
| DENG4 | 瞪Dnbt | 澄Dnet | 鄧Dnnl | 凳Dnnn | 磴Dnmt | | | |
| DI1 | 滴DIeb | 低DIom | | | | | | |
| DI2 | 滌dIed | 笛dIhw | 的dIhi | 狄dIkf | 嫡dIvbC | 迪dIyw | 敵dIyk | 嘀dIrb | |
| DI3 | 底diim | 砥dimm | 抵diqm | 邸dihl | 詆diym | 骶dibm | | |
| DI4 | 弟Dich | 棣Dide | 地Digd | 第Dihh | 蒂Ditb | 締Divb | 遞Diyu | 諦DiybC | 帝Diyb |
| DIAN1 | 滇DPec | 顛DPjc | 巔DPkc | 癲DPuc | 跕DPrr | | | |
| DIAN3 | 碘dpmc | 典dptc | 點dpwr | | | | | |
| DIAN4 | 澱Dpee | 墊Dpgg | 店Dpir | 電Dpmu | 坫Dpmr | 佃Dpow | 甸Dppw | 惦Dppr | 殿Dpse |
| | 奠Dptk | 淀Dpeo | 靛Dpke | 靛Dpqo | 掂Dpqr | | | |
| DIAO1 | 雕DSbg | 貂DSbr | 凋DSir | 碉DSmr | 叼DSrm | 刁DSsm | 彫DSbh | | |
| DIAO4 | 釣Dsci | 掉Dsqj | 吊Dsrb | 弔Dsnl | 調Dsyr | | | |
| DIE1 | 爹DMcn | 跌DMro | | | | | | |
| DIE2 | 蝶dMld | 疊dMwm | 牒dMldC | 碟dMmd | 迭dMyo | 喋dMrd | 諜dMyd | 盍dMjg | |
| DING1 | 叮DJbn | 釘DJcn | 丁DJmn | 酊DJmnC | 仃DJon | 叮DJrn | 疔DJkn | 町DJwn | 耵DJsn |
| DING3 | 鼎djbl | 頂djmc | 濎djel | | | | | |
| DING4 | 釘Djcn | 定Djjo | 訂Djyn | 錠Djco | | | | |
| DIU1 | 丟DQhi | | | | | | | |
| DONG1 | 東DCdw | 冬DChy | 咚DCry | 氡DCoy | | | | |
| DONG3 | 懂dcpg | 董dctg | | | | | | |
| DONG4 | 胴Dcbr | 棟DcdwC | 洞Dcer | 動Dchs | 凍Dciw | 恫Dcpr | | |
| DOU1 | 兜DDhu | 都DDjl | | | | | | |
| DOU3 | 蚪ddlj | 陡ddno | 抖ddqi | 斗ddyj | | | | |
| DOU4 | 竇Ddjc | 痘Ddkt | 鬥Ddln | 豆Ddmt | 逗Ddyt | | | |
| DU1 | 都DUjl | 嘟DUrl | 督DUyu | | | | | |

| | | | | | | | | |
|---|---|---|---|---|---|---|---|---|
| DU2 | 瀆dUec | 犢dUHC | 獨dUKI | 牘dUlc | 毒dUqi | 髑dUwc | 讀dUyc | |
| DU3 | 睹duba | 肚dubg | 賭dubaC | 堵duga | 篤duhf | | | |
| DU4 | 鍍Duce | 杜Dudg | 度Duie | 蠹Duji | 渡Duee | 妒Duvs | | |
| DUAN1 | 端DHyb | | | | | | | |
| DUAN3 | 短dhot | | | | | | | |
| DUAN4 | 鍛Dhce | 段Dhhe | 緞Dhve | 斷Dhvl | 煅Dhfe | | | |
| DUI1 | 堆DQgg | | | | | | | |
| DUI4 | 兌Dqcu | 隊Dqno | 對Dqti | | | | | |
| DUN1 | 燉DKfk | 蹲DKri | 敦DKyk | 噸DKrc | | | | |
| DUN4 | 盹Dkbu | 鈍Dkcu | 沌Dkeu | 盾Dkhu | 頓Dkpc | 囤Dkwu | 遁Dkyu | 磴Dkmk |
| DUO1 | 多DOni | 咄DOru | 哆DOrn | | | | | |
| DUO2 | 奪dOki | | | | | | | |
| DUO3 | 躲dohd | 朵dohdC | 垛dogd | | | | | |
| DUO4 | 舵Dohp | 惰Dopb | 跺Dore | 墮Dong | 剁Dohn | 跥Dord | | |
| E2 | 額eEjc | 蛾eEli | 俄eEoi | 訛eEyp | 娥eEvi | 鵝eEhf | 峨eEui | 鱷eEnr |
| E3 | 惡eemp | 噁eerp | | | | | | |
| E4 | 軛Eeju | 噩Eemr | 餓EeoiC | 愕Eeps | 扼Eequ | 顎Eerc | 鄂Eerl | 呃Eeru | 遏Eeyv |
| | 厄Eemu | 哦Eeri | | | | | | |
| EN1 | 恩ENwp | | | | | | | |
| EN3 | 嗯enrp | | | | | | | |
| ER2 | 兒eRhu | 而eRml | | | | | | |
| ER3 | 爾ermk | 餌eroj | 耳ersj | 邇eryb | | | | |
| ER4 | 貳Eric | 二Ermm | | | | | | |
| FA1 | 法FAei | 發FAne | 伐FAoi | | | | | |
| FA2 | 閥fAai | 筏fAhi | 乏fAho | 罰fAwn | 砝fAmi | | | |
| FA3 | 髮fask | | | | | | | |
| FAN1 | 翻FZhm | 番FZhw | 帆FZli | 幡FZlw | 蕃FZtw | 藩FZtw | | |
| FAN2 | 礬fZdr | 樊fZdk | 煩fZfc | 凡fZhi | 繁fZof | | | |
| FAN3 | 反fzhe | 返fzye | | | | | | |
| FAN4 | 梵Fzdi | 販Fzbe | 泛Fzeo | 氾Fzeu | 範Fzhu | 犯Fzku | 飯Fzoe | 范Fztu | 汎Fzei |
| FANG1 | 坊FGgs | 芳FGts | 方FGys | | | | | |
| FANG2 | 房fGhs | 防fGns | 妨fGvs | | | | | |
| FANG3 | 彷fghsC | 仿fgos | 紡fgvsC | 訪fgysC | 舫fgbs | | | |
| FANG4 | 放Fgyk | | | | | | | |
| FEI1 | 扉FFhy | 非FFly | 霏FFmy | 飛FFno | 啡FFry | 菲FFty | 妃FFvu | 緋FFvy | 蜚FFli |
| FEI2 | 肥fFbu | | | | | | | |
| FEI3 | 翡fflm | 匪ffsy | 誹ffyy | 榧ffdy | 蜚ffli | 腓ffby | | | |
| FEI4 | 肺Ffbb | 沸Ffen | 廢Ffie | 痱Ffky | 費Fflc | 吠Ffrk | 狒Ffkn | | |
| FEN1 | 分FNch | 氛FNohc | 吩FNrh | 芬FNth | 紛FNvh | | | |
| FEN2 | 焚fNdf | 汾fNeh | 墳fNgc | | | | | |
| FEN3 | 粉fnvh | | | | | | | |
| FEN4 | 忿Fncp | 糞Fnfc | 奮Fnkw | 份Fnoh | 憤Fnpc | 噴Fnrc | | |
| FENG1 | 鋒FNcj | 楓FNdi | 烽FNfj | 封FNgi | 風FNhi | 瘋FNki | 蜂FNlj | 豐FNut | 峰FNuj |
| FENG2 | 馮fNif | 縫fNvj | 逢fNyj | | | | | |
| FENG3 | 諷fnyi | | | | | | | |
| FENG4 | 鳳Fnhf | 俸Fnoq | 奉Fnqq | | | | | |

| | | | | | | | | |
|---|---|---|---|---|---|---|---|---|
| FOU2 | 浮fDed | | | | | | | |
| FOU3 | 否fdmr | | | | | | | |
| FU1 | 孵FUhd | 敷FUik | 麩FUjo | 伕FUoo | 夫FUqo | 膚FUyb | | |
| FU2 | 服fUbe | 孚fUbd | 浮fUed | 符fUhi | 彿fUhn | 福fUiw | 輻fUjwC | 袱fUlk | 幅fUlw |
| | 蝠fUlwC | 氟fUonC | 俘fUod | 佛fUon | 伏fUok | 匐fUpw | 扶fUqoC | 芙fUto | |
| | 苻fUtd | 拂fUqn | | | | | | |
| FU3 | 腑fubi | 斧fucl | 腐fuib | 甫fuibC | 府fuii | 輔fujb | 俯fuoiC | 撫fuqf | 脯fubb |
| | 釜fucc | | | | | | | |
| FU4 | 賦Fubm | 腹FubeC | 阜Fuhj | 赴Fugy | 復Fuhe | 富Fujw | 複Fule | 覆Fume | 副Fumn |
| | 附Funi | 負Func | 傅FuoiC | 付Fuoi | 咐Furi | 駙Fusi | 婦Fuvb | 訃Fuyy | 父Fuck |
| | 縛Fuvi | | | | | | | |
| GA1 | 嘎GAri | | | | | | | |
| GA2 | 軋gAju | | | | | | | |
| GA4 | 尬Gakl | | | | | | | |
| GAI1 | 賅GTbo | 該GTyo | 垓GTgo | | | | | |
| GAI3 | 改GTsk | | | | | | | |
| GAI4 | 鈣GTcs | 概GTdu | 溉GTeu | 丐GTms | 蓋GTtt | 芥GTtl | | |
| GAN1 | 肝GZbj | 柑GZdm | 竿GZhj | 乾GZjn | 疳GZkm | 尷GZkt | 干GZmj | 甘GZtm | |
| GAN3 | 橄gzdk | 桿gzdj | 趕gzgj | 敢gzmk | 感gzip | | | |
| GAN4 | 幹Gzjj | 贛Gzyc | 紺Gzvm | | | | | |
| GANG1 | 岡GGbu | 剛GGbn | 鋼GGcu | 缸GGom | 扛GGqm | 綱GGvu | 肛GGbm | 崗GGuu | |
| | 杠GGdm | 慷GGyp | | | | | | |
| GANG3 | 港ggeu | | | | | | | |
| GANG4 | 槓Ggdc | | | | | | | |
| GAO1 | 糕GXff | 篙GXhbC | 羔GXtf | 睪GXwj | 高GXyr | 膏GXyb | 皋GXhj | | |
| GAO2 | 窖Jxjr | | | | | | | |
| GAO3 | 搞gxqb | 稿gxhb | 攪gxqu | 鎬gxcb | | | | |
| GAO4 | 告Gxhr | 誥GxyrC | | | | | | |
| GE1 | 胳GEbr | 戈GEi | 割GEjn | 疙GEkn | 哥GEmr | 鴿GEof | 擱GEqr | 歌GEmo | |
| GE2 | 閣gEar | 膈gEbb | 格gEdr | 各gEhr | 隔gEnb | 革gEtj | 葛gEtv | 喝gErb | 骼gEbrc |
| GE3 | 胴gehrC | 咯gerr | | | | | | |
| GE4 | 個Geor | 鉻Gecr | | | | | | |
| GEI3 | 給 | | | | | | | |
| GEN1 | 根GNdv | 跟GNrv | | | | | | |
| GEN4 | 亙Gnmm | | | | | | | |
| GENG1 | 庚GNio | 更GNmk | 耕GNqt | 羹GNtk | | | | |
| GENG3 | 梗gndk | 耿gnsf | 哽gnrk | | | | | |
| GONG1 | 肱GCbi | 功GCms | 公GCci | 躬GChn | 宮GCjr | 蚣GCli | 攻GCmk | 工GCmm | 弓GCn |
| | 供GCoc | 恭GCtp | 共GCtc | 襲GCyc | 觥GCnu | | | |
| GONG3 | 鞏gcmj | 汞gcme | 拱gcqc | | | | | |
| GONG4 | 貢Gcmc | | | | | | | |
| GOU1 | 鉤GDcr | 溝GDeb | 勾GDpi | 篝GDhb | 佝GDor | | | |
| GOU3 | 狗gdkr | 苟gdtr | 枸gddr | | | | | |
| GOU4 | 購Gdbb | 構Gddb | 垢Gdgr | 夠Gdnr | 媾Gdvb | 詬Gdyr | 垢Gdvr | | |
| GU1 | 鴣GUjf | 辜GUjj | 姑GUlr | 孤GUno | 估GUor | 咕GUrr | 姑GUvr | 菇GUtr | 沽GUer |
| GU2 | 骨gUbb | 箍gUhb | | | | | | |

| | | | | | | | | |
|---|---|---|---|---|---|---|---|---|
| GU3 | 股gube | 凸gubs | 鈷gucrC | 谷gucr | 鼓guge | 穀gugeC | 瞽gugu | 古gujr |
| | 蠱gult | 賈gumc | 詁guyr | | | | | |
| GU4 | 顧Guhc | 雇Guhg | 故Gujk | 僱Guog | 固Guwr | 過Guir | 梏Gudr | 痼Gukr |
| GUA1 | 颳GBhr | 瓜GBho | 刮GBhn | 括GBqr | 呱GBro | | | |
| GUQ3 | 寡gbjh | 剐gbbn | | | | | | |
| GUA4 | 卦Gbgy | 掛Gbqy | 褂Gbly | 挂Gbqg | | | | |
| GUAI1 | 乖GYhp | | | | | | | |
| GUAI3 | 拐gyqh | 枴gydh | | | | | | |
| GUAI4 | 怪Gypg | | | | | | | |
| GUAN1 | 關GHat | 冠GHbi | 棺GHdr | 官GHjr | 鰥GHne | 倌GHorC | 觀GHtu | |
| GUAN3 | 管ghhr | 館ghor | 莞ghtuC | | | | | |
| GUAN4 | 灌Gheg | 盥Ghht | 罐Ghog | 慣Ghpc | 貫Ghwc | | | |
| GUANG1 | 胱GWbu | 光GWfu | | | | | | |
| GUANG3 | 廣gwic | 獷gwkc | | | | | | |
| GUANG4 | 逛Gwyg | | | | | | | |
| GUI1 | 閨GQag | 圭GQgg | 皈GQhe | 歸GQhb | 龜GQnu | 瑰GQmi | 傀GQoi | 規GQqu | 硅Gqmg |
| GUI3 | 鬼gqhi | 軌gqjn | 癸gqnk | 詭gqyu | | | | |
| GUI4 | 櫃Gqdc | 桂Gqdg | 貴Gqlc | 跪Gqru | 劊Gqon | 膾Gqba | | |
| GUN3 | 滾gkev | 袞gkyv | | | | | | |
| GUN4 | 棍Gkdp | 輥Gkjp | | | | | | |
| GUO1 | 鍋GOcr | 過GOer | 郭GOyl | 蟈GOlmC | 喐GOrm | | | |
| GUO2 | 幗gOlm | 摑gOqm | 國gOwm | | | | | |
| GUO3 | 果gowd | 裹goyv | | | | | | |
| GUO4 | 過Goyr | | | | | | | |
| HA1 | 哈HArr | | | | | | | |
| HA2 | 蛤hAIr | | | | | | | |
| HAI1 | 嗨HTry | | | | | | | |
| HAI2 | 骸hTbo | 孩hTno | 頦hTyc | | | | | |
| HAI3 | 海htey | | | | | | | |
| HAI4 | 害Htjr | 氦Htoo | 咳Htro | 駭Htso | 亥Htyo | | | |
| HAN1 | 鼾HZhj | 酣HZmm | 憨HZmp | 頇HZmc | | | | |
| HAN2 | 涵hZee | 寒hZjy | 函hZue | 含hZor | 韓hZjq | 頷hZoc | | |
| HAN3 | 罕hzjj | 喊jzrr | 捍hzqj | | | | | |
| HAN4 | 旱Hzaj | 瀚Hzem | 漢Hzeo | 汗Hzej | 翰Hzjm | 憾Hzpp | 悍Hzpj | 撼Hzqp |
| | 焊Hzfj | | | | | | | |
| HANG1 | 夯HGks | | | | | | | |
| HANG2 | 杭hGdn | 行hGhn | 航hGhnC | 沆hGen | | | | |
| HANG4 | 巷Hgtu | | | | | | | |
| HAO1 | 蒿HXtb | | | | | | | |
| HAO2 | 濠hXeo | 壕hXgo | 嚎hXro | 毫hXyu | 豪hXyo | | | |
| HAO3 | 好hxvd | 郝hxgl | | | | | | |
| HAO4 | 浩Hxer | 皓Hxhr | 涸HxerC | 耗hxqu | 號hxru | | | |
| HE1 | 喝HErv | 呵HErr | | | | | | |
| HE2 | 闔hEat | 閤hEar | 曷hEav | 貉hEbr | 核hEdo | 河hEer | 盍hEgt | 禾hEhd | 和hEhr |
| | 褐hElv | 盒hEot | 合hEorC | 荷hEtr | 劾hEys | 頜hEoc | 何hEor | 劾hEys | 閡hEao |
| HE4 | 赫Hegc | 賀Hekc | 鶴Heof | 嚇Herc | 喝Herv | 壑Heyg | | |
| HEI1 | 黑HFwf | 嘿HFrf | | | | | | |

| | | | | | | | | | |
|---|---|---|---|---|---|---|---|---|---|
| HEN2 | 痕hNkv | | | | | | | | |
| HEN3 | 很hnhv | 狠hnkvC | | | | | | | |
| HEN4 | 恨Hnpv | | | | | | | | |
| HENG1 | 哼HNrn | 亨HNyn | | | | | | | |
| HENG2 | 橫hNdc | 衡hNhn | 恆hNpm | 諻hNyg | | | | | |
| HONG1 | 烘HCfc | 轟HCjj | | | | | | | |
| HONG2 | 洪hCec | 宏 hCji | 虹hClm | 紅hCvm | 鴻hCef | 泓hCei | 弘hCni | 訌hCym | 肱hCbi |
| HONG3 | 哄hcrc | | | | | | | | |
| HOU2 | 猴hDkk | 候hDok | 喉hDrk | | | | | | |
| HOU3 | 吼hdru | | | | | | | | |
| HOU4 | 後Hdhe | 后Hdhr | 厚Hdmd | 逅Hdyr | | | | | |
| HU1 | 乎HUhd | 忽HUpp | 呼HUrd | | | | | | |
| HU2 | 湖hUeb | 糊hUrb | 壺hUgm | 胡hUjb | 狐hUko | 蝴hUlb | 瑚hUmb | 弧hUno | 囫hUsb |
| | 囫hUwh | 猢hUkb | 甜hUtb | | | | | | |
| HU3 | 琥humu | 虎huyu | 許huej | 唬huru | | | | | |
| HU4 | 滬Hueu | 護Huye | 戶Huhs | 互Humm | | | | | |
| HUA1 | 嘩HBrj | 花HBtp | | | | | | | |
| HUA2 | 滑hBeb | 猾hBkb | 譁hByj | 華hBtj | 樺hBdj | | | | |
| HUA4 | 畫Hblm | 劃Hbln | 化Hbop | 話Hbyr | | | | | |
| HUAI2 | 掊hYdi | 淮hYeg | 徊hYhr | 懷hYpv | 踝hYrd | | | | |
| HUAI4 | 壞Hygv | | | | | | | | |
| HUAN1 | 歡HHto | | | | | | | | |
| HUAN2 | 桓hHdm | 環hHmv | 還hHyv | 寰hHjv | 鬟hHsv | | | | |
| HUAN3 | 緩hhve | | | | | | | | |
| HUAN4 | 渙Hhek | 豢Hhfo | 煥Hhfk | 宦Hhjl | 瘓Hhkk | 患Hhlp | 換Hhqk | 喚Hhrk | 幻Hhvs |
| | 浣Hheu | | | | | | | | |
| HUANG1 | 慌HWpu | 荒HWtu | 肓HWyb | | | | | | |
| HUANG2 | 煌hWfg | 簧hWhc | 皇hWhg | 徨hWhgC | 凰hWhgC | 蝗hWlg | 磺hWmc | 隍hWng | 惶hWpg |
| | 黃hWtc | 遑hWyg | 璜hWmcC | | | | | | |
| HUANG3 | 晃hwau | 幌hwlu | 謊hwyu | 恍hwpuC | | | | | |
| HUI1 | 暉HQaj | 輝HQfj | 徽HQhk | 麾HQiu | 灰HQkf | 揮HQqj | 恢HQpf | 詼HQyf | |
| HUI2 | 蛔hQlr | 茴hQtr | 回hQwr | 迴hQyr | | | | | |
| HUI3 | 賄hqbb | 燬hqfe | 毀hqhe | 悔hqpy | 誨hqyy | 譭hqye | | | |
| HUI4 | 晦Hqay | 檜Hqfa | 穢Hqhh | 惠Hqjp | 會Hqoa | 匯Hqsg | 慧Hqqp | 卉Hqjt | 彗Hqqm |
| | 繪Hqva | 彙Hqvd | 蕙Hqtp | 諱Hqyq | | | | | |
| HUN1 | 昏HKha | 葷HKtj | 婚HKva | | | | | | |
| HUN2 | 渾hKej | 混hKep | 魂hKmi | 餛hKop | | | | | |
| HUN4 | 諢Hkyj | | | | | | | | |
| HUO1 | 豁HOjr | | | | | | | | |
| HUO2 | 活hOer | | | | | | | | |
| HUO3 | 火hof | 伙hoof | 夥hown | | | | | | |
| HUO4 | 禍Hoir | 或Hoim | 惑Hoip | 獲hoke | 霍Homg | 貨Hooc | 鋜Hoyg | 豁Hojr | |
| JI1 | 雞JIbg | 肌JIbn | 機JIdi | 激JIek | 箕JIhcC | 積JIhc | 稽JIha | 犄JIhr | 奇JIkr |
| | 磯JImi | 饑JIoi | 跡JIrc | 嘰JIri | 唧JIrl | 基JItg | 姬JIvl | 羈JIwf | 畸JIwr |
| | 屐JIse | 乩JIyuC | 譏JIyi | 蹟JIrcC | 齏JIrx | 績JIvc | 緝JIvj | 箕JIhcC | 輯JIjj |
| | 羈JIwf | 畿JIvw | | | | | | | |

| | | | | | | | | | |
|---|---|---|---|---|---|---|---|---|---|
| JI2 | 楫jIdj | 極jIdm | 棘jIdb | 汲jIee | 脊jIfb | 圾jIge | 吉jIgr | 籍jIhaC | 輯jIjj |
| | 擊jIjq | 寂jIje | 瘠jIkb | 疾jIkk | 急jInp | 及jIne | 集jIod | 炱jIue | 藉jIta |
| | 級jIve | 嫉jIvk | 殛jImm | 笈jIheC | 即jIal | 稷jIhe | 戢jIriC | 炱jIue | |
| JI3 | 脊jifb | 戟jiji | 擠jiqx | 己jisu | 給jivr | 幾jivi | 紀jivu | | |
| JI4 | 暨Jiam | 既Jiau | 祭Jibf | 濟Jiex | 稷Jihe | 季Jihd | 寄Jijr | 冀Jilc | 鯽Jinl |
| | 際Jinf | 悸Jipd | 技Jiqe | 忌Jisp | 覬Jiuu | 驥Jisc | 繼JiviC | 妓JiveC | 記Jiyu |
| | 計Jiyj | 劑Jiyn | 際Jinf | 伎Jioe | | | | | |
| JIA1 | 家JAjo | 袈JAkv | 夾JAko | 加JAkr | 傢JAoo | 佳JAog | 嘉JAgr | 迦JAyr | 珈JAkrC |
| | 枷JAdr | 茄JAtr | 戛JAmi | | | | | | |
| JIA2 | 頰jAkc | 挾jAqo | 莢jAto | | | | | | |
| JIA3 | 胛jabl | 鉀jacl | 賈jamc | 假jaoe | 岬jaul | 甲jawl | | | |
| JIA4 | 稼Jaho | 駕Jakf | 架Jakd | 價Jaoc | 嫁javo | | | | |
| JIAN1 | 尖DZfk | 肩JZhb | 箋JZhi | 殲JZmm | 堅JZsg | 菅JZtr | 艱JZtv | 煎JZtfC | 兼JZtc |
| | 緘JZvr | 姦JZvv | 奸JZvj | 賤JZli | | | | | |
| JIAN3 | 檢jzdo | 柬jzdf | 減jzer | 簡jzha | 儉jzoo | 撿jzqo | 繭jzti | 剪jzth | 鹼jzyo |
| | 瞼jzbo | 鐧jzca | 梾jzdf | 揀jzqf | | | | | |
| JIAN4 | 間Jzaa | 賤Jzbi | 見Jzbu | 腱Jzbq | 鑑Jzct | 鍵Jzcq | 檻Jzdt | 濺Jzei | 漸Jzel |
| | 澗Jzea | 艦Jzht | 箭Jzhn | 毽Jzhq | 建Jznq | 餞Jzoi | 劍jzon | 儉Jzoo | 僭Jzoa |
| | 健JzoqC | 件jzoq | 踐Jzri | 鑒Jzsc | 監Jzst | 諫Jzyf | 薦Jztf | | |
| JIANG1 | 江JGem | 疆JGnm | 薑JGtm | 姜JGtv | 漿JGve | 將JGvi | 礓JGmm | 僵JGom | |
| JIANG3 | 蔣jgti | 獎jgvk | 槳jgvd | 講jgyb | | | | | |
| JIANG4 | 匠Jgsl | 降Jgnq | 醬Jgvw | 絳Jgvq | | | | | |
| JIAO1 | 膠JXbh | 椒JXde | 澆JXeu | 較JX1k | 礁JXmf | 焦JXof | 驕JXsb | 蕉JXtf | 嬌JXvb |
| | 郊JXyl | 交JXyk | 跤JXrk | 狡JXvkC | 郊JXyl | | | | |
| JIAO2 | 嚼jXrk | 覺jXhu | | | | | | | |
| JIAO3 | 腳jxbl | 鉸jxck | 皎jxhk | 狡jxkk | 角jxng | 餃jxok | 矯jxob | 鐃jxou | 攪jxqu |
| | 絞jxvkC | 剿jxvn | 佼jxokC | 徼jxvk | | | | | |
| JIAO4 | 轎Jxjb | 較JxjkC | 教Jxjk | 叫Jxrl | 醮Jxmd | | | | |
| JIE1 | 街JEhn | 階JEna | 皆JEpa | 揭JEqvC | 接JEqv | 嗟JErm | 結JEvr | 節JEhl | 癤JEkl |
| JIE2 | 睫jEbo | 櫛jEdl | 杰jEdf | 潔jEef | 頡jEgc | 截jEig | 桀jEnd | 孑jEnm | 傑jEod |
| | 捷jEqo | 拮jEqr | 劫jEgs | 竭jEyv | 詰jEyr | | | | |
| JIE3 | 解jenq | 姐jevm | | | | | | | |
| JIE4 | 械Jedt | 戒Jeit | 疥JeklC | 借Jeoa | 介Jeol | 屆Jesg | 藉Jeta | 芥Jetl | 界Jewl |
| | 誡Jeyt | | | | | | | | |
| JIN1 | 金JNc | 津JNeq | 筋JNhs | 斤JNhl | 襟JN1f | 矜JNnn | 今JNon | 巾JN1b | |
| JIN3 | 錦jncb | 僅jnom | 緊jnsf | 覲jntu | 謹jnym | 饉jnomC | | | |
| JIN4 | 禁Jndf | 浸Jnee | 盡Jnlt | 晉Jnma | 勁Jnms | 儘Jnot | 噤Jnrf | 進Jnyg | 近Jnyl |
| | 燼Jnft | | | | | | | | |
| JING1 | 晶JNaa | 睛JNbb | 涇JNem | 精JNfb | 兢JNju | 鯨JNnf | 驚JNtf | 菁JNtb | 莖JNtm |
| | 荊JNtn | 經JNvm | 旌JNymC | 京JNyf | 粳Jnfk | | | | |
| JING3 | 景jnaf | 頸jnmc | 憬jnpf | 警jntr | 井jntt | 儆jnok | | | |
| JING4 | 鏡Jncu | 淨Jned | 境Jngu | 徑Jnhm | 靜Jnqd | 敬Jntk | 竟Jnyu | 靖Jnyb | 逕JnymC |
| | 競JnyuC | 痙Jnkm | | | | | | | |
| JIONG3 | 窘jcjr | 炯jcfr | 迥jcyr | | | | | | |
| JIU1 | 鳩JDkf | 揪JDqf | 啾JDrf | 糾JDvl | 赳JDgl | | | | |
| JIU3 | 酒jdew | 九jdkn | 韭jdlm | 灸jdnf | 玖jdmo | 久jdno | | | |

| | | | | | | | | | |
|---|---|---|---|---|---|---|---|---|---|
| JIU4 | 枢Jddo | 舅Jdhs | 臼Jdhx | 咎Jdhr | 救Jdik | 究JDjn | 疚Jdko | 舊Jdtx | 就Jdyu |
| | 厩Jdiu | | | | | | | | |
| JU1 | 沮JVem | 狙JVkm | 疽JVkmC | 蛆JVlm | 俱JVoc | 拘JVqr | 駒JVsrC | 居JVsrC | |
| | 掬JVqd | 鞠JVtd | | | | | | | |
| JU2 | 橘jVdb | 局jVsr | 菊jVtdC | | | | | | |
| JU3 | 舉jvhq | 矩jvos | 齟jvym | 咀jvrm | | | | | |
| JU4 | 巨Jvss | 具Jvbc | 鋸Jvcr | 炬Jvfs | 颶Jvhc | 俱Jvoc | 懼Jvpg | 句Jvpr | 據Jvqo |
| | 拒Jvqs | 距Jvrs | 聚Jvso | 劇Jvyn | 苣Jvts | 遽Jvyo | 鉅Jvcs | 詎Jvys | 踞Jvrr |
| JUAN1 | 涓JHeb | 捐JHqb | 娟JHvb | 鵑JHrf | | | | | |
| JUAN3 | 捲jhqu | | | | | | | | |
| JUAN4 | 卷Jhfu | 眷JhfuC | 雋Jhos | 倦Jhou | 絹JhvbC | | | | |
| JUE1 | 蹶JLro | 撅JLqo | | | | | | | |
| JUE2 | 腳jLbl | 爵jLbi | 決jLek | 覺jLhu | 獗jLko | 厥jLmo | 了jLno | 倔jLou | 攫jLqe |
| | 掘jLqu | 抉jLqk | 喝jLri | 嚼jLroC | 絕jLvu | 訣jLyk | 譎jLyb | 崛jLuu | |
| JUN1 | 軍JKbj | 鈞JKcm | 均JKgm | 君JKsr | 皸JKbe | | | | |
| JUN4 | 濬Jkeu | 俊Jkoe | 駿Jkse | 郡Jksl | 菌Jktd | 峻Jkue | 竣Jkye | | |
| KA1 | 咖KArr | | | | | | | | |
| KA3 | 卡kayy | | | | | | | | |
| KA4 | 骼Kabr | | | | | | | | |
| KAI1 | 開KTat | 揩KTqa | | | | | | | |
| KAI3 | 楷ktda | 凱ktun | 剴ktunC | 概ktpu | 愷ktpt | | | | |
| KAI4 | 愾Ktpd | | | | | | | | |
| KAN1 | 堪KZgv | 刊KZmn | 戡KZti | 勘KZts | 龕KZop | | | | |
| KAN3 | 檻kzdt | 坎kzgo | 砍kzmo | 侃kzou | | | | | |
| KAN4 | 看Kzhu | 崁Kzuo | 瞰Kzbk | | | | | | |
| KANG1 | 糠KGfe | 康KGie | 慷KGpe | | | | | | |
| KANG4 | 坑Kgfn | 伉Kgon | 抗kgqn | 亢kgyn | 扛Kgqm | | | | |
| KAO3 | 烤kxfs | 考kxjs | 拷kxqs | | | | | | |
| KAO4 | 銬Kxcs | 靠Kxhy | 犒Kxhb | | | | | | |
| KE1 | 瞌KEbt | 棵KEdd | 柯KEdr | 科KEhj | 蚵KElj | 喀KErr | 苛KEtr | 顆KEwc | 刻KEyn |
| | 珂KEgr | 疴KEkr | 髁KEbd | 頦KEyc | 稞KEhd | 磕KEmt | | | |
| KE2 | 咳kEro | 壳kEgn | 殼kEge | | | | | | |
| KE3 | 渴keev | 可kemr | 坷kegd | | | | | | |
| KE4 | 客Kejr | 克Keju | 恪Kepr | 剋Kejn | 課Keyd | 刻Keyn | 尅Keji | 嗑Kert | |
| KEI1 | 尅KFji | | | | | | | | |
| KEN3 | 懇knbp | 墾knbg | 啃knrb | 肯knyb | | | | | |
| KENG1 | 鏗KNcg | 坑KNgn | 吭KNrn | | | | | | |
| KONG1 | 空KCjm | 倥KCom | | | | | | | |
| KONG3 | 孔kcnu | 恐kcmp | | | | | | | |
| KONG4 | 控Kcqm | | | | | | | | |
| KOU1 | 摳KDqr | | | | | | | | |
| KOU3 | 口kdr | | | | | | | | |
| KOU4 | 寇Kdje | 扣Kdqr | 叩Kdrl | 蔻Kdte | | | | | |
| KU1 | 骷KUbr | 枯KUdr | 窟KDju | 哭KUrk | | | | | |
| KU3 | 苦kutr | | | | | | | | |
| KU4 | 庫Kuij | 褲Kulj | 酷Kumr | | | | | | |

| | | | | | | | | | |
|---|---|---|---|---|---|---|---|---|---|
| KUA1 | 誇KBys | 夸KBks | | | | | | | |
| KUA3 | 垮kbgs | | | | | | | | |
| KUA4 | 跨Kbrs | 胯Kbbs | 誇KbbsC | 挎Kbqs | | | | | |
| KUAI4 | 燴Kyba | 塊Kygi | 筷Kyhk | 會Kyoa | 快Kypk | 剖Kyon | 儈Kyoac | | |
| KUAN1 | 寬KHji | 髖KHbi | | | | | | | |
| KUAN3 | 款khgo | | | | | | | | |
| KUANG1 | 筐KWhg | 匡KWsg | 框Kwdg | | | | | | |
| KUANG2 | 狂kWkg | 誑kWyg | | | | | | | |
| KUANG4 | 曠Kwac | 眶Kwbg | 況Kwiu | 壙Kwgc | 礦Kwmc | 鄺Kwil | | | |
| KUI1 | 窺KQju | 盔KQkt | 虧KQys | 歸KQub | | | | | |
| KUI2 | 睽kQbk | 魁kQhj | 揆kQqk | 葵kQtk | 逵kQyg | 奎kQkg | | | |
| KUI3 | 傀kqoi | | | | | | | | |
| KUI4 | 潰Kqec | 饋KqoiC | 愧Kqpi | 喟Kqrb | 餽Kqoc | 匱Kqsc | 瞶Kqbc | 簣Kqhc | |
| KUN1 | 昆KKap | 坤KKgl | 崑KKup | | | | | | |
| KUN3 | 綑kkvd | 捆kkqd | | | | | | | |
| KUN4 | 睏Kkbd | 困Kkwd | | | | | | | |
| KUO4 | 闊Koar | 廓Koil | 擴Koqc | 括Koqr | | | | | |
| LA1 | 拉LAqt | 啦LArt | 邋LAyv | 刺LAdn | | | | | |
| LA3 | 喇larn | | | | | | | | |
| LA4 | 臘LAbv | 蠟LAlv | 辣LAyl | 瘌LAkn | | | | | |
| LAI2 | 來lTdo | 萊lTto | | | | | | | |
| LAI4 | 睞Ltbo | 賴Ltdc | 瀨Ltec | 籟Lthc | 癩Ltkc | | | | |
| LAN2 | 欄lZdw | 婪lZdv | 瀾lZew | 籃lZht | 襤lZlt | 斕lZqw | 蘭lZtw | 藍lZtt | 嵐lZui |
| | 諳lZyw | 男Lzws | 闌lZaw | | | | | | |
| LAN3 | 懶lzpc | 攬lzqu | 覽lzsu | 欖lzdu | | | | | |
| LAN4 | 濫Lzet | 爛Lzfw | 纜Lzvu | | | | | | |
| LANG2 | 榔lGdl | 郎lGil | 廊lGilC | 狼lGkv | 螂lGll | 瑯lGml | 踉lGrv | 鋃lGcl | 琅lGmv |
| LANG3 | 朗lgib | | | | | | | | |
| LANG4 | 浪Lgev | | | | | | | | |
| LAO1 | 撈LXqs | | | | | | | | |
| LAO2 | 勞lXfs | 牢lXjq | 嘮lXks | 嘮lXrs | 澇lXes | | | | |
| LAO3 | 老lxjp | 佬lxop | 姥lxvp | | | | | | |
| LAO4 | 烙Lxfr | 酪Lxmr | | | | | | | |
| LE3 | 了lenn | | | | | | | | |
| LE4 | 勒Lets | 樂Levd | | | | | | | |
| LEI2 | 鐳lFcw | 雷lFmw | | | | | | | |
| LEI3 | 磊lfmr | 儡lfow | 蕾lftw | 累lfwf | 壘lfwg | | | | |
| LEI4 | 類Lffc | 擂Lfqw | 淚Lfek | 肋Lfgs | | | | | |
| LENG3 | 冷lnii | | | | | | | | |
| LENG4 | 愣Lnps | | | | | | | | |
| LI2 | 貍lIbg | 漓lIeb | 黎lIhe | 籬lIhg | 離lIyg | 犁lIhq | 梨lIhd | 鳌lIjg | 狸lIkg |
| | 厘lImgC | 璃lImbC | | | | | | | |
| LI3 | 李lidd | 澧liet | 浬lieg | 禮liit | 裡lilg | 理limg | 鯉ling | 俚liog | 哩lirg |
| | 娌livg | 里liwg | | | | | | | |
| LI4 | 隸Lide | 溧Liem | 粒Lift | 笠Liht | 戾Lisk | 利Lihn | 吏Lijk | 癘Likb | 痢Likn |
| | 力Liks | 麗Limp | 歷LimmC | 碟Limd | 俐Limn | 歷Limm | 栗LimdC | 曆lima | 厲Limb |

|       |                |                |                |                |                |                |                |                |                |
|-------|----------------|----------------|----------------|----------------|----------------|----------------|----------------|----------------|----------------|
|       | 勵Lims | 儷Liop | 例Lion | 俐LionC | 莉Litn | 荔Lits | 立Liyt | 茘Litt | 唳Lirk |
|       | 擽Lidm | 儸LiwgC | 蛎Liln | 栗LimdC | 靂Lisp | 喱LirgC | 楝Lipd |  |  |
| LIAN2 | 簾lPhc | 廉lPic | 鰱lPnj | 憐lPpq | 聯lPst | 蓮lPtj | 漣lPec | 連lPyj | 漣lPej |
|       | 鎌lPcc |  |  |  |  |  |  |  |  |
| LIAN3 | 臉lPbo | 斂lpok |  |  |  |  |  |  |  |
| LIAN4 | 鏈Lpcj | 鍊Lpcf | 煉Lpff | 殮Lpmo | 练Lpvf | 戀Lpvp | 歛Lpoo |  |  |
| LIANG2 | 量lRag | 梁lRed | 凉lRif | 糧lRfg | 良lRiv | 樑lRdd |  |  |  |
| LIANG3 | 兩lrmo | 倆lrob | 唡lrrb |  |  |  |  |  |  |
| LIANG4 | 輛Lrjb | 諒Lryf | 亮Lryu | 晾Lraf |  |  |  |  |  |
| LIAO1 | 撩LSqf |  |  |  |  |  |  |  |  |
| LIAO2 | 潦lSef | 燎lSff | 寮lSjh | 療lSkf | 僚lSof | 聊lSsl | 遼lSyf | 嘹lSrf |  |
| LIAO3 | 瞭lsbf | 了lsnn |  |  |  |  |  |  |  |
| LIAO4 | 料Lsfj | 廖Lsih | 鐐Lscf | 撂Lsqr |  |  |  |  |  |
| LIE3 | 咧lmrn |  |  |  |  |  |  |  |  |
| LIE4 | 列Lmen | 劣Lmfs | 獵Lmkv | 裂Lmmv | 烈Lmmf | 冽Lmmn | 捩Lmqk |  |  |
| LIN2 | 林lJdd | 淋lJed | 鄰lJfl | 燐lJfq | 麟lJiq | 辚lJjq | 琳lJmd | 鱗lJnq | 臨lJsr |
|       | 遴lJyq | 森lJmd |  |  |  |  |  |  |  |
| LIN3 | 凛ljid | 懍ljpd |  |  |  |  |  |  |  |
| LIN4 | 磷Ljmq | 躏Ljrg | 吝Ljyr | 賃Ljoc |  |  |  |  |  |
| LING1 | 拎LJqi |  |  |  |  |  |  |  |  |
| LING2 | 鈴lIci | 凌lJie | 靈lJmo | 零lJmi | 玲lJmiC | 陵lJne | 伶lJoiC | 聆lJsi | 菱lJte |
|       | 芩lJti | 羚lJtiC | 囹lJwi | 櫺lJdo | 領lJon | 稜lJhe | 齡lJyi | 綾lJve |  |
| LING3 | 領ljoc | 嶺ljuc |  |  |  |  |  |  |  |
| LING4 | 令Ljoi | 另Ljrs |  |  |  |  |  |  |  |
| LIU1 | 溜LQew |  |  |  |  |  |  |  |  |
| LIU2 | 榴lQdw | 劉lQhn | 流lQeu | 留lQhw | 瀏lQen | 瘤lQkw | 硫lQmu | 餾lQow | 琉lQmu |
| LIU3 | 柳lqdl |  |  |  |  |  |  |  |  |
| LIU4 | 六Lqyc | 遛Lqyw | 磂Lqrw |  |  |  |  |  |  |
| LONG1 | 聾LCyj |  |  |  |  |  |  |  |  |
| LONG2 | 朧lCbp | 籠lChp | 瓏lCmp | 隆lCnm | 龍lCyp | 嚨lCrp | 窿lCjm |  |  |
| LONG3 | 隴lcnp | 攏lcqp | 壟lcyg |  |  |  |  |  |  |
| LONG4 | 弄Lcmt |  |  |  |  |  |  |  |  |
| LOU2 | 髏lDbv | 樓lDlvC | 婁lDlv | 嘍lDrv |  |  |  |  |  |
| LOU3 | 摟ldqv | 簍ldhv | 褸ldlvc | 蔞lddv | 僂ldov |  |  |  |  |
| LOU4 | 鏤Ldcv | 漏Ldeb | 露Ldmr | 陋Ldnv | 瘺Ldkv |  |  |  |  |
| LU2 | 爐lUft | 顱lUyc | 盧lUyt | 蘆lUit | 廬lUtt |  |  |  |  |
| LU3 | 櫓luda | 魯luna | 擄luqs | 虜luys | 滷luei |  |  |  |  |
| LU4 | 賂Lubr | 錄Luce | 鹿Luip | 祿Luie | 碌Lume | 陸lung | 路Lurr | 麓Ludp | 露Lumr |
|       | 戮Lusi |  |  |  |  |  |  |  |  |
| Lü2 | 驢lVst |  |  |  |  |  |  |  |  |
| Lü3 | 鋁lvcr | 侶lvor | 呂lvrr | 履lvse | 屢lvsv | 褸lvvv | 旅lvyv | 簹lvyb | 褸Lvlv |
| Lü4 | 濾Lvep | 律Lvhq | 綠Lvve | 率Lvyj | 慮Lvyp | 氯Lvoe |  |  |  |
| LUAN2 | 巒lHvu | 鸞lHvf | 孿lHvq | 攣lHvq |  |  |  |  |  |
| LUAN3 | 卵lhhi |  |  |  |  |  |  |  |  |
| LUAN4 | 亂Lhbu |  |  |  |  |  |  |  |  |
| LUE4 | 掠Llqf | 略Llwr | 撂Llqr |  |  |  |  |  |  |

| | | | | | | | | |
|---|---|---|---|---|---|---|---|---|
| LUN2 | 淪lKeb | 輪lKjb | 倫lKob | 侖lKobC | 掄lKqb | 崙lKub | 圇lKwb | 綸lKvb |
| LUN4 | 論Lkyb | | | | | | | |
| LUO1 | 囉LOrg | | | | | | | |
| LUO2 | 鑼lOcg | 羅lOwg | 玀lOkg | 螺lOlf | 騾lOsf | 邏lOyg | 籮lOhg | |
| LUO3 | 裸lold | 瘰lokf | | | | | | |
| LUO4 | 洛Loer | 烙Lofr | 酪Lomr | 咯Lorr | 駱Losr | 落Lotr | 絡Lovr | |
| MA1 | 嗎MArf | 媽MAvf | 抹MAqj | | | | | |
| MA2 | 麻mAic | 蟆mAlk | 嘛mArc | | | | | |
| MA3 | 螞malf | 碼mamf | 瑪mamfC | 馬masf | | | | |
| MA4 | 罵Mawf | | | | | | | |
| MAI2 | 埋mTgg | | | | | | | |
| MAI3 | 買mtwc | | | | | | | |
| MAI4 | 脈Mtbv | 賣Mtgc | 麥Mtji | 邁Mtyb | 勱Mtts | | | |
| MAN1 | 顢MZtc | | | | | | | |
| MAN2 | 瞞mZbb | 饅mZoe | 蹣mZrb | 蠻mZvi | | | | |
| MAN3 | 滿mzeb | | | | | | | |
| MAN4 | 曼Mzae | 漫Mzee | 慢Mzpe | 蔓Mzte | 謾Mzye | 幔Mzle | | |
| MANG2 | 忙mGpv | 茫mGtv | 芒mGtvC | 盲mGyu | 氓mGyp | | | |
| MANG3 | 蟒mglt | 莽mgtt | | | | | | |
| MAO1 | 貓MXbw | | | | | | | |
| MAO2 | 錨mXcw | 毛mXhu | 矛mXnh | 髦mXsu | 茅mXthC | | | |
| MAO3 | 卯mxhl | 鉚mxcl | 冇mxkb | | | | | |
| MAO4 | 冒Mxau | 貌mxbu | 貿Mxhc | 帽Mxlu | 茂Mxth | 懋Mxdp | 耄Mxju | |
| MEI2 | 眉mFau | 梅mFdy | 枚mFdk | 沒mFee | 煤mFfd | 霉mFmy | 莓mFty | 媒mFvd | 玫mFmk |
| | 酶mFmyC | | | | | | | |
| MEI3 | 鎂mfck | 美mftk | 每mfoi | | | | | |
| MEI4 | 昧Mfad | 魅Mfhd | 寐Mfjd | 妹MfvdC | 媚Mfvu | | | |
| MEN2 | 門mNan | 們mNon | 捫mNqn | | | | | |
| MEN4 | 悶Mnap | 懣Mnep | 燜Mnfp | | | | | |
| MENG1 | 矇MNbo | | | | | | | |
| MENG2 | 盟mNat | 朦mNboC | 檬mNdo | 濛mNeo | 蒙mNto | 萌mNtb | | |
| MENG3 | 錳mnct | 猛mnkt | 蜢mnlt | 懵mnpu | | | | |
| MENG4 | 孟Mnnt | 夢Mntn | | | | | | |
| MI1 | 咪MIrd | 謎MIbd | | | | | | |
| MI2 | 瀰mIeb | 糜mIid | 靡mIiy | 彌mInb | 迷mIyd | 謎mIydC | 醚mImd | 襧mIib | 獼mIkb |
| MI3 | 米mifd | 弭minj | 敉mifk | | | | | |
| MI4 | 覓Mibu | 泌Mieh | 祕Miih | 蜜Miji | 密Miju | 秘Mihh | 謐Miyt | 冪Mibb | |
| MIAN2 | 眠mPbp | 棉mPdb | 綿mPvb | | | | | |
| MIAN3 | 靦mpmu | 勉mpns | 免mpnu | 緬mpvl | 娩mpvu | 冕mpau | 腼mpbl | |
| MIAN4 | 麵Mpjl | 面Mpml | | | | | | |
| MIAO2 | 瞄mSbw | 描mSqw | 苗mStw | | | | | |
| MIAO3 | 秒mshh | 杳msda | 渺mseh | 藐mstu | | | | |
| MIAO4 | 廟Msib | 妙Msvh | 繆Msvh | | | | | |
| MIE2 | 滅mMef | 篾mMhi | | | | | | |
| MIE4 | 蔑Mmti | | | | | | | |
| MIN2 | 閩mJai | 民mJrp | | | | | | |

| | | | | | | | | |
|---|---|---|---|---|---|---|---|---|
| MIN3 | 閔mjak | 皿mjbt | 敏mjok | 憫mjpk | 泯mjep | 抿mjqp | | |
| MING2 | 明mJab | 冥mJbc | 瞑mJbcC | 銘mJcr | 螟mJlc | 酩mJmr | 名mJnr | 鳴mJrf | 茗mjtr |
| | 盟mJat | | | | | | | | |
| MING4 | 命Mjol | 詺Mjyr | | | | | | | |
| MIU4 | 謬Mqyh | | | | | | | | |
| MO1 | 摸MOqk | | | | | | | | |
| MO2 | 膜mObk | 模mOdk | 磨mOir | 摩mOiq | 蘑mOtr | 麼mOii | 摹mOtq | 魔mOiiC | 模mOfk |
| | 漠mOek | 謨mOyk | | | | | | | |
| MO3 | 抹moqj | | | | | | | | |
| MO4 | 末Modj | 脈Mobv | 沫Moej | 寞Mojk | 歿Mome | 默Mowk | 墨Mowg | 陌Mona | 沒Moee |
| | 茉Motj | | | | | | | | |
| MOU2 | 謀mDyd | 莫Motk | | | | | | | |
| MOU3 | 某mdtd | 牟mDiq | | | | | | | |
| MU3 | 牡muhg | 拇muhi | 姆muvi | 母muwi | 畝muyo | 拇muqi | | | |
| MU4 | 睦Mubg | 目Mubu | 木Mud | 沐Mued | 穆Muhh | 牧Muhk | 墓Muta | 慕Mutp | |
| | 墓Mutg | 幕Mutb | 募Muts | 牟Muiq | | | | | |
| NA2 | 拿nAoq | | | | | | | | |
| NA3 | 哪narl | | | | | | | | |
| NA4 | 那Nasl | 鈉Nacb | 吶Narb | 納Navb | 娜Navl | 訥Nayb | 捺Naqf | | |
| NAI3 | 乃ntns | 氖ntos | 奶ntvs | 迺ntyw | | | | | |
| NAI4 | 奈Ntkf | 耐Ntmi | 柰Ntdf | | | | | | |
| NAN1 | 囡NZwv | | | | | | | | |
| NAN2 | 楠nZdj | 南nZjj | 喃nZrj | 難nZtg | 男nZws | | | | |
| NANG2 | 囊nGjv | 曩nGrv | | | | | | | |
| NAO2 | 撓nXqu | 蟯nXlu | | | | | | | |
| NAO3 | 腦nxbw | 惱nxpw | 瑙nxmw | | | | | | |
| NAO4 | 鬧Nxlb | | | | | | | | |
| NE3 | 呢nerp | | | | | | | | |
| NEI3 | 餒nfov | | | | | | | | |
| NEI4 | 內Nfob | | | | | | | | |
| NENG2 | 能nNip | | | | | | | | |
| NENG4 | 嫩Nnvk | | | | | | | | |
| NI2 | 泥nIep | 霓nImu | 倪nIou | 尼nIsp | 妮nIvp | | | | |
| NI3 | 你niof | 擬niqo | | | | | | | |
| NI4 | 膩Nibc | 溺Niem | 匿Nisr | 逆Niyu | 睨Niar | | | | |
| NIAN1 | 拈NPqr | | | | | | | | |
| NIAN2 | 年npoq | 黏nphr | 粘npfr | | | | | | |
| NIAN3 | 輾npjv | 碾npmv | 撚npqj | 攆npqf | 捻npqp | | | | |
| NIAN4 | 念Npop | 唸Nprp | 廿Npjj | | | | | | |
| NIANG2 | 娘nRvv | 孃nRvvC | | | | | | | |
| NIANG4 | 醸Nrmv | | | | | | | | |
| NIAO3 | 鳥nshf | | | | | | | | |
| NIAO4 | 尿Nsse | | | | | | | | |
| NIE2 | 捏nMqm | | | | | | | | |
| NIE4 | 鎳Nmcd | 囁Nmrj | 躡NmrjC | 聶Nmsj | 鎳Nmcj | 顳Nmmc | 孽Nmtd | 囓Nmru | |
| NIN2 | 您nJop | | | | | | | | |

| | | | | | | | | |
|---|---|---|---|---|---|---|---|---|
| NING2 | 擰nJqn | 凝nJio | 寧nJjn | 獰nJkn | 檸nJdn | 濘nJen | | |
| NIU2 | 牛nQhq | | | | | | | |
| NIU3 | 紐nqvg | 妞nqvgC | 扭nqqg | 鈕nqcg | | | | |
| NONG2 | 膿nCbv | 濃nCev | 噥nCev | 農nCtv | | | | |
| NONG4 | 弄Ncmt | | | | | | | |
| NU2 | 奴nUve | | | | | | | |
| NU3 | 弩nuvn | 努nuvs | | | | | | |
| NU4 | 怒Nuvp | | | | | | | |
| NÜ3 | 女nvv | 履nvse | | | | | | |
| NUAN3 | 暖nhae | 煖nhfe | | | | | | |
| NUE4 | 瘧Nlkm | 虐Nlym | 謔NuymC | | | | | |
| NUO2 | 挪nOql | 娜nOvl | | | | | | |
| NUO4 | 懦Nopb | 諾Noyr | 喏Norr | 偌Noor | 糯Nofb | | | |
| O2 | 喔oOrg | 哦oOri | | | | | | |
| OU1 | 噢OUrr | 鷗OUsf | 毆OUse | 歐OUso | 謳OUyr | | | |
| OU3 | 偶ouob | 嘔ourr | 藕outb | | | | | |
| OU4 | 慪Oupr | 漚Ouer | 嘔Ourk | | | | | |
| PA1 | 趴PArc | 葩PAtu | 啪PAra | | | | | |
| PA2 | 爬pAhu | 琶pAmu | 扒pAqc | 掱pAqq | 耙pAqu | 杷pAdu | | |
| PA4 | 怕Papa | 帕Pala | | | | | | |
| PAI1 | 拍PTqa | | | | | | | |
| PAI2 | 徘pThy | 牌pTlj | 排pTqy | 迫pTya | | | | |
| PAI4 | 湃Ptej | 派Ptev | | | | | | |
| PAN1 | 攀PZdq | 潘PZew | | | | | | |
| PAN2 | 盤pZht | | | | | | | |
| PAN4 | 盼Pzbh | 叛Pzfe | 判pzfn | 畔Pzwq | | | | |
| PANG1 | 乓PGoi | | | | | | | |
| PANG2 | 徬pGhs | 龐pGip | 傍pGos | 旁pGys | 滂pGes | 螃pGls | | |
| PANG4 | 胖PGbq | | | | | | | |
| PAO1 | 拋PXqs | | | | | | | |
| PAO2 | 袍pXlu | 刨pXpn | 庖pXiu | 咆pXru | | | | |
| PAO3 | 跑pxru | | | | | | | |
| PAO4 | 泡Pxeu | 鮑Pxdu | 炮Pxfu | | | | | |
| PEI1 | 胚PFbm | 坏PFrm | | | | | | |
| PEI2 | 賠pFbr | 培pFgr | 陪pFnr | 裴pFlv | | | | |
| PEI4 | 沛Pfeb | 配Pfmu | 佩Pfob | | | | | |
| PEN1 | 噴PNrc | | | | | | | |
| PEN2 | 盆pNct | | | | | | | |
| PENG1 | 砰PNmj | 烹PNyf | 怦PNpj | 漰PNec | 抨PNqj | | | |
| PENG2 | 篷pNhj | 膨pNbh | 朋pNbb | 棚pNdb | 澎pNeh | 硼pNmb | 蓬pNtj | 彭pNth | 鵬pNbf |
| PENG3 | 捧pnqq | | | | | | | |
| PENG4 | 碰Pnmc | | | | | | | |
| PI1 | 霹PImj | 丕PImm | 披PIqe | 批PIqp | 劈PIsh | 紕PIvp | 砒PImpC | 坏PIgm | |
| PI2 | 皮pIde | 枇pIdp | 疲pIke | 琵pImp | 啤pIrj | 脾pIbj | | |
| PI3 | 癖pikj | 痞pikr | 㔾pino | 匹pisc | 吡piwp | | | |
| PI4 | 闢Piaj | 僻Pioj | 辟Pisj | 譬Pisr | 屁Pisp | 媲PivpC | 睥Pilj | |

| | | | | | | | | |
|---|---|---|---|---|---|---|---|---|
| PIAN1 | 翩PPhm | 篇PPhb | 偏PPob | 扁PPht | | | | |
| PIAN2 | 胼pPbt | | | | | | | |
| PIAN4 | 片Ppll | 騙Ppsb | 遍Ppyb | | | | | |
| PIAO1 | 漂PSef | 飄PPei | 標PSpf | | | | | |
| PIAO2 | 朴pSdy | 嫖pSvf | 瓢pSmo | | | | | |
| PIAO3 | 殍psmd | 莩pstd | 瞟psbf | | | | | |
| PIAO4 | 票Psmf | 剽Psmn | | | | | | |
| PIE1 | 撇PMfu | | | | | | | |
| PIE3 | 撇pmqk | | | | | | | |
| PIN1 | 拼PJqt | 姘PJvt | | | | | | |
| PIN2 | 貧pJcc | 瀕pJec | 蘋pJtcC | 頻pJyc | | | | |
| PIN3 | 品pjrr | | | | | | | |
| PIN4 | 聘Pjss | | | | | | | |
| PING1 | 乒PJoh | | | | | | | |
| PING2 | 坪pJgj | 憑pJip | 平pJmj | 屏pJst | 萍pJtj | 瓶pJtn | 評pJyj | 頻pJtc |
| PO1 | 坡POge | 潑POee | | | | | | |
| PO2 | 婆pOev | 鄱pOhl | | | | | | |
| PO3 | 頗podc | 叵posr | | | | | | |
| PO4 | 泊Poea | 魄Pohi | 破Pome | 迫Poya | 粕Pofa | | | |
| POU3 | 剖pdyn | | | | | | | |
| PU1 | 仆PUoy | 撲PUqo | 噗PUro | | | | | |
| PU2 | 樸pUdo | 匍pUpb | 蹼pUroC | 蒲pUtbC | 葡pUtb | 菩pUtr | 僕pUoo | |
| PU3 | 溥puei | 浦pueb | 埔pugb | 普puta | 圃puwb | 譜puya | 蒲putb | |
| PU4 | 曝Puae | 鋪Pucb | 瀑Puee | | | | | |
| QI1 | 谿QIbr | 七QIju | 棲QIqv | 漆QIee | 溪QIek | 淒QIev | 戚QIif | 悽QIpv | 欺QIto |
| | 感QIip | 期QItb | 妻QIjv | 沏QIeh | 蹊QIrk | 柒QIed | | | |
| QI2 | 臍qIbx | 棋qIdc | 其qItc | 祇qIipC | 祈qIil | 祁qIilC | 奇qIkr | 琪qImc | 騎qIsr |
| | 崎qIur | 岐qIue | 齊qIyx | 歧qIye | 旗qIyc | 畦qIwg | | | |
| QI3 | 杞qidu | 起qigu | 啟qihk | 稽qiha | 乞qion | 豈qiut | 綺qivr | 企qiom | |
| QI4 | 泣Qier | 汽Qien | 砌Qimh | 氣Qiod | 契Qiqk | 器Qirr | 憩Qihp | 迄Qiyn | |
| | 棄Qiyd | 訖QiynC | | | | | | | |
| QIA1 | 掐QAqx | | | | | | | |
| QIA3 | 洽qaer | 恰qapr | 髂qabr | | | | | |
| QIAN1 | 鉛QZcr | 籤QZhm | 簽QZho | 千QZhj | 阡QZnj | 韆QZtu | 遷QZyu | 謙QZyc | 牽QZyq |
| | 扦QZqj | 仟QZoj | | | | | | | |
| QIAN2 | 錢qZci | 鉗qZcm | 潛qZea | 乾qZjn | 箝qZhmC | 前qZtn | 黔qZwn | 虔qZyk | |
| QIAN3 | 淺qzei | 遣qzyr | 譴qzyrC | | | | | | |
| QIAN4 | 塹Qzjg | 欠Qzno | 倩Qzob | 歉Qzto | 茜Qztw | 嵌Qzuo | | | |
| QIANG1 | 腔QGbm | 鏘QGci | 羌QGtu | 槍QGdr | 戕QGvi | | | | |
| QIANG2 | 強qGni | 薔qGtw | 糡qGvw | | | | | | |
| QIANG3 | 搶qgqr | 襁qgli | | | | | | | |
| QIANG4 | 嗆Qgrr | | | | | | | | |
| QIAO1 | 鍬QXcf | 撬QXqu | 蹺QXru | 敲QXye | 悄QXpb | | | | |
| QIAO2 | 瞧qXbf | 樵qXdf | 僑qXob | 橋qXdb | 喬qXhr | 翹qXgm | 憔qXpf | | |
| QIAO3 | 巧qxms | | | | | | | | |
| QIAO4 | 毅Qxjk | 俏QxobC | 鞘Qxtb | 峭Qxub | | | | | |

| | | | | | | | | |
|---|---|---|---|---|---|---|---|---|
| QIE1 | 切QEph | | | | | | | |
| QIE2 | 茄qEtr | | | | | | | |
| QIE3 | 且qebm | | | | | | | |
| QIE4 | 鍥Qeck | 砌Qemh | 竊Qejb | 愜Qepo | 怯Qepi | 妾Qeyv | 契Qeqk | |
| QIN1 | 侵QNoe | 欽QNco | 親QNyu | 衾QNov | | | | |
| QIN2 | 琴qNmn | 禽qNob | 秦qNqd | 擒qNqbC | 嗪qNrb | 芹qNtl | 勤qNts | 芩qNtn 蓁qNmj |
| QIN3 | 寢qnje | | | | | | | |
| QIN4 | 沁Qnep | 揿Qnqo | | | | | | |
| QING1 | 清QNeb | 卿QNhl | 輕QNjm | 蜻QNlb | 傾QNoc | 氫QNom | 頃QNpc | 青QNqb 氰QNobC |
| QING2 | 晴qNab | 情qNpb | 擎qNtq | | | | | |
| QING3 | 請qnyb | | | | | | | |
| QING4 | 磬Qngu | 慶Qnie | | | | | | |
| QIONG2 | 窮qCjn | 穹qCjnC | 瓊qCme | | | | | |
| QIU1 | 秋QDhf | 蚯QDlm | 鰍QDnf | 邱QDol | 丘QDom | 鞦QDtf | 坵QDgm | |
| QIU2 | 泅qDer | 求qDie | 球qDme | 酋qDtm | 囚qDwo | | | |
| QU1 | 趨QVgu | 軀QVhr | 蛆QVlm | 驅QVsrC | 屈QVsu | 區QVsr | 岖QVur | 曲QVtw |
| QU2 | 瞿qVbg | 渠qVed | 衢qVhn | 趣qVjd | | | | |
| QU3 | 取qvse | 齲qvyb | 苣qvts | 麟qvyb | | | | |
| QU4 | 趣Qvge | 去Qvgi | 戲Qvyu | | | | | |
| QUAN1 | 圈QHwu | 悛QHpe | | | | | | |
| QUAN2 | 權qHdg | 拳qHfq | 泉qHhe | 痊qHkg | 全qHog | 詮qHyg | 顴qHtc | |
| QUAN3 | 犬qhik | | | | | | | |
| QUAN4 | 勸Qhts | | | | | | | |
| QUE1 | 缺QLok | 闕QLao | | | | | | |
| QUE2 | 瘸qLkb | | | | | | | |
| QUE4 | 卻Qlcl | 榷Qldg | 確Qlmg | 雀Qlfg | 鵲Qltf | 恪Qlpr | | |
| QUN2 | 群qKsq | 裙qKlr | | | | | | |
| RAN2 | 燃rZff | 然rZbf | | | | | | |
| RAN3 | 染rzed | 冉rzgb | | | | | | |
| RANG1 | 嚷RGrv | | | | | | | |
| RANG2 | 攘rGqv | 瓤rGyo | | | | | | |
| RANG3 | 壤rggv | 釀rgmv | | | | | | |
| RANG4 | 讓Rgyv | | | | | | | |
| RAO2 | 饒rXou | 蟯rXlu | | | | | | |
| RAO3 | 擾rxqe | 繞rxvu | | | | | | |
| RE3 | 惹retp | | | | | | | |
| RE4 | 熱Regf | | | | | | | |
| REN2 | 壬rNhg | 仁rNom | 人rNo | | | | | |
| REN3 | 忍rnsp | 荏rntg | | | | | | |
| REN4 | 韌Rndi | 恁RnogC | 任Rnog | 刃Rnsi | 妊Rnvg | 認Rnyp | 紉Rnvi | |
| RENG1 | 扔ENqs | | | | | | | |
| RENG2 | 仍rNos | | | | | | | |
| RI4 | 日Ria | | | | | | | |
| RONG2 | 榕rCdr | 溶rCer | 熔rCfr | 榮rCfd | 戎rCij | 融rCmi | 蓉rCtr | 茸rCtj 絨rCvj 容rCjr 嶸rCud |
| RONG3 | 冗rcbn | | | | | | | |

| | | | | | | | | | |
|---|---|---|---|---|---|---|---|---|---|
| ROU2 | 柔rDnd | 揉rDqd | 蹂rDrd | 鞣rDtd | | | | | |
| ROU4 | 肉Rdoo | | | | | | | | |
| RU2 | 孺rUnb | 儒rUob | 茹rUtr | 如rUvr | 螺rUlb | 濡rUeb | | | |
| RU3 | 乳rubu | 辱rumi | 汝ruev | | | | | | |
| RU4 | 褥Ruli | 入Ruoh | 縟Ruvi | | | | | | |
| RUAN3 | 軟rhjo | 阮rhnu | | | | | | | |
| RUI4 | 銳Rqcu | 瑞Rqmb | 睿Rqyu | 芮Rqtb | 蕊Rqtp | | | | |
| RUN4 | 閏Rkag | 潤Rkeg | | | | | | | |
| RUO4 | 弱Ronm | 若Rotr | 偌Roor | | | | | | |
| SA3 | 灑saep | 撒saqk | 洒saew | | | | | | |
| SA4 | 薩Satm | 卅Satj | | | | | | | |
| SAI1 | 腮STbp | 鰓STnp | | | | | | | |
| SAI4 | 塞Stjg | 賽Stjc | | | | | | | |
| SAN1 | 三SZmm | 叄SZim | | | | | | | |
| SAN3 | 傘szoj | | | | | | | | |
| SAN4 | 散Sztk | | | | | | | | |
| SANG1 | 桑SGed | 喪SGgv | | | | | | | |
| SZNG3 | 嗓sgrd | | | | | | | | |
| SAO1 | 艘SXhe | 搖SXqi | 騷SXsi | 瘙SXki | | | | | |
| SAO3 | 捎sxqb | 嫂sxve | 掃sxqbC | | | | | | |
| SAO4 | 臊SXbd | | | | | | | | |
| SE2 | 塞sEjg | | | | | | | | |
| SE4 | 澀Seem | 嗇Segr | 瑟Semh | 色Senu | 潲Seew | | | | |
| SEN1 | 森SNdd | | | | | | | | |
| SENG1 | 僧SNoa | | | | | | | | |
| SHA1 | 杉SAdh | 鯊SAef | 裟SAev | 沙SAeh | 殺SAke | 砂SAmh | 煞SAnf | 紗SAvh | 剎SAkn |
| | 痧SAkh | | | | | | | | |
| SHA2 | 啥sArr | | | | | | | | |
| SHA3 | 傻saoe | | | | | | | | |
| SHA4 | 廈Saie | 霎Samv | | | | | | | |
| SHAI1 | 篩SThb | | | | | | | | |
| SHAI3 | 骰stbe | 色stnu | | | | | | | |
| SHAI4 | 晒Staw | 曬Stap | | | | | | | |
| SHAN1 | 刪SZbn | 山SZu | 杉SZdh | 舢SZhu | 衫SZlh | 珊SZmt | 蹣SZrt | 栅SZdm | 姍SZvm |
| SHAN3 | 閃szao | 陝szno | | | | | | | |
| SHAN4 | 膳Szbr | 汕Szeu | 扇Szhm | 禪Szlj | 疝Szku | 鱔Sznr | 擅Szqm | 善Sztr | 訕Szyu |
| | 繕Szvr | 煽Szfm | 贍SzbrC | | | | | | |
| SHANG1 | 裳SGfv | 殤SGmh | 鯣SGnh | 傷SGoh | 商SGyr | 墒Sggr | | | |
| SHANG3 | 賞sgfc | 晌sgar | | | | | | | |
| SHANG4 | 尚Sgfr | 上Sgym | | | | | | | |
| SHAO1 | 梢SXdb | 燒SXfu | 稍SXhb | 捎SXqb | 鞘SXtb | | | | |
| SHAO2 | 韶SXyr | 杓sXdi | 苕sXtr | 勺sXpi | 芍sXti | | | | |
| SHAO3 | 少sxfh | | | | | | | | |
| SHAO4 | 哨Sxrb | 紹Sxvr | 邵Sxsl | | | | | | |
| SHE1 | 賒SEbf | 奢SEka | | | | | | | |
| SHE2 | 舌sEhr | 蛇sElp | 佘sEof | | | | | | |

| | | | | | | | | |
|---|---|---|---|---|---|---|---|---|
| SHE3 | 捨seqr | 舍seor | | | | | | |
| SHE4 | 涉Seeh | 赦Segk | 射Sehi | 麝Seii | 社Seig | 攝Seqj | 設Seye | 慴Sepj |
| SHEI2 | 誰sFyg | | | | | | | |
| SHEN1 | 深SNed | 身SNhh | 參SNih | 申SNll | 砷SNml | 伸SNol | 呻SNrl | 紳SNvl |
| | 娠SNvv | | | | | | | |
| SHEN2 | 神sNil | 甚sNtv | | | | | | |
| SHEN3 | 瀋snew | 沈sneu | 審snjw | 嬸snvw | | | | |
| SHEN4 | 渗Sneh | 屋Snmi | 慎Snpc | 腎Snsb | | | | |
| SHENG1 | 聲SNgj | 笙SNhmC | 甥SNhs | 生SNhm | 牲SNhmC | 升SNht | 昇SNat | |
| SHENG2 | 繩sNvu | | | | | | | |
| SHENG3 | 省snfu | | | | | | | |
| SHENG4 | 勝Snbs | 剩Snhn | 盛Snit | 聖Snsg | | | | |
| SHI1 | 淫SIeg | 師SIhb | 失SIho | 獅SIkb | 虱SIni | 屍SIsp | 尸SIs | 詩SIyi | 施SIyd |
| | 濕SIef | | | | | | | |
| SHI2 | 時sIai | 實sIjc | 十sIj | 石sImr | 食sIov | 蝕sIoiC | 拾sIqr | 識sIya | 什sIoj |
| SHI3 | 史silk | 使siok | 駛sisk | 屎sisd | 始sivr | 矢siokC | 豕simo | | |
| SHI4 | 是Siao | 釋Sihj | 拭Siqm | 柿Sidb | 勢Sigs | 氏Sihp | 式Siim | 軾SijmC | 室Sijg |
| | 士Sijm | 事Sijn | 弑Sikm | 視Siiu | 示Simf | 飾Siob | 侍Sioi | 仕Siog | 恃Sipi |
| | 世Sipt | 誓SiqrC | 噬Siro | 適SiybC | 逝Siyl | 試Siym | 市Siyb | 匙Siap | 嗜Sira |
| | 峙Siui | | | | | | | |
| SHOU1 | 收SDvk | | | | | | | |
| SHOU2 | 守sDji | 手sDq | 首sDtu | | | | | |
| SHOU4 | 受Sdbe | 壽Sdgi | 瘦Sdke | 售Sdor | 授Sdqe | 獸Sdrk | | |
| SHU1 | 樞SUdr | 梳SUdu | 輸SUjn | 書SUla | 殊SUmd | 疏SUnu | 舒SUon | 抒SUqn | 蔬SUtu |
| | 叔SUye | | | | | | | |
| SHU2 | 贖sUbc | 熟sUyf | 淑sUee | 孰sUyi | 塾sUyg | | | |
| SHU3 | 暑suaa | 鼠suhv | 黍suhe | 數sulk | 屬susi | 薯suta | 蜀suwi | 署suwa | |
| SHU4 | 曙SuaaC | 樹Sudi | 束Sudl | 術Suhn | 戍Suii | 庶Suif | 豎Sust | 倏Suok | 潄Sueo |
| | 恕Suvp | 墅Suwg | 述Suyc | | | | | |
| SHUA1 | 刷SBsn | 唰SBrn | | | | | | |
| SHUA3 | 耍sbmv | | | | | | | |
| SHUAI1 | 衰SUyv | | | | | | | |
| SHUAI3 | 甩sybu | 摔syqj | | | | | | |
| SHUAI4 | 帥Syhb | 率Syyj | | | | | | |
| SHUAN1 | 閂SHam | 栓SHdg | 拴SHqg | | | | | |
| SHUAN4 | 涮Shen | 蒜Shtf | | | | | | |
| SHUANG1 | 霜SWmu | 雙SWoe | 孀SWvu | | | | | |
| SHUANG3 | 爽swkk | | | | | | | |
| SHUI2 | 誰sQyg | | | | | | | |
| SHUI3 | 水sqe | | | | | | | |
| SHUI4 | 睡Sqbm | 稅Sqhu | | | | | | |
| SHUN3 | 吮skri | | | | | | | |
| SHUN4 | 瞬Skbq | 舜SkbqC | 順Sklc | | | | | |
| SHUO1 | 說SOyu | | | | | | | |
| SHUO4 | 鑠Socd | 爍Sofd | 蟀Solj | 碩Somc | 朔Sotb | 率Soyj | | |
| SI1 | 私SIhi | 撕SIql | 嘶SIrl | 司SIsr | 斯SItl | 絲SIvf | 思SIwp | 廝SIil |

| | | | | | | | | | |
|---|---|---|---|---|---|---|---|---|---|
| SI3 | 死simp | | | | | | | | |
| SI4 | 泗Siec | 寺Sigi | 祀SiiuC | 飼Sior | 似Sioo | 伺SiorC | 嗣Sirr | 肆sisq | 駟Sisc |
| | 四Siwc | 食Siov | 巳Siru | | | | | | |
| SONG1 | 松SCdi | 淞SCei | 鬆SCsi | 忪SCpi | | | | | |
| SONG3 | 聳schj | 慫schp | 悚scpl | | | | | | |
| SONG4 | 頌Sccc | 宋Scjd | 送Scyk | 誦Scyb | 訟Scyi | | | | |
| SOU1 | 鎪SDheC | 餿SDoe | 搜SDqeC | 嗖SDre | 溲SDee | 颼SDheC | | | |
| SOU3 | 撒sdqk | 叟sdhe | 藪sdtk | 嗾sdrkC | | | | | |
| SOU4 | 漱Sdeo | 嗽Sdro | | | | | | | |
| SU1 | 酥SUmdC | 甦SUmm | 蘇SUtd | 穌SUnd | | | | | |
| SU2 | 俗sUor | 速sUyl | | | | | | | |
| SU4 | 溯Sueb | 夙Suhi | 宿Suja | 肅Sulx | 粟SumdC | 塑Sutg | 素Suqf | 縮Suva | 訴Suyy |
| SUAN1 | 酸SHme | 痠SHke | | | | | | | |
| SHUAN4 | 算Shht | | | | | | | | |
| SUI1 | 雖SQrg | 綏SQvv | | | | | | | |
| SUI2 | 隨sQnb | | | | | | | | |
| SUI3 | 髓sqbb | | | | | | | | |
| SUI4 | 燧Sqfo | 穗Sqhp | 碎Sqmj | 隧Sqno | 祟Squf | 遂Sqyo | 歲Sqyh | | |
| SUN1 | 孫SKnf | | | | | | | | |
| SUN3 | 損skqc | 筍skha | 笋skhk | | | | | | |
| SUN4 | 遜Skyf | | | | | | | | |
| SUO1 | 嗦SOrf | 唆SOre | 縮SOva | 梭SOde | 蓑SOtv | | | | |
| SUO2 | 索sOjf | | | | | | | | |
| SUO3 | 鎖socc | 所sohl | 瑣somcC | 嗩sorc | | | | | |
| TA1 | 塌TAgm | 它TAjp | 他TAod | 她TAvd | 禢TAim | 踏TAra | | | |
| TA3 | 塔tagr | 獺takc | | | | | | | |
| TA4 | 拓Taqr | 蹋Tarm | 榻Tadm | 遢Taym | 撻Taqq | | | | |
| TAI1 | 苔TTtr | 胎TTbr | | | | | | | |
| TAI2 | 臺tTgg | 颱tThr | 台tTir | 抬tTqr | 檯tTdg | | | | |
| TAI4 | 汰Ttei | 態Ttip | 太Ttki | 泰Ttqe | | | | | |
| TAN1 | 灘TZeg | 坍TZgy | 癱TZkg | 貪TZoc | 攤TZqg | | | | |
| | 檀tZdm | 潭tZej | 壇tZgmC | 痰tZkf | 彈tZnj | 鐔tZoj | 譚tZyj | 談tZyf | 曇tZai |
| TAN3 | 坦tzgm | 毯tzhf | 忐tzyp | 袒tzlm | | | | | |
| TAN4 | 碳Tzmf | 探Tzqd | 嘆Tzro | 炭Tzuf | | | | | |
| TANG1 | 湯TGeh | 鐋TGcg | | | | | | | |
| TANG2 | 膛tGbg | 糖tGfr | 棠tGfd | 堂tGfg | 塘tGgrC | 唐tGir | 螳tGlg | 醣tGmr | 搪tGqr |
| TANG3 | 淌tger | 躺tghr | 倘tgor | | | | | | |
| TANG4 | 燙Tgef | 趟Tggr | | | | | | | |
| TAO1 | 韜TXdx | 滔TXex | 掏TXqu | 叨TXrh | 條TXvf | | | | |
| TAO2 | 桃tXdo | 濤tXei | 淘tXeu | 陶tXru | 萄tXtu | 逃tXyo | 陶tXnu | | |
| TAO3 | 討txyi | | | | | | | | |
| TAO4 | 套Txki | | | | | | | | |
| TE4 | 特Tehi | 忑Temp | | | | | | | |
| TENG2 | 騰tNbf | 籐tNhe | 疼tNky | 滕tNbe | 藤tNte | 謄tNbr | | | |
| TI1 | 剔TIan | 梯TIdh | 踢TIrh | 銻TIch | | | | | |
| TI2 | 題tIac | 堤tIgo | 提tIqo | 啼tIrb | 隄tIno | 鵜tIed | 蹄tIrbC | 掦 | |
| TI3 | 體tibt | | | | | | | | |

| | | | | | | | | |
|---|---|---|---|---|---|---|---|---|
| TI4 | 剃Ticn | 涕Tieh | 惕Tiph | 替Tiqa | 嚏Tiro | 窗Tiyr | 薙Titg | 屉Tist |
| | 悌TipnC | | | | | | | |
| TIAN1 | 天TPmk | 添TPep | | | | | | |
| TIAN2 | 闐tPac | 填tPgc | 甜tPhm | 恬tPpr | 田tPw | | | |
| TIAN3 | 舔tphp | 忝tphpC | 殄tpmh | 腆tpbc | | | | |
| TIAO1 | 挑TSqo | | | | | | | |
| TIAO2 | 條tSod | 迢tSyrC | 調tSyr | | | | | |
| TIAO3 | 窕tsjo | | | | | | | |
| TIAO4 | 跳Tsro | 眺Tsbo | | | | | | |
| TIE1 | 貼TMbr | 帖TMlr | | | | | | |
| TIE3 | 鐵tmcg | | | | | | | |
| TING1 | 汀TJen | 廳TJip | 聽TJsp | | | | | |
| TING2 | 庭tJig | 停tJon | 蜓tJlg | 廷tJng | 亭tJyn | 婷tJvn | | |
| TING3 | 艇tjhg | 霆tjmg | 挺tjqg | | | | | |
| TONG1 | 通TCyb | | | | | | | |
| TONG2 | 瞳tCbg | 彤tCbh | 同tCbr | 銅tCcr | 桐tCdr | 潼tCeg | 筒tChr | 僮tCog | 童tCyg |
| TONG3 | 桶tcdb | 統tcvu | 捅tcqb | | | | | |
| TONG4 | 痛Tckb | 慟Tcps | | | | | | |
| TOU1 | 偷TDon | | | | | | | |
| TOU2 | 頭tDmc | 投tDqe | | | | | | |
| TOU4 | 透Tdys | | | | | | | |
| TU1 | 禿TUhu | 凸TUbs | 突TUjk | | | | | |
| TU2 | 塗tUeg | 徒tUho | 屠tUsa | 荼tUtd | 圖tUww | 途tUyd | 涂tUed | |
| TU3 | 土tug | 吐turg | | | | | | |
| TU4 | 兔Tuni | | | | | | | |
| TUAN1 | 湍THeb | | | | | | | |
| TUAN2 | 團tHwi | | | | | | | |
| TUI1 | 推TQqg | | | | | | | |
| TUI2 | 頹tQhc | | | | | | | |
| TUI3 | 腿tqbv | 褪tqlv | | | | | | |
| TUI4 | 退Tqyv | 蛻Tqlu | 褪Tqlv | | | | | |
| TUN1 | 吞TKhr | | | | | | | |
| TUN2 | 豚tKbo | 飩tKou | 屯tKpu | 囤tKwu | 臀tKsb | | | |
| TUO1 | 脫TObu | 拖TOqd | 托TOqp | 託TOyp | | | | |
| TUO2 | 沱tOep | 駝tOhp | 馱tOsk | 陀tOnp | 跎tOrp | 駞tOsp | | |
| TUO3 | 妥tobv | 楕todb | | | | | | |
| TUO4 | 拓Toqr | 唾Torm | | | | | | |
| WA1 | 哇WArg | 窪WAjg | 蛙WAlg | 挖WAqn | 凹WAsu | 媧WAvr | | |
| WA2 | 娃wAvg | | | | | | | |
| WA3 | 瓦wami | | | | | | | |
| WA4 | 襪WAli | | | | | | | |
| WAI1 | 歪WTmm | | | | | | | |
| WAI4 | 外Wtny | | | | | | | |
| WAN1 | 灣WZen | 豌WZmuC | 彎WZvn | | | | | |
| WAN2 | 完wZju | 丸wZki | 頑wZmc | 玩wZmu | | | | |
| WAN3 | 晚wzau | 皖wzhu | 輓wzjuC | 宛wzmuC | 碗wzmuC | 挽wzqu | 婉wzvu | 婠wzvuC | 莞wztu |
| | 腕wzbu | 蜿wzlu | 烷wZfu | 惋wzpu | | | | | |

| | | | | | | | | |
|---|---|---|---|---|---|---|---|---|
| WAN4 | 萬Wztb | | | | | | | |
| WANG1 | 汪WGeg | | | | | | | |
| WZNG2 | 王wGmg | 忘wGyp | 亡wGyv | | | | | |
| WANG3 | 罔wgbv | 枉wgdg | 往wghg | 惘wgpv | 網wgvv | | | |
| WANG4 | 旺Wgag | 望Wgyg | 妄WgyvC | | | | | |
| WEI1 | 威WFiv | 偎WFovC | 巍WFui | | | | | |
| WEI2 | 闈wFaq | 爲wFbf | 韋wFdq | 微wFhk | 危wFnu | 惟wFpg | 唯wFrg | 薇wFtk | 圍wFwq |
| | 違wFyq | 幃wFlq | 桅wFeu | 維wFvg | 帷wFlg | | | |
| WEI3 | 委wfhv | 葵wftv | 痿wfkv | 猥wfkvC | 偉wfoq | 尾wfsu | 緯wfvq | 娓wfvu | 闡wfaq |
| | 葦wftq | | | | | | | |
| WEI4 | 渭WFeb | 魏WFhi | 衛WFhn | 未WFjd | 餵WFov | 僞WFof | 位WFot | 喂WFrv | 味WFrd |
| | 尉WFsi | 蔚WFti | 胃WFwb | 畏WFwv | 慰WFsp | 謂WFyb | 毅Wfhh | | |
| WEN1 | 溫WNet | 瘟WNkt | | | | | | |
| WEN2 | 聞wNaj | 蚊wNlk | 紋wNvk | 文wNyk | | | | |
| WEN3 | 穩wnhp | 刎wnpn | 吻wnrh | | | | | |
| WEN4 | 紊Wnyf | 問Wnar | | | | | | |
| WENG1 | 翁WNcm | 嗡WNrm | | | | | | |
| WENG4 | 甕Wnyn | | | | | | | |
| WO1 | 渦WOer | 窩WOjr | 倭WOov | 萵WOtr | 蝸WOlr | 撾WOqr | | |
| WO3 | 我wohi | | | | | | | |
| WO4 | 沃Woek | 斡Wojj | 握Woqg | 臥Woso | 喔Worg | 齷Woyg | 渥Woeg | | |
| WU1 | 鎢WUcf | 汙WUed | 圬WUgs | 巫WUmo | 嗚WUrf | 污WUes | 誣WUyo | 烏WUhf | 鄔WUhl |
| | 搗WUgf | | | | | | | |
| WU2 | 蜈wUlk | 梧wUdr | 吾wUmr | 無wUof | 吳wUrk | 蕪wUtf | 毋wUwj | 屋wUsg | |
| WU3 | 鵡wumf | 武wummC | 五wumm | 舞wuoq | 侮wuoy | 伍wuom | 午wuoj | 忤wupj | 捂wuqr |
| WU4 | 唔Wurr | 物Wuhh | 戊Wuih | 寤Wujr | 騖Wums | 惡Wump | 兀Wumu | 鶩Wunf | 務Wuns |
| | 悟Wupr | 勿Wuph | 誤Wuyk | 晤Wuar | | | | |
| XI1 | 晰XIal | 粸XIbr | 膝XIbe | 奚XIbk | 兮XIcs | 析XIdl | 溪XIek | 稀XIhb | 犧XIhs |
| | 悉XIhpC | 禧XIir | 蜥XIll | 西XImw | 攜XIqb | 蹊XIrk | 嘻XIrr | 吸XIre | 僖XIor |
| | 犀XIsq | 熙XIsf | 嬉XIvr | 唏XIrb | 夕XIni | 郗XIkl | 昔XIta | 惜XIpa | |
| | 希XIkb | 羲XIts | 烯XIfb | | | | | |
| XI2 | 錫xIch | 檄xIdk | 熄xIfp | 息xIhp | 席xIib | 惜xIpa | 習xIsa | 昔xIta | 蓆xItb |
| | 襲xIyv | 媳xIvp | | | | | | |
| XI3 | 洗xieu | 喜xigr | 徙xiho | 禧xiir | 璽ximiC | 囍xigrC | 嬉xivr | 僖xior | 銑xicu |
| XI4 | 汐Xiei | 系Xihf | 繫Xijf | 矽Ximi | 隙Xinf | 夕Xini | 係Xiof | 細Xivw | 戲Xiyi |
| | 閱Xiau | | | | | | | |
| XIA1 | 瞎XAbr | 蝦XAle | | | | | | |
| XIA2 | 暇xAae | 轄xAjr | 狹xAko | 狎xAkl | 霞xAme | 瑕xAmeC | 俠xAo | 呷xArl | 匣xAsl |
| | 峽xAuo | 遐xAye | 鍔xAod | | | | | |
| XIA4 | 下Xamy | 廈Xaie | 夏XameC | 嚇Xarc | | | | |
| XIAN1 | 先XZhu | 鮮XZnq | 仙XZou | 掀XZqo | 纖XZvm | | | |
| XIAN2 | 閒xZab | 閑xZad | 涎xZem | 銜xZhn | 舷xZhi | 咸xZir | 弦xZni | 賢xZsc | 嫻xZvd |
| | 嫌xZvc | 鹹xZyr | 癇xZkb | | | | | |
| XIAN3 | 顯xzac | 癬xzkq | 險xzno | 鮮xztq | | | | |
| XIAN4 | 腺Xzbe | 縣Xzbf | 憲Xzjp | 現Xzmu | 陷Xznx | 限Xznv | 餡Xzox | 羨Xzto | 線Xzve |
| | 獻Xzyk | | | | | | | |
| XIANG1 | 鑲XGcv | 相XGdu | 湘XGeu | 香XGha | 箱XGhu | 廂XGiu | 鄉XGvl | 襄XGyv | |

| | | | | | | | | |
|---|---|---|---|---|---|---|---|---|
| XIANG2 | 祥xGiq | 降xGnq | 翔xGtm | 詳xGyq | | | | |
| XIANG3 | 想xgdp | 餉xgor | 響xgva | 享xgyd | 饗xgvv | 响xgrr | | |
| XIANG4 | 橡Xgdo | 向Xghr | 項Xgmc | 象Xgno | 像Xgoo | 巷Xgtu | | |
| XIAO1 | 銷XXcb | 瀟XXex | 消XXeb | 簫XXhx | 宵XXjb | 霄XXmb | 硝XXmbC | 囂XXrr | 蕭XXtx |
| | 逍XXyb | 尚XXfb | 削XXfn | | | | | |
| XIAO2 | 淆xXebC | 梟xXhd | | | | | | |
| XIAO3 | 曉xxau | 小xxnc | 筱xxhkC | 僥xxou | | | | |
| XIAO4 | 校Xxdk | 笑Xxhk | 孝Xxjd | 酵Xxmd | 嘯Xxrx | 效Xxyk | 傚Xxok | 哮Xxrd | |
| XIE1 | 歇XEao | 些XEym | 楔XEdk | 蠍XElo | | | | |
| XIE2 | 協xEjs | 脅xEkb | 邪xEml | 斜xEoj | 偕xEoa | 攜xEqb | 鞋xEtg | 諧xEya | 燮xEfe |
| | 挾xEqo | | | | | | | |
| XIE3 | 寫xejf | 血xeht | | | | | | |
| XIE4 | 械Xedt | 瀉Xeef | 泄Xeet | 蟹Xeni | 卸Xeol | 懈Xepq | 邂Xeyq | 屑Xesb | 謝Xeyi |
| | 藝Xeyv | 渫Xeep | 盜Xeem | 愜Xepo | | | | | |
| XIN1 | 馨XNga | 欣XXho | 心XNp | 薪XNtl | 莘XNyj | 鋅XXcj | 新XNyl | 芯XNtp | 鑫XNcc |
| | 辛XNyj | 歆XNyo | | | | | | |
| XIN2 | 尋xNsi | | | | | | | |
| XIN4 | 釁Xnhh | 信Xnor | 囟Xnhk | | | | | |
| XING1 | 星XNam | 腥XNbm | 興XNhc | 猩XNkm | 惺XNpmC | | | |
| XING2 | 行xNhn | 邢xNml | 形xNmh | 型xNmg | 刑xNmn | | | |
| XING3 | 省xnfu | 醒xnmm | 擤xnql | | | | | |
| XING4 | 杏Xndr | 幸Xngj | 倖Xnoj | 性xnpm | 姓xnvm | 悻Xnpj | | |
| XIONG1 | 胸XCbk | 洶XCek | 匈XCpk | 兄XCru | 凶XCuk | 兇XCuu | 酗XCmk | | |
| XIONG2 | 熊XCif | 雄XCkg | | | | | | |
| XIU1 | 修XDoh | 休XDod | 羞XDtg | | | | | |
| XIU3 | 朽xdds | 宿xdja | | | | | | |
| XIU4 | 繡Xdcx | 臭Xdhk | 秀Xdhs | 袖Xdlw | 嗅Xdrk | 溴Xdek | 岫Xduw | 繻Xdvx | |
| XU1 | 墟XVgm | 須XVhc | 需XVml | 胥XVnb | 噓XVrm | 吁XVrd | 鬚XVsc | 虛XVym | |
| XU2 | 徐xVhd | | | | | | | |
| XU3 | 栩xvdm | 許xvyj | 煦xvrf | | | | | |
| XU4 | 卹Xvhl | 序Xvin | 旭Xvka | 敘Xvok | 蓄Xvtw | 續Xvvc | 緒Xvva | 絮Xvvf | 婿Xvvb |
| | 恤Xvpt | 煦Xvrf | 戌Xvim | 呴Xvrr | 畜Xvyw | 酗Xvmk | 殺Xvoe | | |
| XUAN1 | 軒XHjj | 宣XHjm | 喧XHrm | 渲XHem | | | | |
| XUAN2 | 懸xHbp | 遊xHeo | 玄xHyi | 旋xHyo | 泫xHei | 弦xHni | | |
| XUAN3 | 選xhyc | 癬xhkq | 眩xhbi | 烜xhfm | | | | |
| XUAN4 | 絢Xhva | | | | | | | |
| XUE1 | 噱XLro | 靴XLtp | 薛XLtj | 削XLfn | | | | |
| XUE2 | 學xLhd | 穴xLjc | | | | | | |
| XUE3 | 雪xlmm | | | | | | | |
| XUE4 | 血Xlht | | | | | | | |
| XUN1 | 燻XKff | 勛XKrs | 薰XKhf | 勳XKhs | | | | |
| XUN2 | 洵xKha | 循xKhu | 旬xKpa | 馴xKsl | 尋xKsi | 荀xKta | 巡xKyv | 詢xKya | |
| XUN4 | 殉Xkma | 遜Xkyf | 訊Xkyj | 迅XkyjC | 訓Xkyl | 汎Xkej | | |
| YA1 | 丫YAcl | 鴉YAmf | 壓YAmgC | 押YAql | 呀YArh | 鴨YAwf | | |
| YA2 | 涯yAeg | 衙yAhn | 牙yAmh | 芽yAth | 崖yAug | 伢yAoh | 蚜yAlh | | |
| YA3 | 雅yamg | 啞yarm | | | | | | |
| YA4 | 訝YAyh | 亞YAmm | | | | | | |

| | | | | | | | | | |
|---|---|---|---|---|---|---|---|---|---|
| YAN1 | 胭YZbk | 湮YZeg | 淹YZeu | 煙YZfg | 殷YZhe | 奄YZku | 醃YZmu | 焉YZmf | 咽YZrkC |
| | 燕YZtf | 嫣YZvf | 閹YZau | 菸YZty | | | | | |
| YAN2 | 閻yZax | 延yZnm | 沿yZer | 炎yZff | 簷yZhr | 筵yZhm | 研yZmt | 顏yZyc | 言yZyr |
| | 鹽yZst | 嚴yZrk | 岩yZur | 蜒yZlm | | | | | |
| YAN3 | 眼yzbv | 衍yzhn | 偃yzok | 偐yzov | 掩yzqu | 演yzec | | | |
| YAN4 | 晏Yzav | 堰Yzgv | 宴Yzjv | 雁Yzmg | 硯YzmuC | 厭Yzmk | 嚥Yzrf | 驗Yzso | 豔yzut |
| | 諺Yzyh | 艷yzuu | 讞Yzyk | 焰yzfx | 唁Yzrr | 燄Yznf | 魘Yzmv | | |
| YANG1 | 泱YGek | 央YGlk | 秧YGhk | 鴦YGlf | 殃YGmk | 怏Ygpk | | | |
| YANG2 | 楊yGdh | 洋yGeq | 佯yGfq | 瘍yGkh | 陽yGnh | 佯yGoqC | 揚yGqh | 羊yGtq | |
| YANG3 | 癢ygkv | 氧ygoq | 仰ygol | 養ygtv | | | | | |
| YANG4 | 樣YGde | 漾YGee | 恙YGtp | | | | | | |
| YAO1 | 腰YXbv | 夭YXhk | 吆YXri | 妖YXvk | 么YXhi | 邀YXyk | | | |
| YAO2 | 堯yXgu | 瑤yXmu | 饒yXou | 搖yXqu | 姚yXvo | 遙yXyu | 謠yxyuC | 餚yXob | 窯yXju |
| | 舀yxbx | 窈yxjs | 咬yxrk | | | | | | |
| YAO4 | 鷂Yxbf | 耀yxfg | 要Yxmv | 躍Yxrg | 藥Yxtd | | | | |
| YE1 | 噎YErt | 耶YEsl | 椰YEdl | | | | | | |
| YE2 | 爺yEcl | | | | | | | | |
| YE3 | 冶yeir | 野yewn | 也yepd | | | | | | |
| YE4 | 腋Yebk | 液Yeek | 頁Yemc | 業Yetd | 葉YetdC | 謁Yeyv | 夜Yeyk | 拽Yeqp | 掖Yeqk |
| | 曳Yelp | | | | | | | | |
| YI1 | 漪YIer | 壹YIgt | 一YIm | 依YIov | 伊YIok | 揖YIqj | 噫YIrp | 醫YIsw | 衣YIyv |
| | 尹YIsk | | | | | | | | |
| YI2 | 貽yIbr | 胰yIbn | 懿yIgp | 移yIhn | 宜yIjm | 飴yIorC | 儀yIoi | 疑yIpo | |
| | 怡yIpr | 頤yIscC | 姨yIvn | 夷yIkn | 遺yIycC | 誼yIym | 痍yIknC | 沂yIel | 彞yIvtC |
| YI3 | 椅yidr | 矣yiik | 蟻yili | 乙yinu | 倚yior | 以yivo | 已yisu | | |
| YI4 | 易Yiah | 臆Yibp | 溢Yiet | 液Yiek | 役Yihe | 軼Yijo | 疫Yike | 肄Yipq | 億Yiop |
| | 憶Yipp | 抑Yiql | 縊Yiri | 驛Yisj | 翼Yisc | 翌Yist | 藝YitiC | 意Yiyp | |
| | 義yiti | 益yitt | 屹Yiun | 繹Yivj | 縊Yivt | 異Yiwc | 詣Yiya | 奕yiyk | 逸YiyiC |
| | 譯Yiyj | 議Yiyi | 裔Yiyr | 衣Yiyv | 毅Yiye | 弋Yiip | 亦Yiyc | 弋Yiip | 癔Yikp |
| | 咦Yirn | 佚Yioo | 邑Yiru | | | | | | |
| YIN1 | 殷YNhe | 愁YNhp | 陰YNni | 姻YNvk | 因YNwk | 茵YNtkC | 音YNya | 蔭YNti | |
| YIN2 | 銀yNcv | 淫yNeg | 寅yNjc | 霪yNmg | 吟yNrn | 齦yNyv | | | |
| YIN3 | 癮ynkp | 蚓ynll | 引ynnl | 飲ynoo | 隱ynnp | | | | |
| YIN4 | 印Ynhl | | | | | | | | |
| YING1 | 鸚YNbf | 嬰YNbv | 櫻YNdv | 鶯YNffC | 鷹YNif | 膺YNib | 英YNtk | | |
| YING2 | 瑩Ynfi | 螢yNfiC | 營yNfr | 蠅yNlu | 盈yNnt | 迎yNyl | 嬴yNyc | 縈yNff | 熒yNffC |
| YING3 | 影ynah | 穎ynpc | | | | | | | |
| YING4 | 映Ynak | 應Ynip | 硬Ynmk | | | | | | |
| YO1 | 哟YOri | | | | | | | | |
| YONG1 | 臃YCbg | 庸YCib | 擁YCqg | 癰YCkg | 雍YCyg | | | | |
| YONG2 | 傭yCob | | | | | | | | |
| YONG3 | 湧yces | 泳ycee | 永ycie | 蛹yclb | 慂ycnp | 勇ycns | 詠ycye | 踴ycrs | |
| YONG4 | 用Ycbq | 佣Ycoq | | | | | | | |
| YOU1 | 優YDoe | 悠IDop | 憂YDme | 幽YDui | 攸YDok | | | | |
| YOU2 | 遊yDed | 油yDew | 郵yDhl | 遊yDyd | 疣yDku | 猶yDkw | 尤yDiu | 由yDlw | |
| YOU3 | 有ydkb | 友ydke | 酉ydmm | | | | | | |

| | | | | | | | | | |
|---|---|---|---|---|---|---|---|---|---|
| YOU4 | 釉Ydhw | 鈾Ydcw | 柚Yddw | 祐Ydir | 宥Ydjb | 右Ydkr | 又Ydnk | 琇Ydts | 幼Ydvs |
| | 佑Ydor | 囿Ydwb | 蚴Ydls | 勸Ydws | 誘Ydys | | | | |
| YU1 | 淤YVey | 瘀YVky | 迂YVyd | | | | | | |
| YU2 | 榆yVdn | 漁yVef | 輿yVhcC | 臾yVho | 芋yVtd | 盂yVmt | 于yVmd | 魚yVnf | 愚yVwp |
| | 隅yVnb | 予yVnn | 餘yVod | 鮪yVou | 余yVodC | 愉yVpn | | | |
| | 渝yVen | 逾yVyn | 虞yVyk | 於yVyy | 諛yVyo | 禹yVwi | 娛yVvk | | |
| YU3 | 禹yvhi | 宇yvjd | 雨yvmy | 羽yvsm | 嶼yvuc | 語yvyr | 齬yvyrC | 臾yvho | |
| | 與yvhc | | | | | | | | |
| YU4 | 愈Yvop | 欲Yvco | 慾Yvcp | 鬱Yvdh | 浴Yver | 譽yVhr | 籲YvhcC | 禦Yvhf | 喻Yvrn |
| | 御Yvhl | 寓Yvjb | 癒Yvkp | 獄Yvkk | 裕Yvlr | 聿Yvlq | 玉Yvmi | 預Yvnc | 豫Yvno |
| | 俞Yvon | 馭Yvse | 郁yvkl | 遇Yvyb | 育YvybC | 瑜Yvmn | 域Yvgm | 閾Yvam | |
| YUAN1 | 冤YHbi | 淵YHel | 鴛YHnf | | | | | | |
| YUAN2 | 爰yHbe | 源yHef | 沅yHeu | 袁yHgv | 垣yHgm | 轅yHjv | 猿yHkv | 原yHmf | 元yHmu |
| | 援yHqe | 員yHrc | 緣yHvo | 媛yHve | 圓yHwc | 園yHwv | | | |
| YUAN3 | 遠yhyv | | | | | | | | |
| YUAN4 | 願Yhmc | 院Yhnu | 怨Yhnp | 苑Yhtu | | | | | |
| YUE1 | 約YLvi | | | | | | | | |
| YUE4 | 閱YLau | 月YLb | 鑰YLcb | 耀YLfg | 粵YLhs | 岳YLou | 悅YLpu | 躍YLrg | 獄YLuk |
| | 樂YLvd | 越Ylgv | 曰Yla | | | | | | |
| YUN1 | 暈YKaj | | | | | | | | |
| YUN2 | 云yKmi | 雲yKmiC | 勻yKpm | 耘yKqi | 紜yKvi | 芸yKti | | | |
| YUN3 | 允ykiu | 隕yknc | 殞ykmc | | | | | | |
| YUN4 | 均Ykgm | 醞Ykmt | 孕yknd | 慍Ykpt | 熨Yksp | 韻Ykyc | 運Ykyj | 惲Ykpj | 蘊Yktt |
| | 韵Ykym | 熨Yksf | | | | | | | |
| ZA1 | 粢ZAdu | 喊ZArf | 匝ZAsb | | | | | | |
| ZA2 | 砸zAmb | 咱zAru | 雜zAyg | | | | | | |
| ZAI1 | 栽ZTjd | 哉ZTjr | 災ZTvf | | | | | | |
| ZAI3 | 載ztjj | 宰ztjjC | 仔ztod | 崽ztup | | | | | |
| ZAI4 | 在Ztkg | 再Ztmb | | | | | | | |
| ZAN4 | 贊Zzhc | 暫Zzja | 讚Zzyc | 攢Zzqc | | | | | |
| ZANG1 | 髒ZGbt | 贓ZGbsC | | | | | | | |
| ZANG4 | 臟Zgbs | 藏Zgts | 葬Zgtt | | | | | | |
| ZAO1 | 糟ZXfa | 遭ZXya | | | | | | | |
| ZAO3 | 早zxaj | 蚤zxei | 澡zxed | 藻zxtd | 棗zxdb | | | | |
| ZAO4 | 燥Zxfd | 灶Zxfg | 皂Zxhp | 躁zxrd | 造zxyr | 噪ZxrdC | | | |
| ZE2 | 賊zEbj | 則zEbn | 澤zEej | 笮zEjs | 責zEqc | 擇zEqj | 嘖zErc | | |
| ZE4 | 側Zeon | | | | | | | | |
| ZEI2 | 賊Zfbj | | | | | | | | |
| ZEN3 | 怎znop | | | | | | | | |
| ZENG1 | 曾ZNca | 增ZNga | 憎ZNpa | | | | | | |
| ZENG4 | 贈Znba | | | | | | | | |
| ZHA1 | 渣ZAem | 扎ZAqu | 嗏ZArm | 吒ZArp | 咋ZArs | 鍘ZAcn | | | |
| ZHA2 | 閘zAal | 札zAdu | 劄zAhn | 軋zAju | | | | | |
| ZHA3 | 眨zabo | | | | | | | | |
| ZHA4 | 榨Zads | 炸Zafs | 搾Zaqs | 咋Zars | 乍Zaos | 詐Zays | | | |
| ZHAI1 | 摘ZTqb | 齋ZTyf | | | | | | | |

| | | | | | | | | |
|---|---|---|---|---|---|---|---|---|
| ZHAI2 | 宅zTjp | 翟zTsg | 擇zTqj | | | | | |
| ZHAI3 | 窄ztjs | | | | | | | |
| ZHAI4 | 寨ZtjdC | 債Ztoc | | | | | | |
| ZHAN1 | 瞻ZZbr | 沾ZZer | 詹ZZnr | 氈ZZyu | 譫ZZyrC | 粘ZZfr | 氈ZZhr | |
| ZHAN3 | 盞zzit | 嶄zzul | 輾zzjv | 斬zzjl | 展zzsv | | | |
| ZHAN4 | 棧Zzdi | 湛Zzev | 佔Zzor | 戰Zzri | 綻Zzvo | 顫ZzycC | 站Zzyr | 占ZzyrC | 蘸Zztf |
| ZHANG1 | 樟ZGdj | 漳ZGej | 蟑ZGlj | 張ZGnv | 章ZGyj | 彰ZGyh | | |
| ZHANG3 | 漲zgev | 掌zgfq | 長zgsv | | | | | |
| ZHANG4 | 賬Zgbv | 脹ZgbvC | 丈Zgjk | 瘴Zgkj | 幛ZgljC | 障Zgnj | 仗Zgok | 杖Zgdk | 帳Zglv |
| | 杖Zgqk | | | | | | | |
| ZHAO1 | 昭ZXar | 朝ZXjb | 招ZXqr | | | | | |
| ZHAO3 | 沼zxer | 爪zxhoC | 找zxqi | | | | | |
| ZHAO4 | 照Zxaf | 兆Zxlo | 趙Zxgb | 肇Zxhq | 召Zxsr | 罩Zxwj | 詔ZxyrC | | |
| ZHE1 | 遮ZEyf | 嫮ZEvf | 折ZEql | | | | | |
| ZHE2 | 輒zEju | 褶zEla | 謫zEyb | 哲zEqr | 摺zEqa | | | |
| ZHE3 | 者zeja | | | | | | | |
| ZHE4 | 浙Zeel | 鷓Zeif | 宅Zejp | 蔗Zetf | 這Zeyr | | | |
| ZHEN1 | 針ZNcj | 箴ZNhr | 真ZNjc | 砧ZNmr | 甄ZNmn | 珍ZNmh | 偵ZNoc | 斟ZNtj | 臻ZNmd |
| | 貞ZNyc | | | | | | | |
| ZHEN3 | 枕zndu | 疹znkh | 診znyh | | | | | |
| ZHEN4 | 賑Znbv | 朕Znbk | 鎮Zncc | 震Znmv | 陣Znnj | 振Znqv | 圳Zngl | | |
| ZHENG1 | 睜ZNbdC | 爭ZNbd | 徵ZNhk | 錚ZNcd | 箏ZNhd | 征ZNhm | 癥ZNhkC | 狰ZNkd | 征ZNpm |
| | 掙ZNqd | 蒸ZNtf | 崢ZNud | 諍ZNyd | 錚ZNcd | 幀ZNlc | | |
| ZHENG3 | 整zndm | 拯znqm | | | | | | |
| ZHENG4 | 症Znkm | 正Znmm | 政Znmk | 鄭Zntl | 證Znyt | | | |
| ZHI1 | 脂ZIba | 肢ZIbe | 枝ZIde | 汁ZIej | 之ZIio | 支ZIje | 蜘ZIlr | 知ZIor | 吱ZIre |
| | 芝ZIto | 織ZIva | 隻ZIoe | 螯ZIgi | 胝ZIbm | | | |
| ZHI2 | 植zIdm | 執zIgi | 質zIhc | 直zIjm | 殖zImm | 值zIom | 擲zIql | 職zIsa | 躑zIrl |
| | 姪zIvg | 侄zIog | 桎zIdg | | | | | |
| ZHI3 | 址zigm | 祉ziimC | 指ziqa | 趾zirm | 只zirc | 咫zisc | 紙zivp | 旨zipa | 止ziym |
| ZHI4 | 滯Zieb | 致Zimk | 治Zier | 摯Zigq | 志Zigp | 製Zihv | 稚Zihg | 制Zihn | 窒Zijg |
| | 痣Zikp | 痔Ziki | 蛭Zilg | 幟Zila | 至Zimg | 智Zioa | 緻Zivk | 置Ziwm | 誌Ziyp |
| | 炙Zibf | 秩Ziho | 櫛Zidl | 峙Ziui | | | | |
| ZHONG1 | 鐘ZCcg | 鍾ZCcgC | 衷ZCyv | 忠ZClp | 中ZCl | 終ZCvy | 盅ZCot | | |
| ZHONG3 | 腫zcbg | 塚zcgo | 種zchg | 踵zcrg | | | | |
| ZHONG4 | 綜Zcvf | 重ZchgC | 仲Zcol | 眾Zcwo | | | | |
| ZHOU1 | 周ZDbr | 洲ZDel | 舟ZDhi | 州ZDil | 粥ZDnn | 週ZDyr | 謅ZDyu | | |
| ZHOU2 | 軸ZDjwC | 妯ZDvw | | | | | | |
| ZHOU3 | 肘zdbi | 帚zdsb | 走zdgo | | | | | |
| ZHOU4 | 宙Zdjw | 胄Zdlb | 晝Zdlm | 皺Zdpe | 咒Zdrn | 紂Zdvi | 縐Zdvu | 驟Zdso | |
| ZHU1 | 珠ZUmd | 株ZUdd | 朱ZUhdC | 蛛ZUld | 豬ZUma | 諸ZUya | 誅ZUyd | | |
| ZHU2 | 燭zUfi | 築zUhd | 竺zUhmC | 竹zUh | 逐zUyo | | | |
| ZHU3 | 貯zubn | 囑zubi | 煮zujf | 嘱zuri | 主zuyg | | | |
| ZHU4 | 助Zubs | 蛀Zulg | 鑄Zuci | 柱Zudg | 注Zueg | 祝Zuiu | 佇Zuon | 住Zuog | 駐Zusg |
| | 著Zuta | 註ZuygC | 苎Zutn | 炷Zuqg | | | | |
| ZHUA1 | 抓ZBqo | | | | | | | |

| | | | | | | | | |
|---|---|---|---|---|---|---|---|---|
| ZHUA3 | 爪zbho | | | | | | | |
| ZHUAN1 | 專ZHji | 磚ZHmi | 尚ZHul | | | | | |
| ZHUAN3 | 轉zhjiC | | | | | | | |
| ZHUAN4 | 賺Zhbc | 傳Zhoi | 撰Zhqc | | | | | |
| ZHUANG1 | 莊ZWtg | 裝ZWvv | 妝ZWvvC | 樁ZWdx | | | | |
| ZHUANG4 | 壯Zwvg | 狀Zwvk | | | | | | |
| ZHUI1 | 錐ZQcg | 椎ZQdg | 追ZQyr | | | | | |
| ZHUI4 | 贅Zqgc | 墜Zqng | 綴Zqve | | | | | |
| ZHUN1 | 諄ZKyd | | | | | | | |
| ZHUN3 | 準zkej | 准zkig | | | | | | |
| ZHUO1 | 捉ZOqo | 桌ZOyd | 卓ZOyj | 拙ZOqu | 啄ZOro | | | |
| ZHUO2 | 鐲zOci | 濯zOeg | 濁zOei | 灼zOfi | 酌zOmi | 琢zOmo | 茁zOyuC | 著zOtu |
| ZI1 | 滋ZIei | 淄ZIew | 資ZIic | 恣ZIip | 咨ZIir | 輜ZIjw | 孜ZInk | 吱ZIre | 茲ZIti |
| | 諮ZIyr | 姿ZIiv | | | | | | |
| ZI3 | 子zind | 滓ziejC | 仔ziod | 梓zidj | 紫ziyf | 姊zivh | 籽zifd | | |
| ZI4 | 自Zihu | 字Zijd | 漬Ziec | | | | | |
| ZONG1 | 棕ZCff | 宗ZCjf | 蹤ZCro | 椶ZCdf | 綜ZCvf | 鬃ZCsf | | |
| ZONG3 | 總zcvp | | | | | | | |
| ZONG4 | 縱Zcvo | | | | | | | |
| ZOU1 | 鄒ZDpl | | | | | | | |
| ZOU3 | 走zdgo | | | | | | | |
| ZOU4 | 揍Zdqk | 奏ZdqkC | 騶Zdso | | | | | |
| ZU1 | 租ZUhm | | | | | | | |
| ZU2 | 足zUro | 族zUyk | 卒zUyj | | | | | |
| ZU3 | 祖zuim | 組zuvm | 阻zunm | 詛zuym | | | | |
| ZUAN1 | 鑽ZHcc | | | | | | | |
| ZUAN3 | 纂zhhf | | | | | | | |
| ZUI3 | 嘴zqrb | 咀zqrm | | | | | | |
| ZUI4 | 最Zqae | 醉Zqmj | 罪Zqwy | | | | | |
| ZUN1 | 尊ZKti | 遵ZKyi | | | | | | |
| ZUN4 | 俊Zkoe | | | | | | | |
| ZUO2 | 怍zOos | 昨zOas | | | | | | |
| ZUO3 | 左zokm | 佐zoom | 撮zoqe | | | | | |
| ZUO4 | 座Zoig | 坐Zoog | 做Zook | 鑿Zotc | 柞Zods | | | |

It is noted that, in TABLE III, the first Chinese character C1 shown in FIG. 1 is listed at row ZHUAN1 (13th line down from the top of the page) on page T-42, along with two homophonic characters. Its present invention audio-video code "ZHji" is listed next to it. The second Chinese character C2 shown in FIG. 1 is listed at row LI4 (third line from the top of the page) on page T-19, along with its 33 homophonic characters. Listed next to it is its present invention audio-video code "Lihn".

It is also noted that, in TABLE III, some of the Chinese characters share the same audio-video code because their pronunciations are the same, and their first and last strokes are the same respectively. In such situations the most commonly used Chinese character will have the original form of the audio-video code and the less commonly used Chinese character(s) will have a letter "C" added to their respective audio-video code. An example can be found at row AI1 (the second row) on page T-1, where the third and fourth Chinese characters share the same audio-video code "AIrk", and the audio-video code for the less common fourth character has an added "C" and becomes to "AIrkC".

It is further noted that, in TABLE III, the video code element of the audio-video codes of 24 special Chinese characters has only one letter. These 24 special Chinese characters are shown in FIG. 2 where each of them is assigned a single English letter. For example, the first special Chinese character shown in FIG. 2 is assigned English letter "A". Its audio-video code is listed at row RI4 (8th row from the top of the page) on page T-28, where the video element is a single English letter "a". In the video element, whether the English letters are upper or lower case bears no significance. In TABLE III the video elements of all present invention audio-video codes are written in lowercase letters. They can be nevertheless written in upper case letters.

The audio elements of the present invention audio-video codes present a different case. As disclosed earlier, the present invention uses the combination of upper and lower-case letters in the audio element of the audio-video codes to denote the accent tones of the encoded Chinese characters. The present invention uses uppercase for both the first and second English letters to denote a first accent tone, lowercase for the first English letter but uppercase for the second English letter to denote a second accent tone, uppercase for the first English letter but lowercase for the second English letter to denote a third accent tone, and uses lowercase for both the first and second English letters to denote a fourth accent tone.

Generally described, the present invention is an audio-video coding system for Chinese characters. In the present invention coding system, each Chinese character is represented by an audio-video code. Each audio-video code of the present invention has two elements. The first element is an audio code element, and the second element is a video code element. The audio code element is always made of two English letters. The first English letter of the audio code element represents the consonant of the syllable of a Chinese character, and the second English letter represents the vowel of the syllable of the Chinese character. The video code element is made of two English letters in most situations. The first English letter of the video code element represents the first stroke of the Chinese character, and the second English letter represents the last stroke of the Chinese character. Only for 24 particular Chinese characters their respective video code element has one English letter, and for approximately 4% Chinese characters their respective video code element has an additional English letter "C" for indicating duplicated codes.

The principal advantage of the present invention is that it provides a distinctive audio-video code for each Chinese character. Such audio-video code is intelligently constructed which is easy to remember, because it is constructed according to the phono and picto-aspects of the Chinese character. Another principal advantage of the present invention audio-video coding system is that it can be implemented into wordprocessing equipment such as a computer which uses a standard English keyboard. Almost all prior art coding systems for Chinese characters require certain modification or even reconstruction of the keyboard so it is suitable for the input method of the particular coding system. In contrast, the present invention coding system suits the most common word processing equipment currently used by vast majority of consumers in western countries.

Figure 4:
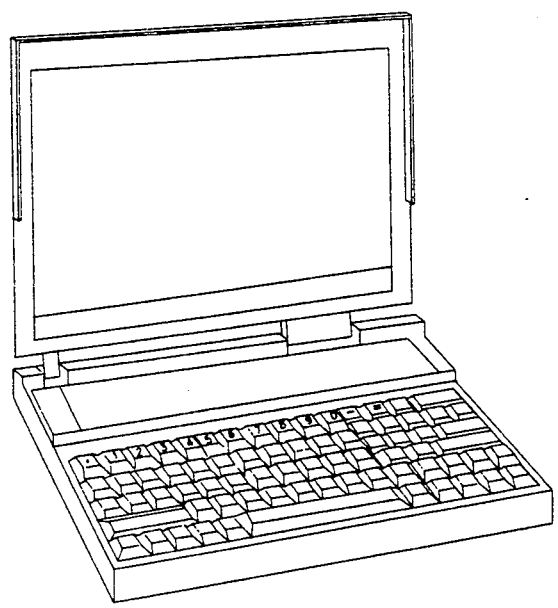
FIG. 4 is a perspective view of a computer word-processor with standard English alphabet keyboard, which word-processor is implemented with the present invention audio-video coding systems for Chinese characters.
Figure 5:
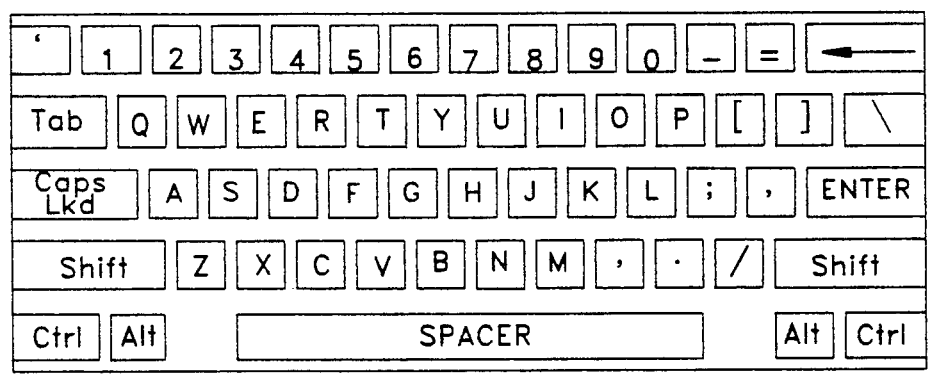
FIG. 5 is an enlarged top-plan view of the standard English alphabet keyboard of the computer word-processor shown in FIG. 5.
Figure 6:
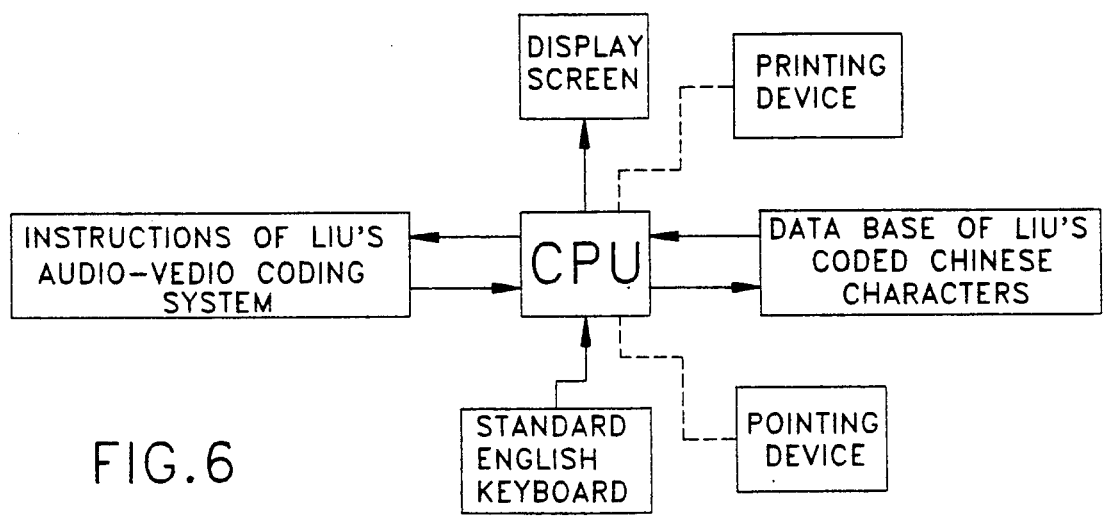
FIG. 6 is a block diagram illustrating the computer implementation of the present invention audio-video coding system for Chinese characters.

Referring to FIGS. 4, 5 and 6, there is shown how the present invention coding method is implemented into word-processing equipment such as a personal computer. A personal lap-top computer is shown in FIG. 4 which has a standard English keyboard as shown in FIG. 5. Of course the present invention coding system may be implemented into any type of suitable word processing equipment, including other types of computers. The major components of the preferred embodiment of the present invention word processing apparatus are illustrated by the block diagram shown in FIG. 6. It includes a central processing unit "CPU") which receives the signal from the keyboard. Once the input from the keyboard is received, the CPU will follow the instructions of the present invention coding system, locate from the database of coded Chinese characters the desired character which matches the input from the keyboard, and display the character on the monitor screen. The database has the capacity of maintaining at least the about 5,000 commonly used Chinese characters as listed in TABLE III, which are all coded according to the present invention audio-video coding system. Of course the database may store many more Chinese characters which are coded by the present invention coding system and/or other coding system. Other types of word processing apparatus may also be connected to the CPU, including a pointing device such as a mouse, a printer, and input/output "I/O") communication ports.

It is noted, however, that for computer input, the upper case and lowercase of the English letters of the audio element of the present invention audio-video codes make no difference from each other as they are taken as the same thing by the computer. The users of the present invention do not have to remember the difference between the upper case and lowercase of the English letters of the audio element of the present invention audio-video codes.

The present invention also includes the implementation of encoding the Chinese characters according to the audio-video coding system of the present invention. The present invention encoding apparatus has means for constructing an audio code element for a particular one of the multiplicity of Chinese characters which has a single syllable formed by a consonant and a vowel of the Chinese language, the audio code element consisting of a first English letter designated for representing the consonant, and a second English letter designated for representing the vowel; means for denoting an accent tone of the syllable of the particular one of the multiplicity of Chinese characters by combining alternate upper and lowercase letters in the audio code element; means for constructing a video code element for the particular one of the multiplicity of Chinese characters which also has a unitary shape formed by a plurality of strokes including an initial stroke and a final stroke, the video code element consisting of a third English letter designated for representing the initial stroke, and a fourth English letter designated for representing the final stroke; and means for encoding the particular one of the multiplicity of Chinese characters with an integral audio-video code of four English letters, which is constructed by compiling together the audio code element and the video code element of the particular one of the multiplicity of Chinese characters. The encoding apparatus further includes means for repeating the above operations until the multiplicity of Chinese characters are all encoded, so that each one of the multiplicity of Chinese characters is individually encoded and accurately identified by a distinctive audio-video code consisting of four English letters, which represent not only phonetic pronunciation but also pictographic configuration as well as accent tone of each one of the multiplicity of Chinese characters.

Moreover, the present invention is a complete system of encoding and processing the Chinese characters. The encoding means of the present invention encoding and processing apparatus include means for constructing an audio code element for a particular one of the multiplicity of Chinese characters which has a single syllable formed by a consonant and a vowel of Chinese language, the audio code element consisting of a first English letter designated for representing the consonant, and a second English letter designated for representing the vowel; means for denoting an accent tone of the syllable of the particular one of the multiplicity of Chinese characters by combining alternate upper and lowercase letters in the audio code element; means for constructing a video code element for the particular one of the multiplicity of Chinese characters which also has a unitary shape formed by a plurality of strokes including an initial stroke and a final stroke, the video code element consisting of a third English letter designated for representing the initial stroke, and a fourth English letter designated for representing the final stroke; means for encoding the particular one of the multiplicity of Chinese characters with an integral audio-video code of four English letters, which is constructed by compiling together the audio code element and the video code element of the particular one of the multiplicity of Chinese characters; and means for repeating the above operation until the multiplicity of Chinese characters are all encoded. The processing means of the present invention encoding and processing system include means for maintaining a database of the multiplicity of coded characters; means for inputing the audio-video codes of the multiplicity of Chinese characters; means for displaying the multiplicity of Chinese characters; and means for receiving input codes from the input means, acquiring matching Chinese characters from the database, and sending such Chinese characters to the display means. Each one of the multiplicity of Chinese characters is individually encoded and accurately identified by a distinctive audio-video code consisting of four English letters, which represent not only phonetic pronunciation but also pictographic configuration as well as accent tone of each one of the multiplicity of Chinese characters. When a user types a code consisting of a limited number of English letters on the keyboard means for a desired Chinese character, the Chinese character processing apparatus can identify according to the code without any further input the desired Chinese character from the coded Chinese character stored in the database, and show the desired Chinese character on the display means.

Figure 7:
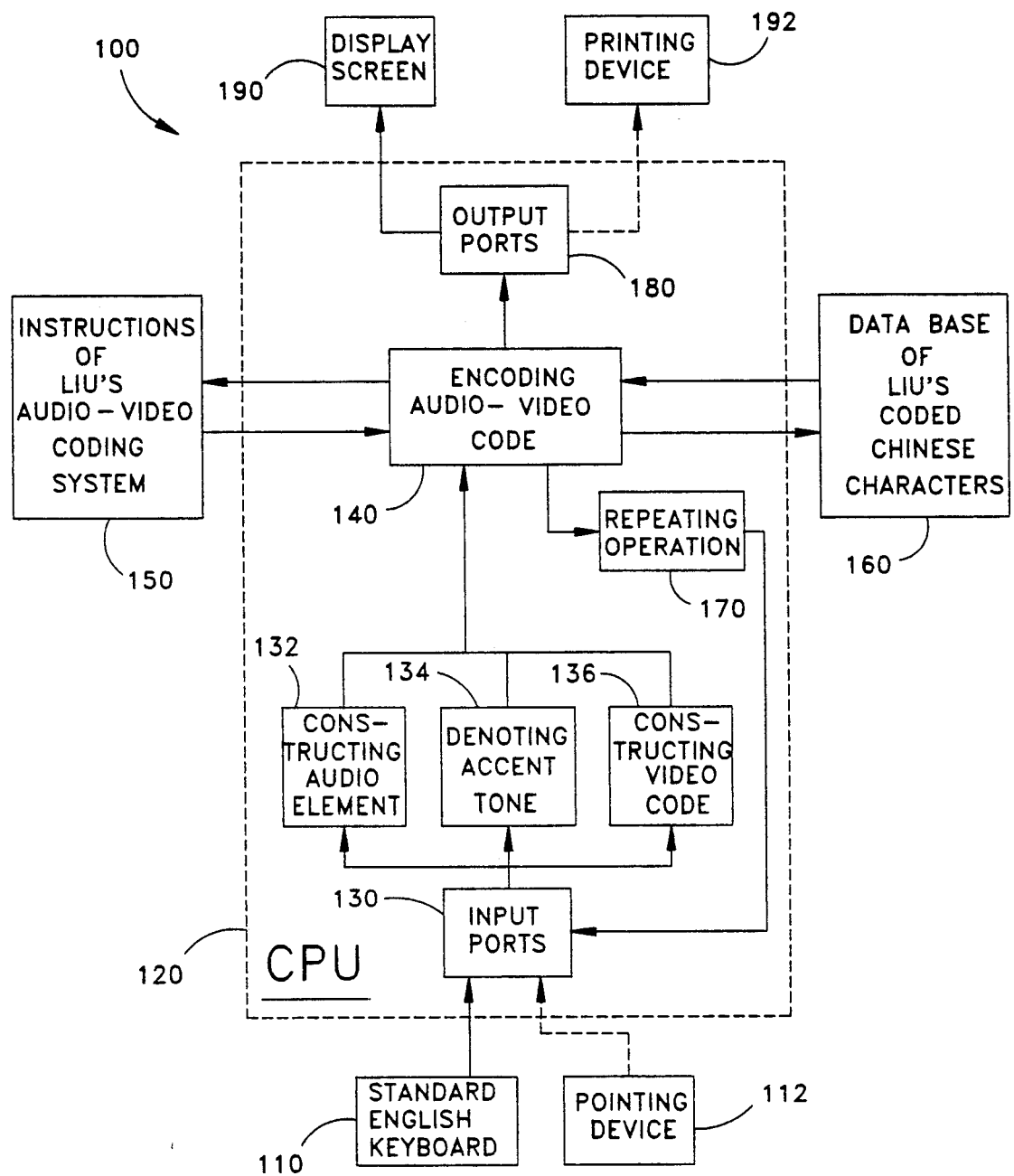
FIG. 7 is a detailed block diagram illustrating the structural elements of the central processing unit (CPU) of the computer implementation of the present invention audio-video coding system for Chinese characters.

Referring to FIG. 7, there is shown at 100 a detailed block diagram illustrating the structural elements of the central processing unit (CPU) of the computer implementation of the present invention audio-video coding system for Chinese characters. The computer system 100 includes a standard English keyboard 110, a CPU 120, memory devices including a memory device 150 for storing the instructions of LIU's audio-video coding system and a memory device 160 for storing the data base of LIU's coded Chinese characters. The CPU 120 has an input port 130 for receiving keyboard input which is used to construct the audio, tone and video of the given Chinese character, a coding device 140 which operates under the instruction stored in the memory device 150 and exchanges information with the data base stored in memory device 160. Through output port 180 of the CPU the Chinese character can be viewed on display screen 190. This process can be repeated for other Chinese characters. The computer system may also include optional devices such as a pointing device 112 which may be a mouse and a printing device 192.

Defined in detail, the present invention is a method for encoding a multiplicity of Chinese characters with English letters comprising the steps of: (a) selecting a first group of English letters designated to represent a multiplicity of consonants of the Chinese language respectively, the first group consisting of 20 English letters B, C, D, F, G, H, J, K, L, M, N, P, Q, R, S, T, W, X, Y and Z; (b) selecting a second group of English letters designated to represent a multiplicity of vowels of the Chinese language respectively, the second group consisting of all 26 English letters; (c) selecting a third group of English letters designated to represent a multiplicity of strokes of the Chinese language respectively, the third group consisting of 24 English letters which include all 26 English letters except X and Z; (d) ascertaining a phonetic pronunciation of a particular one of the multiplicity of Chinese characters which has a single syllable formed by a particular one of the multiplicity of consonants and a particular one of the multiplicity of vowels; (e) constructing an audio code element for the particular one of the multiplicity of Chinese characters, the audio code element consisting of a first English letter which is selected from the first group of English letters and is designated for representing the particular one of the multiplicity of consonants, and a second English letter which is selected from the second group of English letters and is designated for representing the particular one of the multiplicity of vowels; (f) denoting one of four possible accent tones of the syllable of the particular one of the multiplicity of Chinese characters by combining alternate upper and lowercase letters in the audio code element, using uppercase for both the first and second English letters to denote a first accent tone, using lowercase for the first English letter but uppercase for the second English letter to denote a second accent tone, using uppercase for the first English letter but lowercase for the second English letter to denote a third accent tone, and using lowercase for both the first and second English letters to denote a fourth accent tone; (g) ascertaining a pictographic configuration of the particular one of the multiplicity of Chinese characters which also has a unitary shape formed by several particular ones of the multiplicity of strokes including an initial stroke and a final stroke; (h) constructing a video code element for the particular one of the multiplicity of Chinese characters, the video code element consisting of two English letters selected from the third group of English letters, including a third English letter which is designated for representing the initial stroke, and a fourth English letter which is designated for representing the final stroke; (i) encoding the particular one of the multiplicity of Chinese characters with an integral audio-video code of four English letters, which is constructed by compiling together the audio code element and the video code element of the particular one of the multiplicity of Chinese characters; and (j) repeating steps "d" through "i" until the multiplicity of Chinese characters are all encoded; (k) whereby each one of the multiplicity of Chinese characters is individually encoded and accurately identified by a distinctive audio-video code consisting of four English letters, which represent not only phonetic pronunciation but also pictographic configuration as well as accent tone of each one of the multiplicity of Chinese characters.

In the preferred embodiment of the present invention audio-video coding system: (a) the first group of 20 English letters represents a directly corresponding single-letter PINYIN consonant; (b) English letter "C" of the first group of 20 English letters also represents a multi-letter PINYIN consonant "Ch"; (c) English letter "S" of the first group of 20 English letters also represents a multi-letter PINYIN consonant "Sh"; and (d) English letter "Z" of the first group of 20 English letters also represents a multi-letter PINYIN consonant "Zh".

The phrase "ascertaining a phonetic pronunciation" means the process of making certain or finding out with certainty the phonetic pronunciation of a particular Chinese character, and the phrase "ascertaining a photographic configuration" means the process of making certain or finding out with certainty the pictographic configuration of the particular Chinese character.

In addition, in the preferred embodiment of the present invention audio-video coding system: (a) English letter "A" of the second group of 26 English letters represents a single-letter PINYIN vowel "a"; (b) English letter "B" of the second group of 26 English letters represents a multi-letter PINYIN vowel "ua"; (c) English letter "C" of the second group of 26 English letters represents a multi-letter PINYIN vowel "ong" and another multi-letter PINYIN vowel "iong"; (d) English letter "D" of the second group of 26 English letters represents a multi-letter PINYIN vowel "ou"; (e) English letter "E" of the second group of 26 English letters represents a single-letter PINYIN vowel "e"; (f) English letter "F" of the second group of 26 English letters represents a multi-letter PINYIN vowel "ei"; (g) English letter "G" of the second group of 26 English letters represents a multi-letter PINYIN vowel "ang"; (h) English letter "H" of the second group of 26 English letters represents a multi-letter PINYIN vowel "uan" and another multi-letter PINYIN vowel "üan"; (i) English letter "I" of the second group of 26 English letters represents a single-letter PINYIN vowel "i"; (j) English letter "J" of the second group of 26 English letters represents a multi-letter PINYIN vowel "in" and another multi-letter PINYIN vowel "ing"; (k) English letter "K" of the second group of 26 English letters represents a multi-letter PINYIN vowel "un" and another multi-letter PINYIN vowel "ün"; (l) English letter "L" of the second group of 26 English letters represents a multi-letter PINYIN vowel "ue"; (m) English letter "M" of the second group of 26 English letters represents a multi-letter PINYIN vowel "ie"; (n) English letter "N" of the second group of 26 English letters represents a multi-letter PINYIN vowel "en" and another multi-letter PINYIN vowel "eng", or a multi-letter PINYIN vowel "in" and another multi-letter PINYIN vowel "ing" when following consonants "J", "Q" or "X"; (o) English letter "O" of the second group of 26 English letters represents a single-letter PINYIN vowel "o" and another multi-letter PINYIN vowel "uo"; (p) English letter "P" of the second group of 26 English letters represents a multi-letter PINYIN vowel "ian"; (q) English letter "Q" of the second group of 26 English letters represents a multi-letter PINYIN vowel "iu" and another multi-letter PINYIN vowel "ui"; (r) English letter "R" of the second group of 26 English letters represents a multi-letter PINYIN vowel "iang"; (s) English letter "S" of the second group of 26 English letters represents a multi-letter PINYIN vowel "iao"; (t) English letter "T" of the second group of 26 English letters represents a multi-letter PINYIN vowel "ai"; (u) English letter "U" of the second group of 26 English letters represents a single-letter PINYIN vowel "u"; (v) English letter "V" of the second group of 26 English letters represents a single-letter PINYIN vowel "ti"; (w) English letter "W" of the second group of 26 English letters represents a multi-letter PINYIN vowel "uang"; (x) English letter "X" of the second group of 26 English letters represents a multi-letter PINYIN vowel "ao"; (y) English letter "Y" of the second group of 26 English letters represents a multi-letter PINYIN vowel "uai"; and (z) English letter "Z" of the second group of 26 English letters represents a multi-letter PINYIN vowel "an".

Furthermore, in the preferred embodiment of the present invention audio-video coding system: (a) 24 of the multiplicity of Chinese characters are designated as "Chinese Alphabet Components" each having an audio code element of one respective English letter selected from the third group of 24 English letters; and (b) an additional fifth English letter "C" is used to denote a duplicate code of a Chinese character which has a same audio-video code as another Chinese character.

Defined broadly, the present invention is a method for encoding a multiplicity of Chinese characters with English letters comprising the steps of: (a) selecting a first group of English letters designated to represent a multiplicity of consonants of the Chinese language respectively; (b) selecting a second group of English letters designated to represent a multiplicity of vowels of the Chinese language respectively; (c) selecting a third group of English letters designated to represent a multiplicity of strokes of the Chinese language respectively; (d) ascertaining a phonetic pronunciation of a particular one of the multiplicity of Chinese characters which has a single syllable formed by a particular one of the multiplicity of consonants and a particular one of the multiplicity of vowels; (e) constructing an audio code element for the particular one of the multiplicity of Chinese characters, the audio code element consisting of a first English letter which is selected from the first group of English letters and is designated for representing the particular one of the multiplicity of consonants, and a second English letter which is selected from the second group of English letters and is designated for representing the particular one of the multiplicity of vowels; (f) denoting one of four possible accent tones of the syllable of the particular one of the multiplicity of Chinese characters by combining alternate upper and lowercase letters in the audio code element, using uppercase for both the first and second English letters to denote a first accent tone, using lowercase for the first English letter but uppercase for the second English letter to denote a second accent tone, using uppercase for the first English letter but lowercase for the second English letter to denote a third accent tone, and using lowercase for both the first and second English letters to denote a fourth accent tone; (g) ascertaining a pictographic configuration of the particular one of the multiplicity of Chinese characters which also has a unitary shape formed by several particular ones of the multiplicity of strokes including an initial stroke and a final stroke; (h) constructing a video code element for the particular one of the multiplicity of Chinese characters, the video code element consisting of two English letters selected from the third group of English letters, including a third English letter which is designated for representing the initial stroke, and a fourth English letter which is designated for representing the final stroke; (i) encoding the particular one of the multiplicity of Chinese characters with an integral audio-video code of four English letters, which is constructed by compiling together the audio code element and the video code element of the particular one of the multiplicity of Chinese characters; and (j) repeating steps "d" through "i" until the multiplicity of Chinese characters are all encoded; (k) whereby each one of the multiplicity of Chinese characters is individually encoded and accurately identified by a distinctive audio-video code consisting of four English letters, which, represent not only phonetic pronunciation but also pictographic configuration as well as accent tone of each one of the multiplicity of Chinese characters.

Defined more broadly, the present invention is a method for encoding a multiplicity of Chinese characters with English letters comprising the steps of: (a) ascertaining a phonetic pronunciation of a particular one of the multiplicity of Chinese characters which has a single syllable formed by a particular one of a multiplicity of consonants and a particular one of a multiplicity of vowels of the Chinese language; (b) constructing an audio code element for the particular one of the multiplicity of Chinese characters, the audio code element consisting of a first English letter which is designated for representing the particular one of the multiplicity of consonants, and a second English letter which is designated for representing the particular one of the multiplicity of vowels; (c) denoting an accent tone of the syllable of the particular one of the multiplicity of Chinese characters by combining alternate upper and lowercase letters in the audio code element; (d) ascertaining a pictographic configuration of the particular one of the multiplicity of Chinese characters which also has a unitary shape formed by several particular ones of the multiplicity of strokes including an initial stroke and a final stroke; (e) constructing a video code element for the particular one of the multiplicity of Chinese characters, the video code element consisting of a third English letter which is designated for representing the initial stroke, and a fourth English letter which is designated for representing the final stroke; (f) encoding the particular one of the multiplicity of Chinese characters with an integral audio-video code of four English letters, which is constructed by compiling together the audio code element and the video code element of the particular one of the multiplicity of Chinese characters; and (g) repeating steps "a" through "f" until the multiplicity of Chinese characters are all encoded; (h) whereby each one of the multiplicity of Chinese characters is individually encoded and accurately identified by a distinctive audio-video code consisting of four English letters, which represent not only phonetic pronunciation but also pictographic configuration as well as accent tone of each one of the multiplicity of Chinese characters.

Defined much more broadly, the present invention is a method for encoding a multiplicity of Chinese characters with English letters comprising the steps of: (a) constructing an audio code element for a particular one of the multiplicity of Chinese characters which has a single syllable formed by a consonant and a vowel of the Chinese language, the audio code element consisting of a first English letter designated for representing the consonant, and a second English letter designated for representing the vowel; (b) denoting an accent tone of the syllable of the particular one of the multiplicity of Chinese characters by combining alternate upper and lowercase letters in the audio code element; (c) constructing a video code element for the particular one of the multiplicity of Chinese characters which also has a unitary shape formed by a plurality of strokes including an initial stroke and a final stroke, the video code element consisting of a third English letter designated for representing the initial stroke, and a fourth English letter designated for representing the final stroke; (d) encoding the particular one of the multiplicity of Chinese characters with an integral audio-video code of four English letters, which is constructed by compiling together the audio code element and the video code element of the particular one of the multiplicity of Chinese characters; and (e) repeating steps "a" through "d" until the multiplicity of Chinese characters are all encoded; (f) whereby each one of the multiplicity of Chinese characters is individually encoded and accurately identified by a distinctive audio-video code consisting of four English letters, which represent not only phonetic pronunciation but also pictographic configuration as well as accent tone of each one of the multiplicity of Chinese characters.

Defined even more broadly, the present invention is a method for encoding a Chinese character with English letters, which Chinese character has a single syllable formed by a consonant and a vowel of the Chinese language, and also has a unitary shape formed by a plurality of strokes including an initial stroke and a final stroke, the method comprising the steps of: (a) constructing an audio-video code for said Chinese character, the audio-video code consisting of an audio code element and a video code element; (b) said audio code element consisting of a first English letter designated for representing said consonant, and a second English letter designated for representing said vowel; and (c) said video code element consisting of a third English letter designated for representing said initial stroke, and a fourth English letter designated for representing said final stroke; (d) whereby said Chinese character is individually encoded and accurately identified by said audio-video code consisting of four English letters, which represent not only phonetic pronunciation but also pictographic configuration of said Chinese character.

Defined alternatively in detail, the present invention is an apparatus for encoding and processing a multiplicity of Chinese characters with English letters comprising: (a) means for constructing an audio code element for a particular one of the multiplicity of Chinese characters which has a single syllable formed by a consonant and a vowel of the Chinese language, the audio code element consisting of a first English letter designated for representing the consonant, and a second English letter designated for representing the vowel; (b) means for denoting an accent tone of the syllable of the particular one of the multiplicity of Chinese characters by combining alternate upper and lowercase letters in the audio code element; (c) means for constructing a video code element for the particular one of the multiplicity of Chinese characters which also has a unitary shape formed by a plurality of strokes including an initial stroke and a final stroke, the video code element consisting of a third English letter designated for representing the initial stroke, and a fourth English letter designated for representing the final stroke; (d) means for encoding the particular one of the multiplicity of Chinese characters with an integral audio-video code of four English letters, which is constructed by compiling together the audio code element and the video code element of the particular one of the multiplicity of Chinese characters; (e) means for repeating until the multiplicity of Chinese characters are all encoded; (f) means for maintaining a database of the multiplicity of coded characters; (g) means for inputing the audio-video codes of the multiplicity of Chinese characters; (h) means for displaying the multiplicity of Chinese characters; and (i) means for receiving input codes from the input means, acquiring matching Chinese characters from the database, and sending such Chinese characters to the display means; (j) whereby each one of the multiplicity of Chinese characters is individually encoded and accurately identified by a distinctive audio-video code consisting of four English letters, which represent not only phonetic pronunciation but also pictographic configuration as well as accent tone of each one of the multiplicity of Chinese characters, and when a user types a code consisting of a limited number of English letters on the keyboard means for a desired Chinese character, the Chinese character processing apparatus can identify according to the code without any further input the desired Chinese character from the coded Chinese character stored in the database, and show the desired Chinese character on the display means.

Defined alternatively and broadly, the present invention is an apparatus for encoding a multiplicity of Chinese characters with English letters comprising: (a) means for constructing an audio code element for a particular one of the multiplicity of Chinese characters which has a single syllable formed by a consonant and a vowel of the Chinese language, the audio code element consisting of a first English letter designated for representing the consonant, and a second English letter designated for representing the vowel; (b) means for denoting an accent tone of the syllable of the particular one of the multiplicity of Chinese characters by combining alternate upper and lowercase letters in the audio code element; (c) means for constructing a video code element for the particular one of the multiplicity of Chinese characters which also has a unitary shape formed by a plurality of strokes including an initial stroke and a final stroke, the video code element consisting of a third English letter designated for representing the initial stroke, and a fourth English letter designated for representing the final stroke; (d) means for encoding the particular one of the multiplicity of Chinese characters with an integral audio-video code of four English letters, which is constructed by compiling together the audio code element and the video code element of the particular one of the multiplicity of Chinese characters; and (e) means for repeating until the multiplicity of Chinese characters are all encoded; (f) whereby each one of the multiplicity of Chinese characters is individually encoded and accurately identified by a distinctive audio-video code consisting of four English letters, which represent not only phonetic pronunciation but also pictographic configuration as well as accent tone of each one of the multiplicity of Chinese characters.

Defined alternatively and also broadly, the present invention is an apparatus for processing a multiplicity of Chinese characters with English letters comprising: (a) a keyboard means having 26 standard English letter keys for
 inputing the multiplicity of Chinese characters; (b) a data storage means having capacity for maintaining a database of a multiplicity of coded Chinese characters, each Chinese character being encoded by an integral audio-video code formed by an audio code element consisting of a first English letter and a second English letter designated respectively for representing a consonant and a vowel of the Chinese character, and a video code element consisting of a third English letter and a fourth English letter designated respectively for representing an initial stroke and a final stroke of the Chinese character; (c) a memory means for storing programmed instructions for processing the multiplicity of Chinese characters; (d) a display means for displaying the multiplicity of Chinese characters; and (e) a central processing unit connected with the keyboard means, the data storage means, the memory means and the display means, the central processing unit operating under the programmed instructions, receiving input codes from the keyboard means, acquiring matching Chinese characters from the database means, and sending such Chinese characters to the display means; (f) whereby when a user types a code consisting of a limited number of English letters on the keyboard means for a desired Chinese character, the Chinese character processing apparatus can identify according to the code without any further input the desired Chinese character from the coded Chinese character stored in the database, and show the desired Chinese character on the display means.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A computer implemented method for encoding a multiplicity of Chinese characters with English letters, comprising the steps of:
   a. selecting a first group of English letters designated to represent a multiplicity of consonants of the Chinese language respectively, the first group consisting of 20 English letters B, C, D, F, G, H, J, K, L, M, N, P, Q, R, S, T, W, X, Y and Z;
   b. selecting a second group of English letters designated to represent a multiplicity of vowels of the Chinese language respectively, the second group consisting of all 26 English letters;
   c. selecting a third group of English letters designated to represent a multiplicity of strokes of the Chinese language respectively, the third group consisting of 24 English letters which include all 26 English letters except X and Z;
   d. ascertaining a phonetic pronunciation of a particular one of said multiplicity of Chinese characters which has a single syllable formed by a particular one of said multiplicity of consonants and a particular one of said multiplicity of vowels;
   e. ascertaining a pictographic configuration of said particular one of said multiplicity of Chinese characters which also has a unitary shape formed by several particular ones of said multiplicity of strokes including an initial stroke and a final stroke; said computer performing the following steps:

i) constructing an audio code element for said particular one of said multiplicity of Chinese characters, the audio code element consisting of a first English letter which is selected from said first group of English letters and is designated for representing said particular one of said multiplicity of consonants, and a second English letter which is selected from said second group of English letters and is designated for representing said particular one of said multiplicity of vowels;

ii) denoting one of four possible accent tones of said syllable of said particular one of said multiplicity of Chinese characters by combining alternate upper and lowercase letters in said audio code element, using uppercase for both said first and second English letters to denote a first accent tone, using lowercase for said first English letter but uppercase for said second English letter to denote a second accent tone, using uppercase for said first English letter but lowercase for said second English letter to denote a third accent tone, and using lowercase for both said first and second English letters to denote a fourth accent tone;

iii) constructing a video code element for said particular one of said multiplicity of Chinese characters, the video code element consisting of two English letters selected from said third group of English letters, including a third English letter which is designated for representing said initial stroke, and a fourth English letter which is designated for representing said final stroke;

iv) encoding said particular one of said multiplicity of Chinese characters with an integral audio-video code of four English letters, which is constructed by compiling together said audio code element and said video code element of said particular one of said multiplicity of Chinese characters; and g. repeating steps (d) through (f) until said multiplicity of Chinese characters are all encoded;

h. whereby each one of said multiplicity of Chinese characters is individually encoded and accurately identified by a distinctive audio-video code consisting of four English letters, wherein the first English letter represents the consonant of a particular Chinese Character, the second English letter represents the vowel of the particular Chinese character and together with the first English letter represent the phonetic pronunciation of the particular Chinese character, the third English letter represents the first stroke of the particular Chinese character, the fourth English letter represents the final stroke of the particular Chinese character and together with the third English letter represent the pictographic configuration of the particular Chinese character, and the combination of uppercase and lowercase of the third and fourth English letters represents the accent tones of the particular Chinese character, which audio-video code represents not only phonetic pronunciation but also pictographic configuration as well as accent tone of each one of said multiplicity of Chinese characters.

2. The method as defined in claim 1 wherein each English letter of said first group of 20 English letters represents a directly corresponding single-letter PINYIN consonant.

3. The method as defined in claim 1 wherein the English letter "C" of said first group of 20 English letters also represents a multi-letter PINYIN consonant "Ch".

4. The method as defined in claim 1 wherein the English letter "S" of said first group of 20 English letters also represents a multi-letter PINYIN consonant "Sh".

5. The method as defined in claim 1 wherein the English letter "Z" of said first group of 20 English letters also represents a multi-letter PINYIN consonant "Zh".

6. The method as defined in claim 1 wherein the English letters "A", "E", "I", "O" and "U" of said second group of 26 English letters each represents a directly corresponding single-letter PINYIN vowel.

7. The method as defined in claim 1 wherein the English letter "V" of said second group of 26 English letters represents a single-letter PINYIN vowel "ü".

8. The method as defined in claim 1 wherein the English letter "B" of said second group of 26 English letters represents a multi-letter PINYIN vowel "ua".

9. The method as defined in claim 1 wherein the English letter "C" of said second group of 26 English letters represents a multi-letter PINYIN vowel "ong" and another multi-letter PINYIN vowel "iong".

10. The method as defined in claim 1 wherein the English letter "D" of said second group of 26 English letters represents a multi-letter PINYIN vowel "ou".

11. The method as defined in claim 1 wherein the English letter "F" of said second group of 26 English letters represents a multi-letter PINYIN vowel "ei".

12. The method as defined in claim 1 wherein the English letter "G" of said second group of 26 English letters represents a multi-letter PINYIN vowel "ang".

13. The method as defined in claim 1 wherein the English letter "H" of said second group of 26 English letters represents a multi-letter PINYIN vowel "uan" and another multi-letter PINYIN vowel "üan".

14. The method as defined in claim 1 wherein the English letter "J" of said second group of 26 English letters represents a multi-letter PINYIN vowel "in" and another multi-letter PINYIN vowel "ing".

15. The method as defined in claim 1 wherein the English letter "K" of said second group of 26 English letters represents a multi-letter PINYIN vowel "un" and another multi-letter PINYIN vowel "ün".

16. The method as defined in claim 1 wherein the English letter "L" of said second group of 26 English letters represents a multi-letter PINYIN vowel "ue".

17. The method as defined in claim 1 wherein the English letter "M" of said second group of 26 English letters represents a multi-letter PINYIN vowel "ie".

18. The method as defined in claim 1 wherein the English letter "N" of said second group of 26 English letters represents a multi-letter PINYIN vowel "en", a multi-letter PINYIN vowel "eng", and a multi-letter PINYIN vowel "in" and another multi-letter PINYIN vowel "ing" when following consonants "J", "Q" or "X".

19. The method as defined in claim 1 wherein the English letter "O" of said second group of 26 English letters also represents a multi-letter PINYIN vowel "uo".

20. The method as defined in claim 1 wherein the English letter "P" of said second group of 26 English letters represents a multi-letter PINYIN vowel "ian".

21. The method as defined in claim 1 wherein the

English letter "Q" of said second group of 26 English letters represents a multi-letter PINYIN vowel "iu" and another multi-letter PINYIN vowel "ui".

22. The method as defined in claim 1 wherein the English letter "R" of said second group of 26 English letters represents a multi-letter PINYIN vowel "iang".

23. The method as defined in claim 1 wherein the English letter "S" of said second group of 26 English letters represents a multi-letter PINYIN vowel "iao".

24. The method as defined in claim 1 wherein the English letter "T" of said second group of 26 English letters represents a multi-letter PINYIN vowel "ai".

25. The method as defined in claim 1 wherein the English letter "W" of said second group of 26 English letters represents a multi-letter PINYIN vowel "uang".

26. The method as defined in claim 1 wherein the English letter "X" of said second group of 26 English letters represents a multi-letter PINYIN vowel "ao".

27. The method as defined in claim 1 wherein the English letter "Y" of said second group of 26 English letters represents a multi-letter PINYIN vowel "uai".

28. The method as defined in claim 1 wherein the English letter "Z" of said second group of 26 English letters represents a multi-letter PINYIN vowel "an".

29. The method as defined in claim 1 wherein 24 of said multiplicity of Chinese characters are designated as "Chinese Alphabet Components" each having an audio code element of one respective English letter selected from said third group of 24 English letters.

30. The method as defined in claim 1 further comprising the step of using an additional fifth English letter "C" to denote a duplicate code of a Chinese character which has a same audio-video code as another Chinese character.

31. A computer implemented method for encoding a multiplicity of Chinese characters with English letters, comprising the steps of:
 a. selecting a first group of English letters designated to represent a multiplicity of consonants of the Chinese language respectively;
 b. selecting a second group of English letters designated to represent a multiplicity of vowels of the Chinese language respectively;
 c. selecting a third group of English letters designated to represent a multiplicity of strokes of the Chinese language respectively;
 d. ascertaining a phonetic pronunciation of a particular one of said multiplicity of Chinese characters which has a single syllable formed by a particular one of said multiplicity of consonants and a particular one of said multiplicity of vowels;
 e. ascertaining a pictographic configuration of said particular one of said multiplicity of Chinese characters which also has a unitary shape formed by several particular ones of said multiplicity of strokes including an initial stroke and a final stroke; said computer performing the following steps:
  i) constructing an audio code element for said particular one of said multiplicity of Chinese characters, the audio code element consisting of a first English letter which is selected from said first group of English letters and is designated for representing said particular one of said multiplicity of consonants, and a second English letter which is selected from said second group of English letters and is designated for representing said particular one of said multiplicity of vowels;
  ii) denoting one of four possible accent tones of said syllable of said particular one of said multiplicity of Chinese characters by combining alternate upper and lowercase letters in said audio code element, using uppercase for both said first and second English letters to denote a first accent tone, using lowercase for said first English letter but uppercase for said second English letter to denote a second accent tone, using uppercase for said first English letter but lowercase for said second English letter to denote a third accent tone, and using lowercase for both said first and second English letters to denote a fourth accent tone;
  iii) constructing a video code element for said particular one of said multiplicity of Chinese characters, the video code element consisting of two English letters selected from said third group of English letters, including a third English letter which is designated for representing said initial stroke, and a fourth English letter which is designated for representing said final stroke;
  iv) encoding said particular one of said multiplicity of Chinese characters with an integral audio-video code of four English letters, which is constructed by compiling together said audio code element and said video code element of said particular one of said multiplicity of Chinese characters; and
 g. repeating steps (d) through (f) until said multiplicity of Chinese characters are all encoded;
 h. whereby each one of said multiplicity of Chinese characters is individually encoded and accurately identified by a distinctive audio-video code consisting of four English letters, wherein the first English letter represents the consonant of a particular Chinese Character, the second English letter represents the vowel of the particular Chinese character and together with the first English letter represent the phonetic pronunciation of the particular Chinese character, the third English letter represents the first stroke of the particular Chinese character, the fourth English letter represents the final stroke of the particular Chinese character and together with the third English letter represent the pictographic configuration of the particular Chinese character, and the combination of uppercase and lowercase of the third and fourth English letters represents the accent tones of the particular Chinese character, which audio-video code represents not only phonetic pronunciation but also pictographic configuration as well as accent tone of each one of said multiplicity of Chinese characters.

32. The method as defined in claim 31 wherein said first group consists of 20 English letters B, C, D, F, G, H, J, K, L, M, N, P, Q, R, S, T, W, X, Y and Z.

33. The method as defined in claim 31 wherein said second group consists of all 26 English letters.

34. The method as defined in claim 31 wherein said third group consists of 24 English letters which include all 26 English letters except X and Z.

35. The method as defined in claim 31 further comprising the step of using an additional fifth English letter "C" to denote a duplicate code of a Chinese character which has a same audio-video code as another Chinese character.

36. A computer implemented method for encoding a multiplicity of Chinese characters with English letters, comprising the steps of:
   a. ascertaining a phonetic pronunciation of a particular one of said multiplicity of Chinese characters which has a single syllable formed by a particular one of a multiplicity of consonants and a particular one of a multiplicity of vowels of the Chinese language;
   b. ascertaining a pictographic configuration of said particular one of said multiplicity of Chinese characters which also has a unitary shape formed by several particular ones of said multiplicity of strokes including an initial stroke and a final stroke;
   c. said computer performing the following steps:
      i) constructing an audio code element for said particular one of said multiplicity of Chinese characters, the audio code element consisting of a first English letter which is designated for representing said particular one of said multiplicity of consonants, and a second English letter which is designated for representing said particular one of said multiplicity of vowels;
      ii) denoting an accent tone of said syllable of said particular one of said multiplicity of Chinese characters by combining alternate upper and lowercase letters in said audio code element;
      iii) constructing a video code element for said particular one of said multiplicity of Chinese characters, the video code element consisting of a third English letter which is designated for representing said initial stroke, and a fourth English letter which is designated for representing said final stroke;
      iv) encoding said particular one of said multiplicity of Chinese characters with an integral audio-video code of four English letters, which is constructed by compiling together said audio code element and said video code element of said particular one of said multiplicity of Chinese characters; and
   d. repeating steps (a) through (f) until said multiplicity of Chinese characters are all encoded;
   e. whereby each one of said multiplicity of Chinese characters is individually encoded and accurately identified by a distinctive audio-video code consisting of four English letters, wherein the first English letter represents the consonant of a particular Chinese Character, the second English letter represents the vowel of the particular Chinese character and together with the first English letter represent the phonetic pronunciation of the particular Chinese character, the third English letter represents the first stroke of the particular Chinese character, the fourth English letter represents the final stroke of the particular Chinese character and together with the third English letter represent the pictographic configuration of the particular Chinese character, and the combination of uppercase and lowercase of the third and fourth English letters represents the accent tones of the particular Chinese character, which audio-video code represents not only phonetic pronunciation but also pictographic configuration as well as accent tone of each one of said multiplicity of Chinese characters.

37. The method as defined in claim 36 further comprising the step of selecting a first group of English letters designated to represent said multiplicity of consonants of the Chinese language respectively for constructing said first English letter of said audio code element.

38. The method as defined in claim 36 further comprising the step of selecting a second group of English letters designated to represent said multiplicity of vowels of the Chinese language respectively for constructing said second English letter of said audio code element.

39. The method as defined in claim 36 further comprising the step of selecting a third group of English letters designated to represent a multiplicity of strokes of the Chinese language respectively for constructing said first and second English letters of said video code element.

40. The method as defined in claim 36 wherein said step of denoting an accent tone of said syllable of said particular one of said multiplicity of Chinese characters further comprises the steps of, while constructing said audio code element, using uppercase for both said first and second English letters to denote a first accent tone, using lowercase for said first English letter but uppercase for said second English letter to denote a second accent tone, using uppercase for said first English letter but lowercase for said second English letter to denote a third accent tone, and using lowercase for both said first and second English letters to denote a fourth accent tone.

41. The method as defined in claim 36 further comprising the step of using an additional fifth English letter "C" to denote a duplicate code of a Chinese character which has a same audio-video code as another Chinese character.

42. A computer implemented method for encoding a multiplicity of Chinese characters with English letters, comprising the steps of:
   a. said computer performing the following steps:
      i) constructing an audio code element for a particular one of said multiplicity of Chinese characters which has a single syllable formed by a consonant and a vowel of the Chinese language, the audio code element consisting of a first English letter designated for representing the consonant, and a second English letter designated for representing the vowel;
      ii) denoting an accent tone of said syllable of said particular one of said multiplicity of Chinese characters by combining alternate upper and lowercase letters in said audio code element;
      iii) constructing a video code element for said particular one of said multiplicity of Chinese characters which also has a unitary shape formed by a plurality of strokes including an initial stroke and a final stroke, the video code element consisting of a third English letter designated for representing the initial stroke, and a fourth English letter designated for representing the final stroke;
      iv) encoding said particular one of said multiplicity of Chinese characters with an integral audio-video code of four English letters, which is constructed by compiling together said audio code element and said video code element of said particular one of said multiplicity of Chinese characters; and
   b. repeating steps (a)(i) through (a)(iv) until said multiplicity of Chinese characters are all encoded;
   c. whereby each one of said multiplicity of Chinese characters is individually encoded and accurately identified by a distinctive audio-video code consisting of four English letters, wherein the first English letter represents the consonant of a particular Chinese Character, the second English letter represents the vowel of the particular Chinese character and together with the first English letter represent the phonetic pronunciation of the particular Chinese character, the third English letter represents the first stroke of the particular Chinese character, the fourth English letter represents the final stroke of the particular Chinese character and together with the third English letter represent the pictographic configuration of the particular Chinese character, and the combination of uppercase and lowercase of the third and fourth English letters represents the accent tones of the particular Chinese character, which audio-video code represents not only phonetic pronunciation but also pictographic configuration as well as accent tone of each one of said multiplicity of Chinese characters.

43. The method as defined in claim 42 further comprising the step of selecting a first group of English letters designated to represent said multiplicity of consonants of the Chinese language respectively for constructing said first English letter of said audio code element.

44. The method as defined in claim 42 further comprising the step of selecting a second group of English letters designated to represent said multiplicity of vowels of the Chinese language respectively for constructing said second English letter of said audio code element.

45. The method as defined in claim 42 further comprising the step of selecting a third group of English letters designated to represent a multiplicity of strokes of the Chinese language respectively for constructing said first and second English letters of said video code element.

46. The method as defined in claim 42 wherein said step of denoting an accent tone of said syllable of said particular one of said multiplicity of Chinese characters further comprises the steps of, while constructing said audio code element, using uppercase for both said first and second English letters to denote a first accent tone, using lowercase for said first English letter but uppercase for said second English letter to denote a second accent tone, using uppercase for said first English letter but lowercase for said second English letter to denote a third accent tone, and using lowercase for both said first and second English letters to denote a fourth accent tone.

47. The method as defined in claim 42 further comprising the step of using an additional fifth English letter "C" to denote a duplicate code of a Chinese character which has a same audio-video code as another Chinese character.

48. A computer implemented method for encoding a Chinese character with English letters, which Chinese character has a single syllable formed by a consonant and a vowel of the Chinese language, and also has a unitary shape formed by a plurality of strokes including an initial stroke and a final stroke, the method comprising the steps of said computer performing the following steps of:

a. constructing an audio-video code for said Chinese character, the audio-video code consisting of an audio code element and a video code element;

b. said audio code element consisting of a first English letter designated for representing said consonant, and a second English letter designated for representing said vowel; and c. said video code element consisting of a third English letter designated for representing said initial stroke, and a fourth English letter designated for representing said final stroke;

d. whereby said Chinese character is individually encoded and accurately identified by said audio-video code consisting of four English letters, wherein the first English letter represents the consonant of a particular Chinese Character, the second English letter represents the vowel of the particular Chinese character and together with the first English letter represent the phonetic pronunciation of the particular Chinese character, the third English letter represents the first stroke of the particular Chinese character, the fourth English letter represents the final stroke of the particular Chinese character and together with the third English letter represent the pictographic configuration of the particular Chinese character, and the combination of uppercase and lowercase of the third and fourth English letters represents the accent tones of the particular Chinese character, which audiovideo code represents not only phonetic pronunciation but also pictographic configuration of said Chinese character.

49. The method as defined in claim 48 further comprising the step of denoting an accent tone of said syllable of said particular one of said multiplicity of Chinese characters by combining alternate upper and lowercase letters in said audio code element.

50. The method as defined in claim 48 further comprising the step of using an additional fifth English letter "C" to denote a duplicate code of a Chinese character which has a same audio-video code as another Chinese character.

* * * * *